(12) United States Patent
Kowenhoven et al.

(10) Patent No.: US 11,410,190 B1
(45) Date of Patent: Aug. 9, 2022

(54) SYSTEM FOR CALCULATING PRICING USING AT LEAST ONE OF TIME DEPENDENT VARIABLES AND PRECONFIGURED PROFILES

(71) Applicant: Energy Enablement LLC, Pittsburgh, PA (US)

(72) Inventors: Thomas W. Kowenhoven, Pittsburgh, PA (US); Mark A. Nuzzo, Beaver, PA (US); Taylor Collins, Pittsburgh, PA (US); Steve Swackhammer, Pittsburgh, PA (US); Alexander James, Washington, PA (US); Brian Carey, Pittsburgh, PA (US)

(73) Assignee: ENERGY ENABLEMENT LLC, Pittsburgh, PA (US)

( * ) Notice: Subject to any disclaimer, the term of this patent is extended or adjusted under 35 U.S.C. 154(b) by 149 days.

(21) Appl. No.: 16/528,155

(22) Filed: Jul. 31, 2019

(51) Int. Cl.
  *G06Q 30/00* (2012.01)
  *G06Q 30/02* (2012.01)
  *G06Q 50/06* (2012.01)

(52) U.S. Cl.
  CPC ..... *G06Q 30/0206* (2013.01); *G06Q 30/0283* (2013.01); *G06Q 50/06* (2013.01)

(58) Field of Classification Search
  CPC . G06Q 30/0206; G06Q 30/0283; G06Q 50/06
  See application file for complete search history.

(56) References Cited

U.S. PATENT DOCUMENTS

| | | |
|---|---|---|
| 7,991,513 B2 | 8/2011 | Pitt |
| 2002/0165816 A1 | 11/2002 | Barz |

(Continued)

FOREIGN PATENT DOCUMENTS

| | | | |
|---|---|---|---|
| JP | 2005025377 A | 1/2005 | |
| JP | 2009245044 A | 10/2009 | |
| WO | WO-0106432 A1 * | 1/2001 | ............. G01D 4/004 |

OTHER PUBLICATIONS

Mays, J. (2019). Pricing mechanisms in competitive electricity markets (Order No. 13883501). Available from ProQuest Dissertations and Theses Professional. (2298177229). (Year: 2019).*

(Continued)

*Primary Examiner* — William S Brockington, III
(74) *Attorney, Agent, or Firm* — William F. Lang, IV; Lang Patent Law LLC

(57) ABSTRACT

A system for calculating energy pricing includes a variety of categories and subcategories of user-selectable preconfigured profiles to derive a detailed, accurate energy profile based on minimal price request information. This profile defines the energy load being priced and its accuracy approaches that which is obtainable through using meter data, but without the need for obtaining and managing such data. The system quickly and accurately calculates both current day and historical pricing based on a single price request by processing the effective dates of time dependent variables, inputs, algorithms, and/or parameters. Managing these effective dates ensures the price output takes into account ongoing market changes in supply, distribution, and/or tax price factors that are known as of the date of the price request and take effect during the future contract term defined by the price request.

24 Claims, 54 Drawing Sheets

(56) References Cited

U.S. PATENT DOCUMENTS

| | | | |
|---|---|---|---|
| 2004/0215529 A1 | 10/2004 | Foster et al. | |
| 2007/0136217 A1 | 6/2007 | Johnson et al. | |
| 2009/0063369 A1* | 3/2009 | Brown | G06Q 30/02 |
| | | | 705/400 |
| 2010/0262310 A1* | 10/2010 | Xu | G06F 30/13 |
| | | | 700/291 |
| 2011/0029461 A1 | 2/2011 | Hardin, Jr. | |
| 2012/0016528 A1* | 1/2012 | Raman | G06F 9/5094 |
| | | | 700/291 |
| 2012/0310377 A1* | 12/2012 | Prentice | G06Q 50/06 |
| | | | 700/36 |
| 2017/0200238 A1 | 7/2017 | Burdette et al. | |
| 2018/0262573 A1* | 9/2018 | Przybylski | G05B 15/02 |
| 2020/0274389 A1* | 8/2020 | Islam | H04L 9/0637 |

OTHER PUBLICATIONS

Electric Rate website, https://www.electricrate.com/, dated prior to the filing date of the application.
Electric Choice website, https://www.electricchoice.com/about/, dated prior to the filing date of the application.
Choose Energy website, https://www.chooseenergy.com/, dated prior to the filing date of the application.
Save on Energy website, https://www.saveonenergy.com/, dated prior to the filing date of the application.
Texas Electricity Ratings website, https://www.texaselectricityratings.com/, dated prior to the filing date of the application.
Direct Energy website, https://www.directenergy.com/, dated prior to the filing date of the application.
Constellation website, https://www.constellation.com/solutions/for-your-commercial-business/request-a-quote.html, dated prior to the filing date of the application.
Engie website, https://www.mythinkenergy.com/, dated prior to the filing date of the application.
Emex website, https://energymarketexchange.com/what-we-do/, dated prior to the filing date of the application.
Bid My Energy website, http://www.bidmyenergy.com/?gclid=CKCHxsq9oM4CFRJZhgoduQIKIA, dated prior to the filing date of the application.
Energy Price Choice website, https://energypricechoice.com/, dated prior to the filing date of the application.
APPI Energy website, https://www.appienergy.com/price-finder, dated prior to the filing date of the application.

* cited by examiner

Location

EPB Active   EPB Coming Soon

IL UTILITIES           X

EPB ACTIVE:
Commonwealth Edison (Chicago)

EPB COMING SOON:
Ameren Illinois

— 24

ENTER INPUTS: [1]  (2) (3) (4) (5)

1. Location —21A
2. Start Month
3. Term Lengths
4. Facility Profile
5. Volume

Save   Clear

Get Pricing

ENTER INPUTS: ✓—✓—✓—[4]⋯⑤

1. Location
   ✓ Commonwealth Edison (Chicago) – 60178
     Sycamore, IL
2. Start Month
   ✓ Aug 2020
3. Term Lengths
   ✓ 12 & 24 & 33 Months
4. Facility Profile —— 21D
5. Volume

[Save] [Clear]
[Get Pricing]

Manufacturing —38

○ SIC Code 20: Food & Kindred Products
○ SIC Code 21: Tobacco Products
○ SIC Code 22: Textile Mill Products
○ SIC Code 23: Apparel & Furnished Fabric Products
○ SIC Code 24: Lumber & Wood Products
○ SIC Code 25: Furniture & Fixtures
○ SIC Code 26: Paper & Allied Products
○ SIC Code 27: Printing & Publishing Industries
○ SIC Code 28: Chemicals & Allied Products
○ SIC Code 29: Petroleum Refining & Related Industries
○ SIC Code 30: Rubber & Misc. Plastics Products
○ SIC Code 31: Leather & Leather Products
○ SIC Code 32: Stone, Clay, Glass, & Concrete Products
○ SIC Code 33: Primary Metal Industries

FIG. 10A

ENTER INPUTS: ①—②—③—④⋯⑤

1. Location
   ✓ Commonwealth Edison (Chicago) – 60178
     Sycamore, IL
2. Start Month
   ✓ Aug 2020
3. Term Lengths
   ✓ 12 & 24 & 33 Months
4. Facility Profile ⎯ 21D
5. Volume

[ Save ] [ Clear ]

[ Get Pricing ]

Manufacturing

○ SIC Code 32: Stone, Clay, Glass, & Concrete Products
☑ SIC Code 33: Primary Metal Industries ⎯ 67
   Check all that apply:
   ☐ Mon – Fri (6am – 6pm)
   ☐ Mon – Fri (6pm – 6am)      } 68
   ☐ Sat – Sun (6am – 6pm)
   ☐ Sat – Sun (6pm – 6am)
   [ Done ]

○ SIC Code 34: Fabricated Metal Products
○ SIC Code 35: Industrial & Commercial Machinery & Computer Equip
○ SIC Code 36: Electronic Equipment
○ SIC Code 37: Transportation Equipment
○ SIC Code 38: Instruments, Photographic, Optical, Medical Good

FIG. 10B

Custom Profile
Enter monthly values

| MONTH | Total Usage (KWH) | On-Peak Usage (KWH) | Off-Peak Usage (KWH) | Peak Demand (KWH) |
|---|---|---|---|---|
| AUG '20 | | | | |
| SEP '20 | | | | |
| OCT '20 | | | | |
| NOV '20 | | | | |
| DEC '20 | | | | |
| JAN '21 | | | | |
| TOTAL | 0 | 0 | 0 | N/A |

☐ Add column for Capacity Tag (KW) — 58B

☐ Add column for Transmission Tag (KW) — 58C

[ Clear ]  [ Submit Profile ]

58A
58

ENTER INPUTS: ①—②—③—[④]⋯⑤

1. Location
   ✓ Commonwealth Edison (Chicago) – 60178
     Sycamore, IL
2. Start Month
   ✓ Aug 2020 — 30, 32
3. Term Lengths
   ✓ 12 & 24 & 33 Months — 34
4. Facility Profile — 21D
5. Volume

[ Save ] [ Clear ]

[ Get Pricing ]

FIG. 10C

Custom Profile
Enter monthly values

| MONTH | Total Usage (KWH) | On-Peak Usage (KWH) | Off-Peak Usage (KWH) | Peak Demand (KW) | Capacity Tag (KW) | Transmission Tag (KW) |
|---|---|---|---|---|---|---|
| AUG '20 | 1,000,000 | 400,000 | 600,000 | 1,700 | 1,780 | 1,590 |
| SEP '20 | 1,200,000 | 500,000 | 700,000 | 1,800 | 1,780 | 1,590 |
| TOTAL | 2,200,000 | 900,000 | 1,300,000 | N/A | x Remove | x Remove |

[Clear] [Submit Profile]

Add column for Capacity Tag (KW) — 58D
- Apply a single value to all months
Enter Value: [1,780] [Update Column] — 58E
- Apply multiple values across the months
- Enter a different value for each month — 58F

— 58B

Add column for Transmission Tag (KW) — 58D
- Apply a single value to all months
Enter Value: [1,590] [Update Column] — 58E
- Apply multiple values across the months
- Enter a different value for each month — 58F

— 58C

ENTER INPUTS: ✓—✓—✓—[4]---(5)

1. Location
   ✓ Commonwealth Edison (Chicago) – 60178
   Sycamore, IL
2. Start Month
   ✓ Aug 2020
3. Term Lengths
   ✓ 12 & 24 & 33 Months
4. Facility Profile — 21D
5. Volume

[Save] [Clear]

[Get Pricing]

FIG. 10D

ENTER INPUTS: ①—②—③—④—⑤

1. Location
   ✓ Commonwealth Edison (Chicago) – 60178
     Sycamore, IL
2. Start Month
   ✓ Aug 2020
3. Term Lengths
   ✓ 12 & 24 & 33 Months
4. Facility Profile
   ✓ Manufacturing
     SIC Code 33: Primary Metal Industries
     Mon – Fri (6am – 6pm), Mon – Fri (6pm-6am),
     Sat – Sun (6am – 6pm), Sat – Sun (6pm-6am)
     Foundry Facility
5. Volume —— 21E

[ Save ] [ Clear ]

[ Get Pricing ]

Annual Volume

○ Usage (KWH/Year) —— 70
○ Total Cost ($/Year) —— 72
○ Annual Peak (KW) —— 74

FIG. 11

ENTER INPUTS:

1. Location
   ✓ Commonwealth Edison (Chicago) – 60178
   Sycamore, IL
2. Start Month
   ✓ Aug 2020
3. Term Lengths
   ✓ 12 & 24 & 33 Months
4. Facility Profile
   Manufacturing
   ✓ SIC Code 33:Primary Metal Industries
   Mon– Fri (6am – 6pm), Mon – Fri (6pm-6am),
   Sat– Sun (6am – 6pm), Sat – Sun (6pm-6am)
   Foundry Facility
5. Volume — 21E
   12,000,000 KWH/Yr Save  Clear Get Pricing Annual Volume Include Broker Fee in Price Estimate? —82

Yes  No

FIG. 11A

ENTER INPUTS: ✓—✓—✓—✓—[5]

1. Location
   ✓ Commonwealth Edison (Chicago) – 60178
     Sycamore, IL
2. Start Month
   ✓ Aug 2020
3. Term Lengths
   ✓ 12 & 24 & 33 Months
4. Facility Profile
   Manufacturing
   ✓ SIC Code 33:Primary Metal Industries
     Mon – Fri (6am – 6pm), Mon – Fri (6pm-6am),
     Sat – Sun (6am – 6pm), Sat – Sun (6pm-6am)
     Foundry Facility
5. Volume —— 21E
   12,000,000 KWH/Yr

[Save] [Clear]

[Get Pricing]

Annual Volume

Broker Fee:
                 ⌒84
$0.[001] ($/KWH)    [Enter]

FIG. 11B

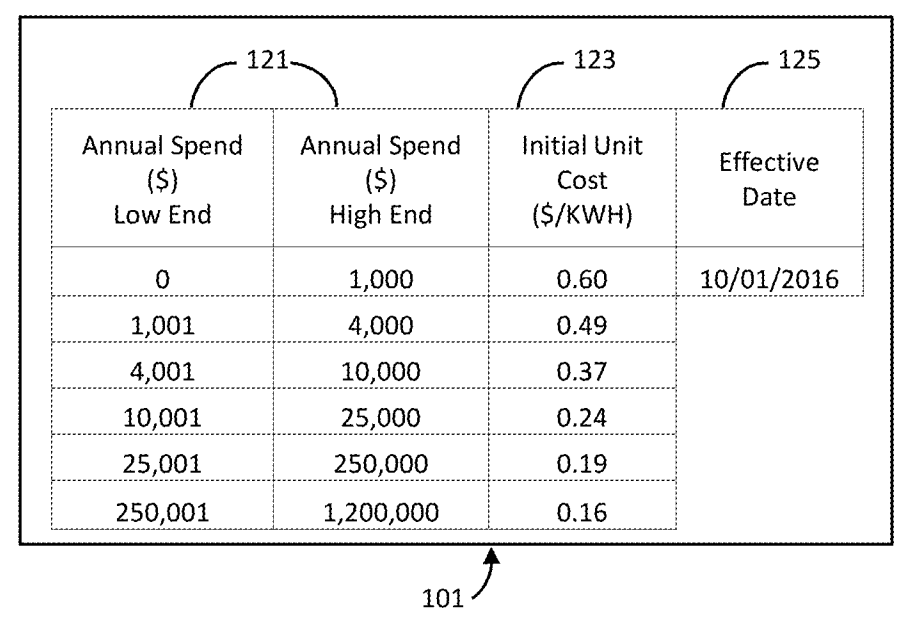

| Annual Spend ($) Low End | Annual Spend ($) High End | Initial Unit Cost ($/KWH) | Effective Date |
|---|---|---|---|
| 0 | 1,000 | 0.60 | 10/01/2016 |
| 1,001 | 4,000 | 0.49 | |
| 4,001 | 10,000 | 0.37 | |
| 10,001 | 25,000 | 0.24 | |
| 25,001 | 250,000 | 0.19 | |
| 250,001 | 1,200,000 | 0.16 | |

FIG. 12B

| Zip Code 127 | Municipality 129 | County/Area 131 | Zone 133 | Effective Date 135 |
|---|---|---|---|---|
| 10451 | Bronx | Bronx | 1 | 01/01/2017 |
| 10452 | Bronx | Bronx | 1 | |
| 10453 | New York | New York | 1 | |
| 10458 | New York | New York | 1 | |
| 10459 | New York | New York | 1 | |
| 10460 | New York | New York | 2 | |
| 10461 | New York | New York | 2 | |
| 10462 | New York | New York | 2 | |
| 10463 | Amawalk | Westchester | 3 | |
| 10464 | Ardsley | Westchester | 3 | |
| 10465 | Ardsley On Hudson | Westchester | 3 | |
| 10466 | Armonk | Westchester | 3 | |
| 10467 | Baldwin Place | Westchester | 4 | |
| 10468 | Bedford | Westchester | 4 | |

| Forward (Contract) Month | On-Peak Price Zone 1 ($/MWh) | Off-Peak Price Zone 1 ($/MWh) | On-Peak Price Zone 2 ($/MWh) | Off-Peak Price Zone 2 ($/MWh) | Effective Date |
|---|---|---|---|---|---|
| Feb-18 | 81.10 | 86.15 | 71.08 | 61.06 | 01/01/2018 |
| Mar-18 | 53.95 | 64.70 | 45.61 | 38.54 | |
| Apr-18 | 39.70 | 42.80 | 36.55 | 27.02 | |
| May-18 | 36.60 | 27.40 | 33.06 | 23.46 | |
| Jun-18 | 39.70 | 24.60 | 35.84 | 24.12 | |
| Jul-18 | 47.20 | 25.15 | 42.04 | 27.28 | |
| Aug-18 | 43.50 | 28.60 | 38.53 | 26.57 | |
| Sep-18 | 36.60 | 28.65 | 33.06 | 23.51 | |
| Oct-18 | 36.45 | 23.75 | 33.64 | 22.90 | |
| Nov-18 | 37.45 | 21.95 | 35.27 | 23.75 | |
| Dec-18 | 53.10 | 25.50 | 49.92 | 37.54 | |
| Jan-19 | 74.45 | 39.05 | 68.96 | 51.33 | |
| Feb-19 | 70.70 | 54.45 | 67.17 | 49.01 | |
| Mar-19 | 47.20 | 50.55 | 45.02 | 34.92 | |
| Apr-19 | 34.45 | 34.20 | 31.39 | 22.24 | |
| May-19 | 32.80 | 23.55 | 28.58 | 19.60 | |

FIG. 12D

| Utility | Generic Utility Profile | Thresholds (KWH) | | Effective Date |
|---|---|---|---|---|
| | | Min | Max | |
| 1 | Small | - | 40,000 | 06/01/2018 |
| | Large | 40,001 | 1,400,000 | |
| 2 | Watt Class | | | |
| | Delivery Class | - | 50,000 | |
| | General | 50,001 | 800,000 | |
| 3 | Large Primary | - | 390,000 | |
| | Large Secondary | 390,001 | 1,450,000 | |
| 4 | Secondary Service - Less Than 10 kW | N/A | N/A | |
| | Secondary Service - Greater Than 10 kW | | | |
| | Less than 5 kW | | | |
| | Greater than 5 kW - Distribution Line | | | |
| | Primary Service - Substation | | | |
| 5 | Secondary Service - Less Than 10 kW | N/A | N/A | |
| | Secondary Service - Greater Than 10 kW | | | |
| | Primary Service | | | |
| n | General Use; Less than 15 kW | - | 290,000 | |
| | General Use; More than 15 kW Less than 500 kW | 290,001 | 725,000 | |

FIG. 12E

| Rate Class | Rate Class Name | Loss Factors For Forward Contract Terms | | | Effective Date |
|---|---|---|---|---|---|
| | | Jan 2020 - Dec 2020 | Jan 2021 - Dec 2021 | Jan 2022 - Dec 2022 | |
| A | Small | 0.0610 | 0.0659 | 0.0698 | 12/01/2016 |
| B | Small Medium | 0.0720 | 0.0445 | 0.0720 | |
| C | Medium | 0.0533 | 0.0677 | 0.0432 | |
| D | Medium Large | 0.0578 | 0.0347 | 0.0555 | |
| E | Large | 0.0345 | 0.0563 | 0.0368 | |

FIG. 12G

| PRICE COMPONENT LEVEL 221 | SUPPLY 221A | DISTRIBUTION 221B | TAXES 221C |
|---|---|---|---|
| 1 to N PRICE SUBCOMPONENT LEVELS w/ Effective Date 223 | Commodity<br>Capacity<br>Transmission<br>Transmission Enhancement (RTEP)<br>Auction Revenue Rights (ARR)<br>Ancillary Services<br>Renewable Portfolio Standard (RPS)<br>223A | MAC & MAC Adjustment<br>Revenue Decoupling Mechanism<br>System Benefits Charge (SBC)<br>Clean Energy Standard (CES)<br>Delivery Revenue Surcharge<br>Customer Charge<br>Energy Delivery<br>Metering Services<br>Reactive Power 223B | Supply Gross Receipts Tax<br>Distribution Gross Receipts Tax<br>Sales Tas<br>223C |
| DERIVED ALGORITHM INPUTS w/ Effective Date 106 | Total Monthly Usage (MU)<br>On Peak Monthly Usage (PKMU)<br>Off Peak Monthly Usage (OFMU)<br>Total Term Usage (TU)<br>Effective Date of Inputs (EF) | Monthly Peak Demand (MPD)<br>Summer Peak Demand (SPD)<br>Annual Peak Demand (APD)<br>Term Peak Demand (TPD)<br>Capacity Tags (CT)<br>Transmission Tags (TT) | Annual Usage (AU)<br>Loss Factors (LF)<br>Days in Month (DAYS)<br>Start Month (SM)<br>End Month (EM)<br>106 |
| MARKET DATA INPUTS w/ Effective Date 10E | Commodity On-Peak Pricing (EP)<br>Commodity Off-Peak Pricing (EOP)<br>Distribution Losses (DL)<br>Supply (Trans) Losses (SL)<br>Total Losses (TL)<br>Capacity Price 1 (CP1)<br>Capacity Price 2 (Zonal Scaling Factor) (SF)<br>Capacity Price 3 (Forecast Pool Requ) (FPR)<br>Transmission Price 1 (NITS) (TP1)<br>Transmission Price 2 (RTEP/TEC) (TP2)<br>Transmission Price 3 (TP3)<br>RPS Price 1 (Wind) (RPSP1)<br>RPS Price 2 (Solar) (RPSP2)<br>RPS Price 3 (Other) (RPSP3)<br>RPS Obligation % 1 (Wind) (RPS01)<br>RPS Obligation % 2 (Solar) (RPS02)<br>RPS Obligation % 3 (Other) (RPS03)<br>Supplier Margin (SM)<br>ARR Rate (Credit or Charge) (ARRR) 108 | Customer Charge (CC)<br>MAC & MAC Adjustment Charges (MAC)<br>Revenue Decoupling Mechanism (RDM)<br>System Benefits Charge (SBC)<br>Clean Energy Standard (CES)<br>Delivery Revenue Surcharge (DRS)<br>PSL 18a Assessment Surcharge (PSL)<br>Demand Deliv 1st 10 KW (DD)<br>Demand Deliv Over 10 KW (DDO)<br>Energy Deliv (ED)<br>Meter Charge (MC)<br>Reactive Pwr Charge below 955 PF (RPC)<br>110 | Supply GRT (SGRT)<br>Distribution GRT (DGRT)<br>Sales Tax (ST)<br>112 |

Historical Pricing Date... n — 257B
Historical Pricing Date = Aug 1, 2017 — 257A Current Day Pricing = Jan 10, 2018 — 255

←——— Total Term KWHs = 12,000,000 ———→ 277

| Component 221 | Subcomponent 223 | Start Month | Month 2 | Month 3 | Month 4, 5, 6... | ... Last Month of Term | Last Month $\sum_{Start Month}^{Last Month} \$$ | Subcomponent Unit Price $\sum_{Start Month}^{Last Month} \frac{\$}{Term\ KWH}$ | Component Unit Price $\sum_{n} \frac{\$/kWh}{Subcomp\ 1\ Unit\ Cost}$ | Total Unit Price $\sum_{n} \frac{\$/kWh}{Component\ 1\ Unit\ Cost}$ |
|---|---|---|---|---|---|---|---|---|---|---|
| Supply 221A | Commodity 223A | $100,500 | $95,500 | $101,000 | ... | $100,000 | $600,000 | $0.0500/KWH — 271A | $0.1000 — 271B / 273A | |
| | Capacity | $65,000 | $70,000 | $73,000 | ... | $69,000 | $300,000 | $0.0250/KWH | | |
| | Supply Charge 3,4,5... | ... | ... | ... | ... | ... | ... | ... | | |
| | ... nth Supply Charge | $9,500 | $9,950 | $11,000 | ... | $12,000 | $76,800 | $0.0064/KWH | | $0.1620 |
| Distribution 221B | MAC Adjust Charge 223B | $42,000 | $49,000 | $43,000 | ... | $41,000 | $331,200 | $0.0276/KWH | $0.0400 — 273B | |
| | Delivery Charge | $23,000 | $35,000 | $29,000 | ... | $24,500 | $138,000 | $0.0115/KWH | | |
| | Dist Charge 3,4,5... | ... | ... | ... | ... | ... | ... | ... | | |
| | ... nth Dist Charge | $750 | $800 | $1,200 | ... | $820 | $4,800 | $0.0004/KWH | | |
| Taxes 221C | Supply GRT 223C | $21,500 | $23,000 | $22,000 | ... | $24,000 | $118,800 | $0.0099/KWH | $0.0220 — 273C | |
| | Distribution GRT | $19,300 | $21,300 | $20,500 | ... | $22,000 | $96,000 | $0.0080/KWH | | |
| | Tax Charge 3,4,5... | ... | ... | ... | ... | ... | ... | ... | | |
| | ... nth Tax Charge | $8,095 | $7,200 | $7,275 | ... | $6,320 | $37,200 | $0.0031/KWH | | |
| | | 259 | 261 | 263 | 265 | 267 | 269 | 271 | 273 | 275 |

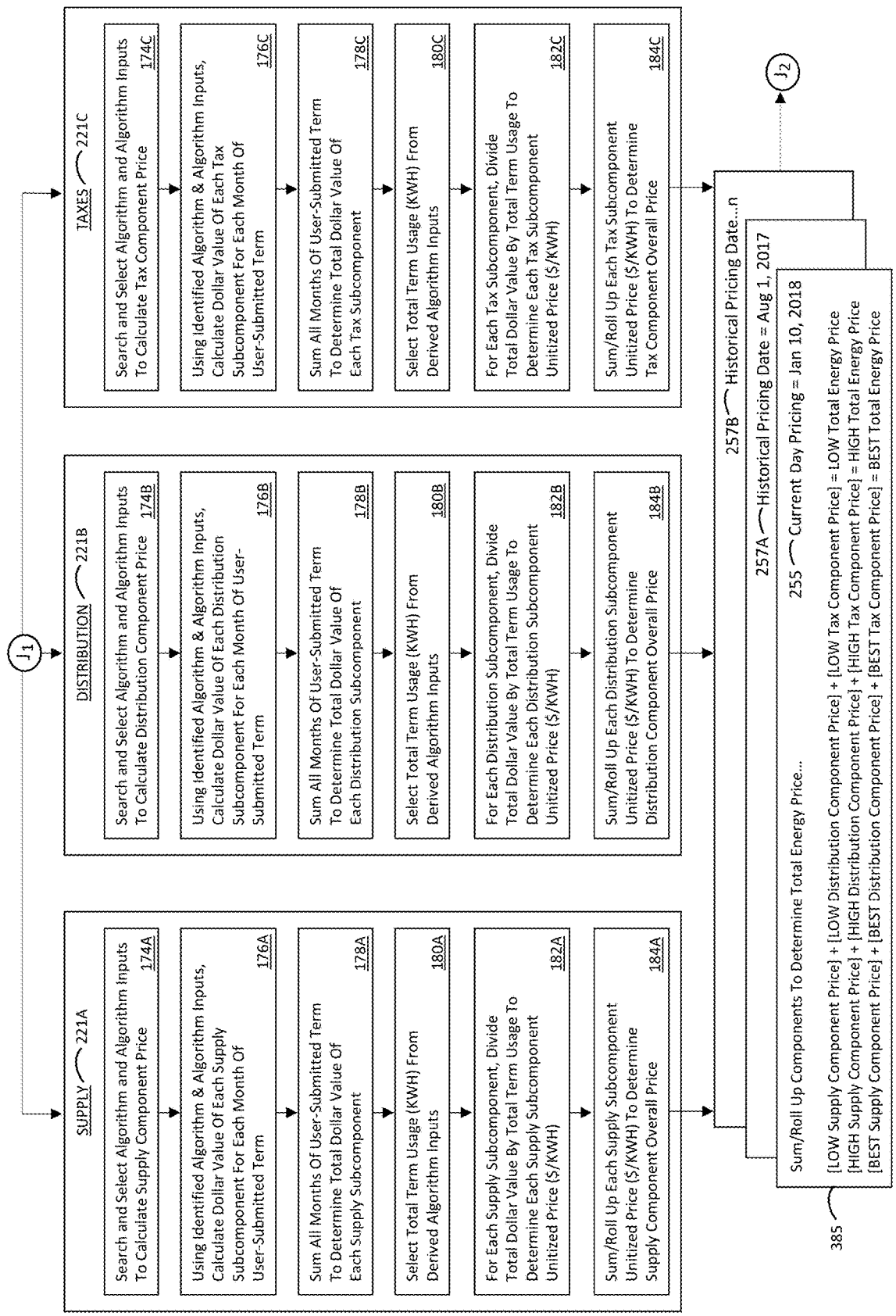

SYSTEM FOR CALCULATING PRICING USING AT LEAST ONE OF TIME DEPENDENT VARIABLES AND PRECONFIGURED PROFILES

TECHNICAL FIELD

The present invention relates to energy price estimates. More specifically, one example provides energy price estimates based on a variety of user-selected, preconfigured facility profiles. Another example provides current day and historical energy price estimates based on processing a pricing request in conjunction with system inputs, tables, parameters, and algorithms, which include effective dates for time dependent, variable data contained within the inputs, tables, parameters, and algorithms.

BACKGROUND INFORMATION

Estimating and tracking energy prices, as of the current day or as of a previous point in time, is an exercise performed by various market participants, including but not limited to, consumers, suppliers, utilities, brokers, sustainability consultants, financial analysts, legal advisors, energy efficient equipment manufacturers, government agencies, grid operators, and energy incentive programs. This energy pricing is typically based on a future start date and a defined term length for a specific facility's energy load. Whether selecting an energy supplier, bidding a consumer's load, estimating an annual energy budget, site-selecting a region with cost effective energy rates, comparing conventional vs renewable power, calculating ROI for energy efficiency initiatives, determining monetary damages in an energy bill dispute, or performing monthly energy bill reviews, energy stakeholders cannot make informed decisions on these matters without an accurate price estimate or benchmark, and preferably one that is easily accessible, calculable, and trackable. Pricing various forms of energy such as electricity, natural gas, and others is a complex process, involving numerous factors that vary with respect to the date of the pricing request, location, grid, utility, type of consumer facility, quantity of energy consumed by the facility, how that energy is consumed throughout a day/month/year, peak demand, future start date, and term length. Supply charges, distribution charges, and taxes, as well as market inputs and pricing algorithms that are unique to each utility/region, must all be taken into consideration, while also considering how each of these factors change with time, including the publication dates and effective dates of such changes.

Although third party suppliers have custom pricing systems, these systems are often limited to providing proprietary prices (or formal bids) for a specific account, and can only provide such pricing based on requesting and obtaining interval or summary meter data from the applicable utility. Obtaining this meter data typically requires executing and processing letters of authorization, pulling historical data, analyzing the data, and iterating back and forth with the utility if the original data pull is incorrect. As a result, this effort can take weeks to complete and often delays the pricing process. In addition, these pricing systems are not designed to calculate at the same time both: (i) the energy price (for a future start date and term) as of the day of the pricing request, and (ii) historical energy prices (for this same future start date and term) as of a date prior to the day of the pricing request, causing market participants to tediously and manually collect and track prices/bids over weeks and months. Because energy is a volatile commodity and the price of an energy bid is only good as of the day of the bid, this manual price collection and historical tracking is repetitively performed on an iterative, one-off basis with each bidding supplier. This is typically done by soliciting bids from suppliers and reading supplier response emails containing time-sensitive, consumer specific, pricing information and then manually updating spreadsheets with such information. Therefore, unless the price is locked-in on the day of the bid, the price/bid will need to be recalculated (refreshed) again and again with each subsequent day to determine a current and accurate energy price for the specific facility load that is being priced. This process is cumbersome for both supplier and buyer, especially if they only need a price benchmark or an immediate price verification. Moreover, this pricing process is only available to energy consumers who are actively bidding their energy accounts, and is not available to peripheral market participants like brokers, sustainability consultants, financial analysts, legal advisors, energy efficient equipment manufacturers, government agencies, grid operators, and energy incentive programs, who also require energy price estimates/benchmarks for a variety of reasons other than energy procurement (e.g., calculating ROI on energy efficiency installations, site selection, bill disputes, etc.). Furthermore, custom pricing systems of third party suppliers are limited to providing supply prices and do not include pricing for distribution and taxes.

For lower volume consumers with non-interval meters, utilities may force third party suppliers to calculate an energy supply price using a single, non-selectable, utility-issued, load profile that may be independent of meter data and the type of facility being priced. This utility profile mainly considers the consumer's location and kilowatt hour (kWh) volume, but largely ignores the specific load profile of the consumer's facility, resulting in one-size fits all pricing, as well as price subsidization across low volume consumers with less than, for example, a 1,000,000 kilowatt hours per year. Suppliers can also provide low volume consumers generic, rack/matrix pricing that does not require meter data because this pricing is pre-calculated and typically refreshed on a daily basis, independent of a specific facility's load. In addition, rack/matrix pricing is mainly based on geographic location and universal volume thresholds, such as annual kilowatt hours. This pre-calculated, rack/matrix pricing is usually distributed daily via two methods: (i) indirectly from suppliers to brokers to consumers, or (ii) indirectly from suppliers to third party websites that are accessible by consumers. Like utility-issued profiles, rack/matrix pricing mainly considers the consumer's location and kilowatt hour volume and largely ignores the specific load profile of a consumer's facility. Because prices are pre-calculated independent of a specific facility load and because these pre-calculated prices may be organized by location and volume, rack/matrix prices can be quickly referenced and accessed simply by inputting volume and location. However, rack/matrix pricing often results in inaccurate, one-size fits all pricing or at best "bucket" pricing and is limited to a fixed number of term lengths based on a fixed number of forward start months. Furthermore, rack/matrix pricing is limited to pre-calculated supply prices and does not include pricing for distribution and taxes.

As a result, the currently available, quickly obtainable energy price estimates/benchmarks (e.g., the third party websites with rack/matrix pricing) are often not reliable, and only applicable to low volume consumers, while meter-based pricing systems (e.g., custom supplier pricing), although accurate, are limited to energy account owners. Moreover, custom, meter-based pricing systems are very iterative and extremely time-consuming for the supplier to calculate a price and the consumer to receive and track current day and historical price information. In addition, both custom and rack/matrix pricing are limited to providing supply prices, and neither include pricing for distribution and taxes.

An example of a presently available pricing system is disclosed in JP 2005025377, which was invented by Takenori Kobayashi et al. and published on Jan. 27, 2005. The transaction price prediction system includes factors such as generator data, power system data, demand data, generator output, generator start and stop times, transmission line congestion, and other data that can factor into an optimal bidding strategy. Thus, this reference is directed less towards determining an all-inclusive, retail consumer price, and more towards the wholesale electricity market and a wholesale market bidding strategy based on the overall supply and demand within the generation and distribution system.

JP2009245044A, which was invented by Tsukasa Onishi and published on Oct. 22, 2009, discloses another system for predicting power prices. The system estimates a bid curve by estimating marginal cost curves, reserves, and profits of competitors, while also taking into account factors such as meteorological data. Like JP 2005025377 above, this system is directed less towards estimating an all-in, delivered retail price to a consumer, and more towards providing wholesale electricity market information to participants in the Japan Electric Power Exchange.

U.S. Pat. No. 7,991,513, which was issued to R. L. Pitt on Aug. 2, 2011, discloses a system for reducing electric bills in a dynamic pricing environment. The system monitors the consumer's metered current, and makes recommendations based on current consumption as well as the utility's pricing structure. Some examples may use remote on/off switches, power reduction circuits, and/or smart appliances to reduce power consumption during times of high consumption and high price. That said, the system is dependent on metered data and provides no way of automatically calculating one or more energy prices based on a user selecting a preconfigured facility load profile that is independent of the consumer's metered load, or automatically processing effective dates of algorithms and algorithm inputs to calculate and present, at the same time, both current day and historical energy prices for supply, distribution and/or taxes.

US 2002/0165816, which was invented by G. L. Barz and published on Nov. 7, 2002, discloses a method of modeling commodity spot prices over time, with the goal of identifying price spikes and fluctuations by integrating fundamental economic cyclic factors associated with the supply and demand of electricity. This method is limited to transmitting spot pricing to a consumer based on macro-economic, market drivers without processing facility load data or calculating supply, distribution and/or tax prices based on this facility load.

US 2004/0215529, which was invented by A. E. Foster et al. and published on Oct. 28, 2004, discloses a system for automated energy price forecasting. Loose forecasting is performed based on the historical demand curve, peak demand, and weather factors. Monthly load data is transformed into an hourly format by matching the customer's load profile with the utility's standard load profile of that customer class. A Monte Carlo simulation process is used to apply random values to uncertain variables to assess the risk of various unknowns. Line losses, system reliability charges, supplier risk premiums, as well as overhead and margin are taken into account in determining a price. Although this system analyzes load profile information and is directed toward calculating an end consumer, supply price, it is predicated on collecting historical, metered load data from the consumer and processing some version of this load data to calculate a supply price. The system provides no way of automatically calculating one or more energy prices based on a user selecting a preconfigured facility load profile that is independent of the consumer's metered load, or automatically processing effective dates of algorithms and algorithm inputs to calculate and display, at the same time, both current day and historical energy prices for supply, distribution and/or taxes.

US 2007/0136217, which was invented by P. Johnson et al. and published on Jun. 14, 2007, discloses a system for capturing and displaying spot pricing for electricity. The consumer can then alter their electricity usage to take advantage of favorable spot pricing. Like US 2002/0165816 above, this invention transmits spot pricing to a consumer without processing facility load data or calculating an all-in, retail energy price for supply, distribution and/or taxes based on this facility load.

US 2011/0029461, which was invented by D. B. Hardin, Jr. and published on Feb. 3, 2011, discloses a dynamic electric power pricing system. The system receives metered load information from residential consumers and dynamic wholesale power pricing information. Based on this dynamic information, the system calculates and transmits how much electrical load can be shed by the residential customer. This system is limited to receiving dynamic wholesale price information and load information from the residential consumer, and provides no way of automatically calculating one or more energy prices based on a user selecting a preconfigured facility load profile that is independent of the consumer's metered load, or automatically processing effective dates of algorithms and algorithm inputs to calculate and present, at the same time, both current day and historical energy prices for supply, distribution and/or taxes.

As the above descriptions show, many presently available systems require historical meter data of the consumer's facility to predict future pricing. Obtaining and analyzing this meter data is very time consuming, and, although the resulting price may be accurate, pricing systems that require meter data do not offer rapid, easily accessible, price estimates or benchmarks. Other presently available systems, such as supplier rack/matrix pricing and standard utility profile pricing, may not require meter data, but rather make assumptions that may not apply to a given facility load. Although these non-metered, pricing systems may rapidly provide price information and may be easily accessible, the accuracy of these pricing systems is limited and are only applicable to low volume consumers. In addition, none of the presently available systems (metered or non-metered) utilize a user-selected, preconfigured facility load profile in calculating price, and none of these systems calculate and present, at the same time, both current day and historical energy prices for supply, distribution and/or taxes.

Accordingly, there is a need for an energy pricing system that can quickly and accurately profile a facility's energy load independent of its meter data, and then calculate and present pricing for supply, distribution, and/or taxes based on that profile, thereby delivering speed without sacrificing accuracy. There is a further need for this rapid, accurate pricing system to be easily accessible and widely available to not only energy suppliers and consumers, who are actively bidding/pricing accounts, but also to peripheral market participants, who require energy price estimates/benchmarks for reasons other than energy procurement. To minimize tediously collecting and tracking energy prices over time, there is also a need for a system to process effective dates of algorithms and algorithm inputs to simultaneously calculate and automatically present, at the same time, both current day and historical energy prices for supply, distribution, and/or taxes.

SUMMARY

The above needs are met by a computer-implemented system for calculating energy prices. The system comprises memory comprising a profile database comprising a plurality of preconfigured facility profiles. Each preconfigured facility profile is divided into a plurality of predetermined time periods, with each time period comprising at least one apportionment factor. The system further includes memory comprising executable instructions to permit selection of one or more of the plurality of preconfigured facility profiles, to receive an energy volume, and to apportion the energy volume among the predetermined time periods according to the apportionment factor within each predetermined time period.

The above needs are further met by a computer-implemented system. The system comprises memory comprising one or more utility databases, with each utility database comprising one or more time dependent inputs, time dependent tables, time dependent parameters, and time dependent algorithms, with each time dependent input, time dependent table, time dependent parameter and time dependent algorithm including an effective date. The system further includes memory comprising executable instructions to select at least one of the one or more time dependent inputs, time dependent tables, time dependent parameters, and time dependent algorithms based on the effective dates of the time dependent inputs, time dependent tables, time dependent parameters, and time dependent algorithms and based on a pricing request. The system further includes memory comprising executable instructions to process the selected time dependent inputs, time dependent tables, time dependent parameters, and time dependent algorithms to calculate pricing.

The above needs are additionally met by a method of calculating energy prices. The method comprises providing a profile database comprising a plurality of preconfigured facility profiles, with each preconfigured facility profile being divided into a plurality of predetermined time periods. Each time period comprises at least one apportionment factor. The method further includes selecting one or more of the plurality of preconfigured facility profiles, receiving an energy volume, and apportioning the energy volume among the predetermined time periods according to the apportionment factor within each predetermined time period.

The above needs are further met by a method of calculating energy prices. The method comprises providing one or more utility databases, with each utility database comprising one or more time dependent inputs, time dependent tables, time dependent parameters, and time dependent algorithms, each time dependent input, time dependent table, time dependent parameter and time dependent algorithm including an effective date. The method further includes selecting at least one of the one or more time dependent inputs, time dependent tables, time dependent parameters, and time dependent algorithms based on the effective dates of the time dependent inputs, time dependent tables, time dependent parameters, and time dependent algorithms and based on a pricing request. The method additionally includes processing the selected time dependent inputs, time dependent tables, time dependent parameters, and time dependent algorithms to calculate pricing.

These and other aspects of the invention will become more apparent through the following description and drawings.

BRIEF DESCRIPTION OF THE DRAWINGS

FIG. 3 is a screen view of another step in the location selection function of the energy pricing system of FIG. 1.

FIG. 4 is a screen view of yet another step in the location selection function of the energy pricing system of FIG. 1.

FIG. 6 is a screen view of the start time selection step of the energy pricing system of FIG. 1.

FIG. 7 is a screen view of a step in the term length selection of the energy pricing system of FIG. 1.

FIGS. 10A-10B are screen views showing subsequent steps in facility profile selection of the energy pricing system of FIG. 1.

FIG. 10C is a screen view showing steps for entering a custom profile of the energy pricing system of FIG. 1.

FIG. 10D is a screen view showing additional steps for entering a custom profile of the energy pricing system of FIG. 1.

FIG. 11 is a screen view showing energy usage volume entry options of the energy pricing system of FIG. 1.

FIG. 11A is a screen view showing additional energy usage volume entry options of the energy pricing system of FIG. 1.

FIG. 11B is a screen view showing more energy usage volume entry options of the energy pricing system of FIG. 1.

FIG. 12B is an example of an initial unit cost input of the energy pricing system of FIG. 1.

FIG. 12C is an example of a zip code input of the energy pricing system of FIG. 1.

FIG. 12D is an example of on and off-peak commodity price inputs of the energy pricing system of FIG. 1.

FIG. 12E is an example of an applicability table of the energy pricing system of FIG. 1.

FIG. 12G is an example of a conversion table of the energy pricing system of FIG. 1.

FIG. 12H is an example of algorithm parameters of the energy pricing system of FIG. 1.

FIG. 12K is an example of price calculations that can be performed by the energy pricing system of FIG. 1.

FIGS. 13A-13G are a flowchart showing an example of the steps executed by the energy pricing system of FIG. 1 to select the appropriate inputs and algorithms, and process these inputs and algorithms to calculate price estimates.

Like reference characters denote like elements throughout the drawings.

DETAILED DESCRIPTION

Figure 1:
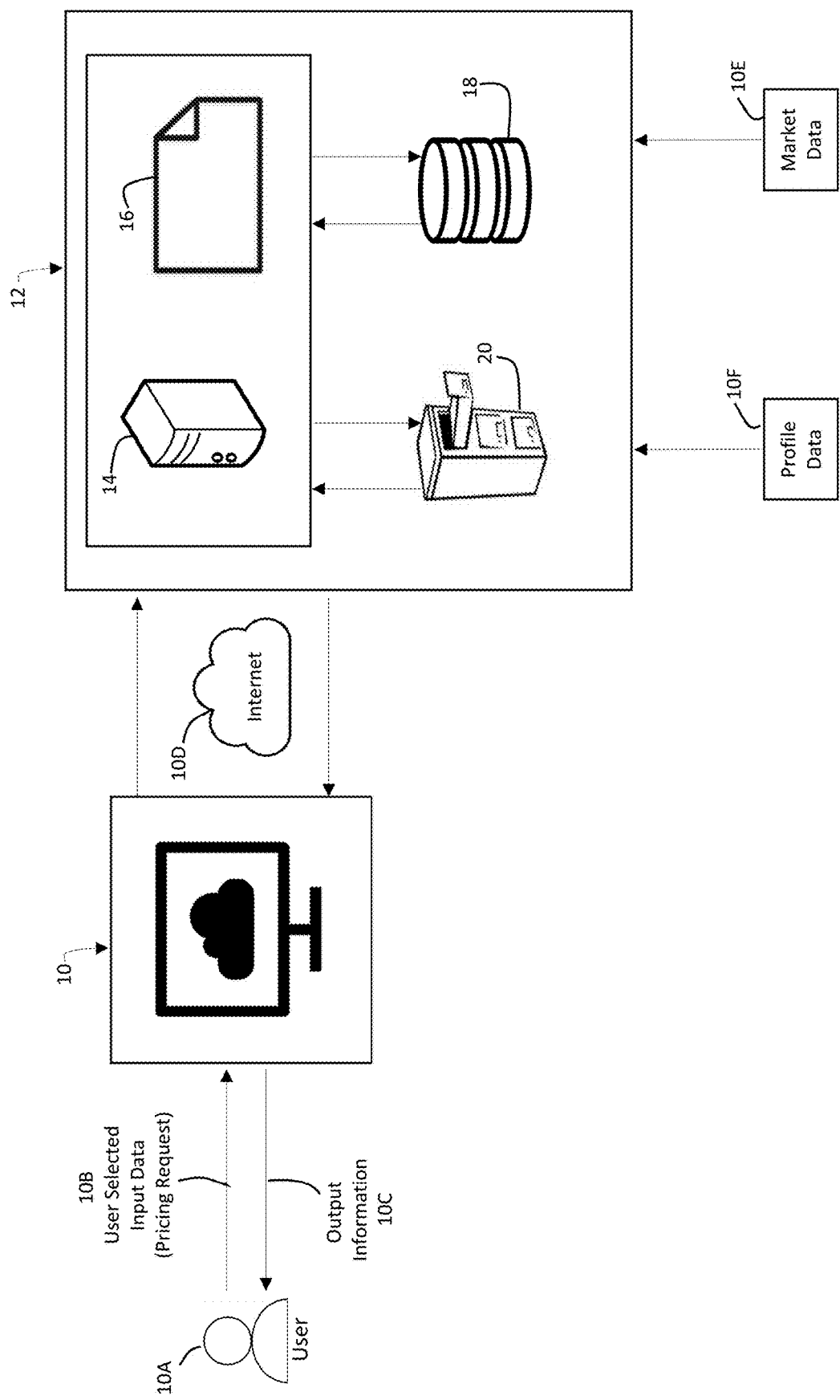
FIG. 1 is a diagrammatic view of the overall energy pricing system.

Referring to the drawings, a system is illustrated for quickly and accurately determining and tracking current day and historical prices, wherein such system is accessible and applicable to all market participants, including but not limited to consumers, suppliers, utilities, brokers, sustainability consultants, financial analysts, legal advisors, energy efficient equipment manufacturers, government agencies, grid operators, and energy incentive programs. Both current day and historical energy prices are often determined by the sum of applicable supply charges, distribution charges, and taxes, all of which may vary based on: (i) market parameters and the cost fluctuations of such parameters, (ii) regional utility and grid cost structures, and (iii) regulatory changes. Whether previously referred to or referred to hereafter, the term "current day price/prices/pricing" shall mean pricing as of the day of the user's pricing request, and the term "historical price/prices/pricing" shall mean pricing as of one or more dates prior to the day of the user's pricing request. In addition, the term "pricing dates" shall mean both current day and historical pricing.

FIG. 1 illustrates the basic elements of the system 12. Although the illustrated example is based on electricity pricing, the system can also be used to price other forms of energy, for example, natural gas. Through a user device 10 that may be a computer, smart phone, tablet, or other similar device, the user 10A submits a pricing request in the form of user-selected input data 10B into the system 12. The system 12 may then automatically process this input 10B and automatically display output information 10C to the user 10A through the user device 10. The device 10 accesses the system 12 through the Internet 10D, interfacing with one or more web servers 14. The web server 14 includes memory 16 having application logic. The web server(s) 14 also interfaces with one or more database servers 18 and one or more database file systems 20, which collectively may contain: user selected inputs 10B; pricing inputs and factors specific to each utility; algorithms that utilize the inputs and factors; and uploaded market data 10E that include values for variables within the algorithms. In addition, the database server(s) 18 and database file system(s) 20 may include: profile data 10F organized by vertical market and facility type; the effective date of each pricing input and algorithm; and calculated intermediate and final pricing values.

Figure 2:
FIG. 2 is a screen view of the location selection function of the energy pricing system of FIG. 1.
Figure 4:
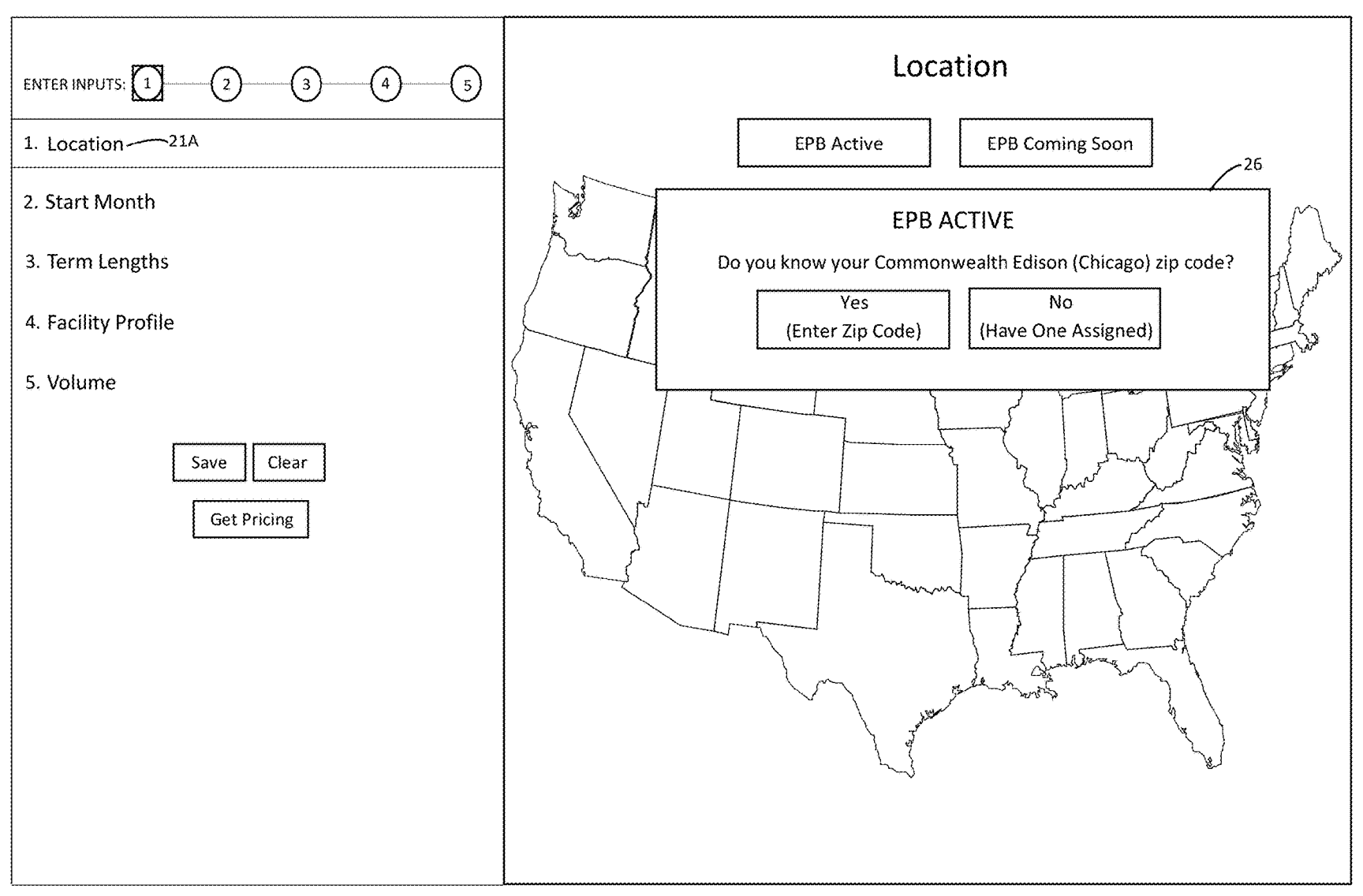
Figure 5:
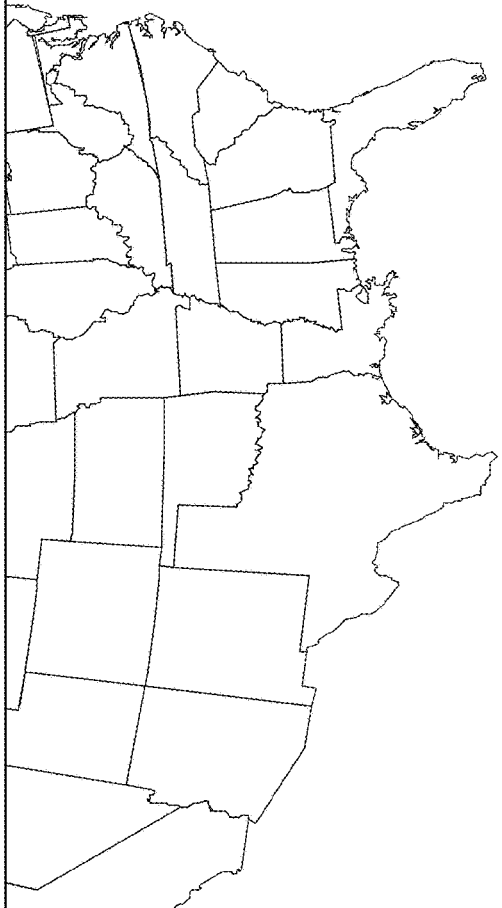
FIG. 5 is a screen view of a further step in the location selection function of the energy pricing system of FIG. 1.
Figure 6:
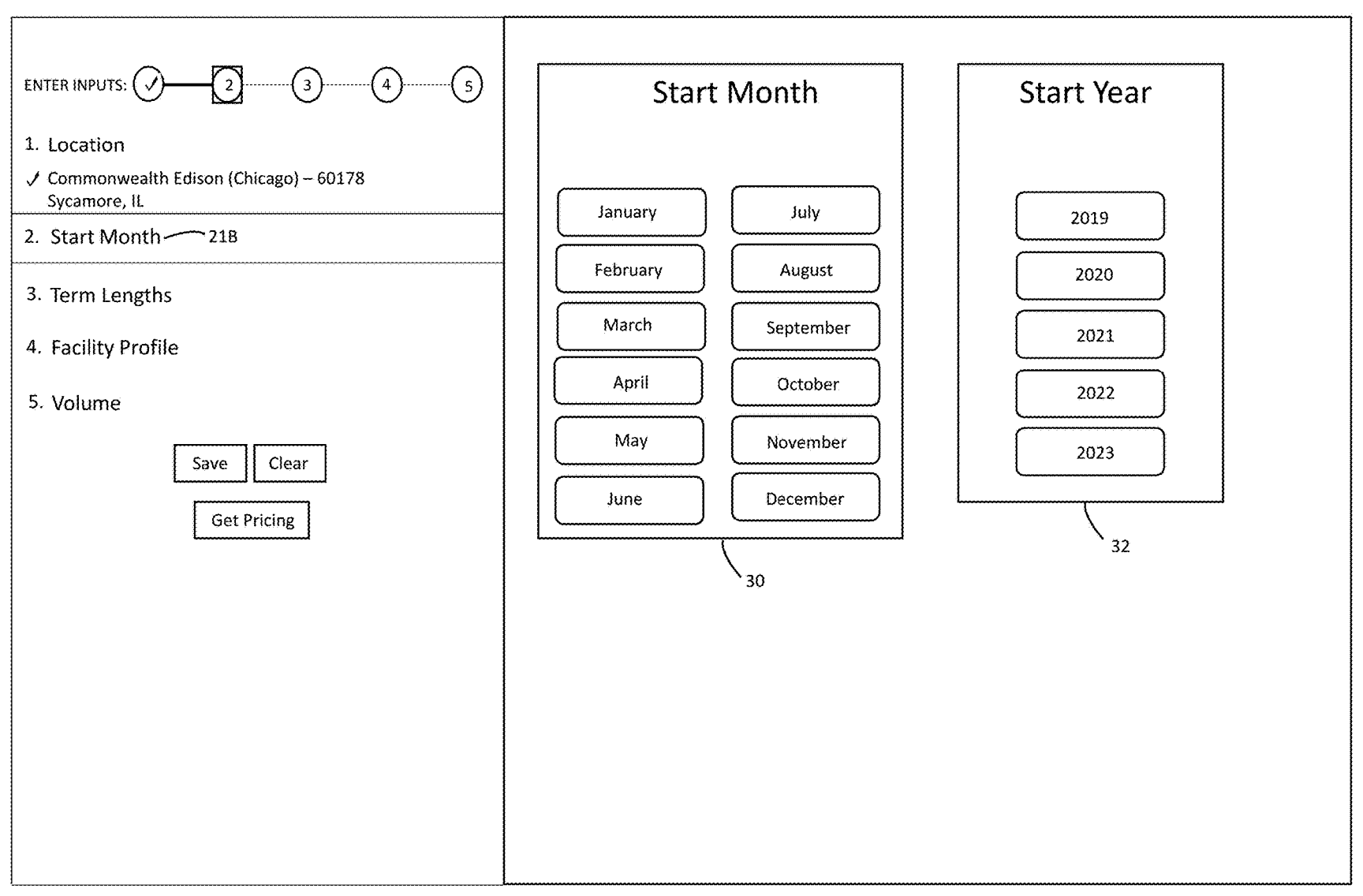
Figure 7:
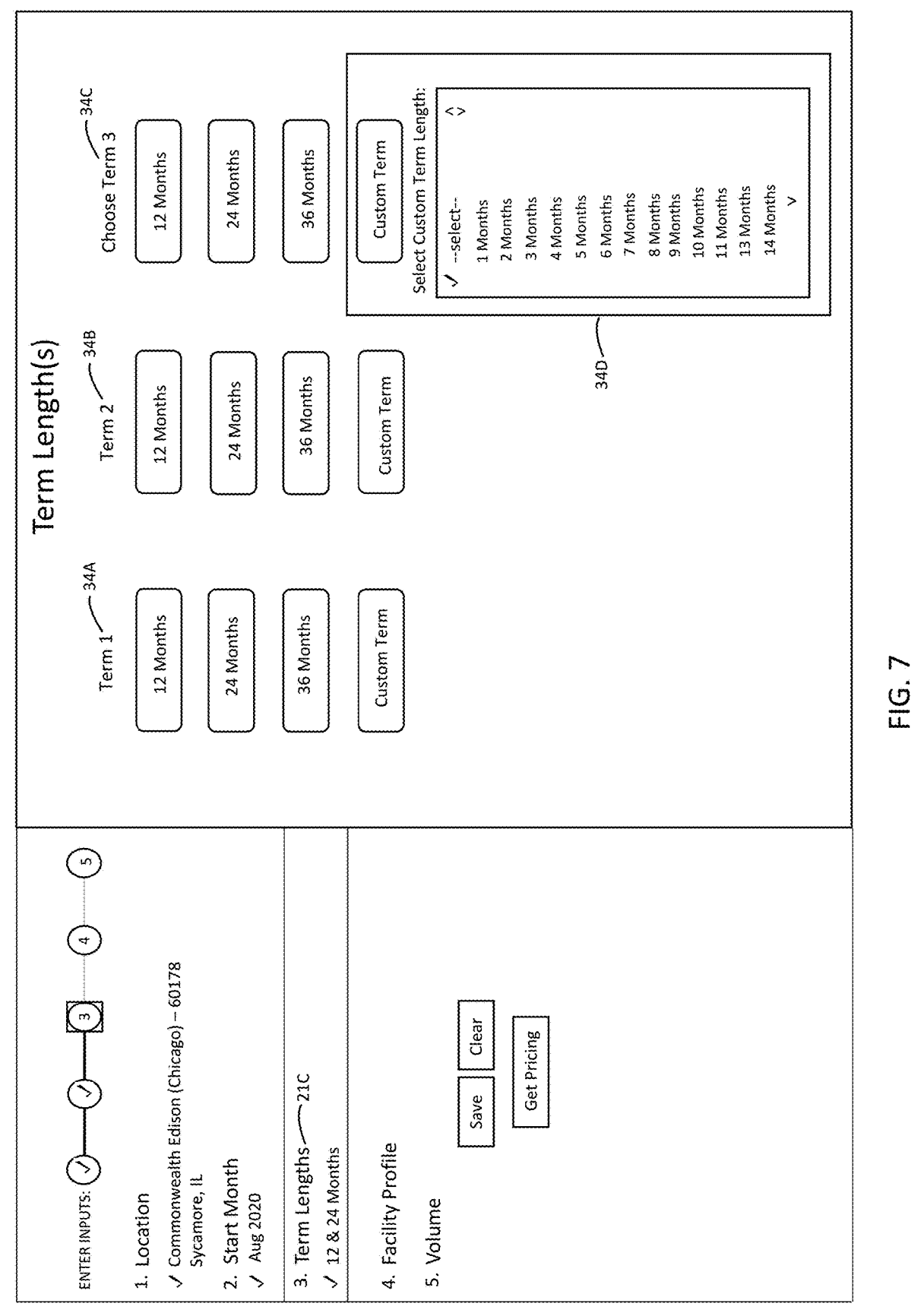
Figure 8:
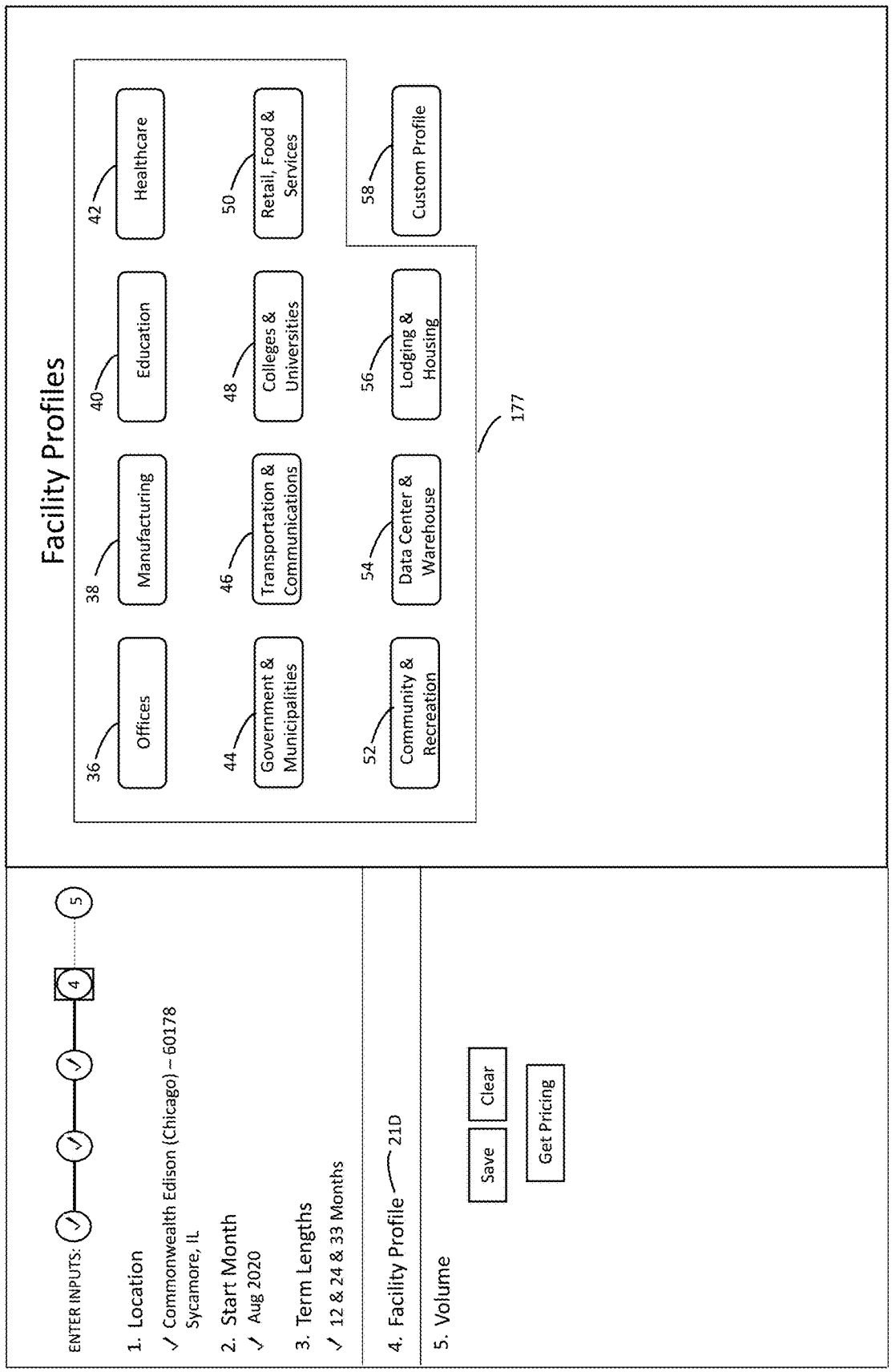
FIG. 8 is a screen view of a first step in facility profile selection of the energy pricing system of FIG. 1

FIGS. 2-11C illustrate the process of the user 10A selecting and submitting information in the form of a pricing request 10B into the system 12. In one embodiment as shown in FIG. 2, these user-selected inputs and pricing request 10B may include: (i) location 21A, (ii) start time (e.g., month) 21B, (iii) one or more term lengths 21C, (iv) one or more facility profiles 21D, and/or (v) volume 21E. In one example, the system's 12 user interface may include a status or progress bar 21F to indicate the number of inputs required and the selection status of each input. In further embodiments, the system's 12 user interface may be organized into an input pane 22A and a content pane 22B whose display or pages vary based on the user's selections. In addition, the system 12 may be programmed to display (or not display) user selections on one or more pages within the content pane 22B. If the system 12 is programmed to display a user selection 22A on a content pane page 22B, the system 12 may be further programmed to present the status of this user-selectable input. For example, utility selections regarding the location input 21A may be presented on the content pane page 22B as "active" 23 or "coming soon" 25. With all of these inputs, the user 10A, in various embodiments, can submit the user-selected inputs into the system 12 at selection 80, save the user-selected inputs at selection 76 to return to the system's input interface at a later time, and/or clear one or more user-selected inputs at selection 78. In FIG. 2, the user 10A selects the location of the facility 21A to be priced by clicking the interactive map 22 in the content pane 22B. Once the location is selected, available utilities within that location 21A are identified. As shown in FIG. 3, if more than one utility is available within a location 21A, the user 10A will be prompted to select one utility from the listed options 24. The user 10A is then asked to enter the site's ZIP Code if known or to request the system 12 to provide an applicable ZIP Code if one is not known, for example, in windows 26 and 28 of FIGS. 4-5. Next, the user 10A may, in one embodiment, be automatically transitioned to select a forward-looking start time 21B from the start month selections 30 in FIG. 6, as well as a forward-looking start year from the selections 32. In various embodiments, the start time 21B may include any time period, such as start month or start day. Term lengths 21C to be priced may be then selected as shown in FIG. 7, from options 34A, 34B, and/or 34C. These term lengths may include predefined periods, such as 12, 24, and 36 month terms, or the options may include a custom term length 34D where the user 10A is able to select a term not included in the list of predefined term lengths. The start time 21B and term length 21C together define the start, end and time period for which energy pricing is desired, and this modular selection construct of start time 21B coupled with term length 21C provides the user 10A with numerous benchmark pricing scenarios.

Figure 9:
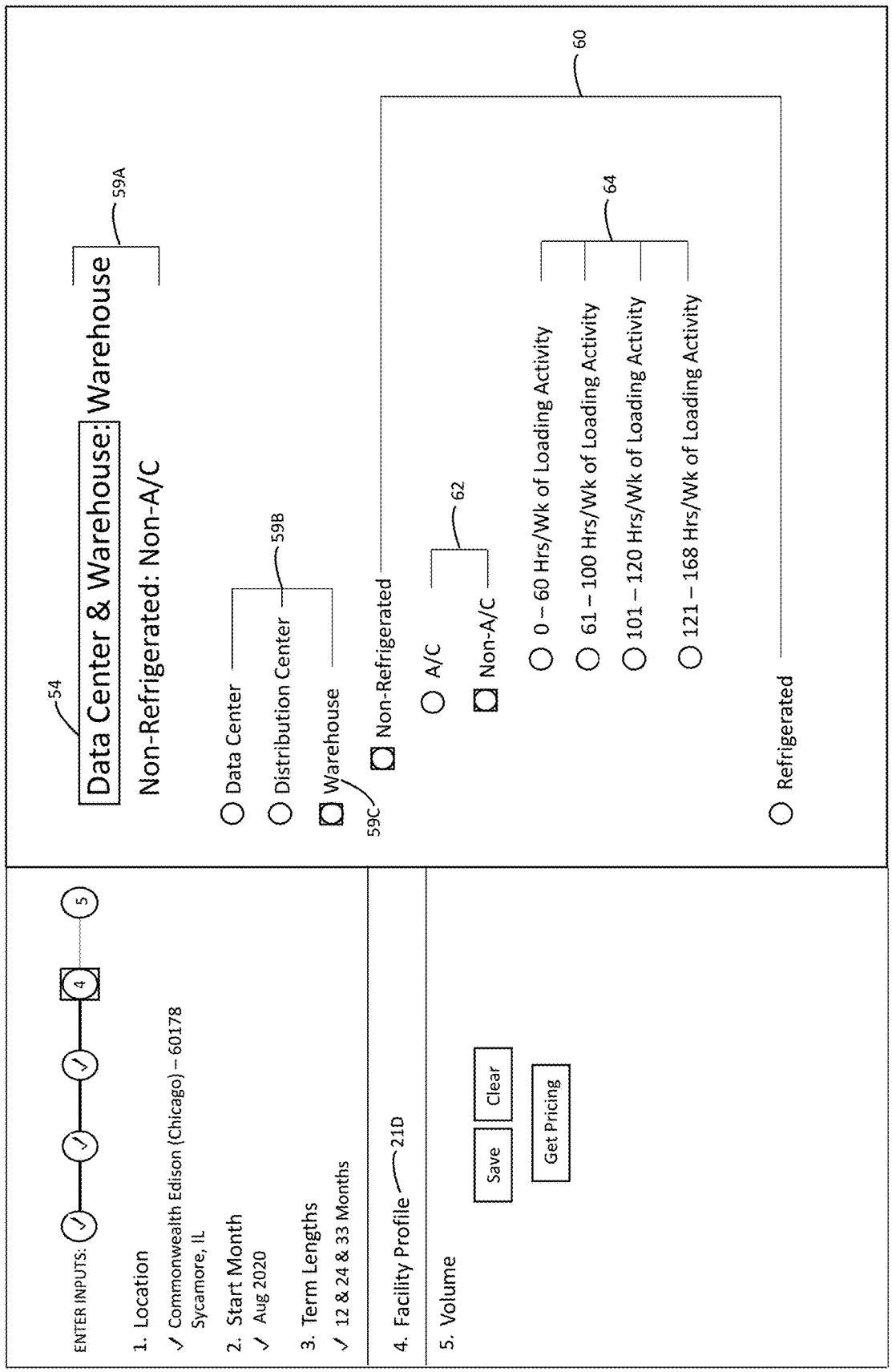
FIG. 9 is a screen view showing subsequent steps in facility profile selection of the energy pricing system of FIG. 1.

FIGS. 8-10B illustrate the selection of a facility profile 21D. The user 10A selecting a facility profile 21D and the system 12 processing this user-selected profile are one of the unique features of the pricing system described herein, and play a significant role in the system's ability to automatically calculate and present pricing information that is both fast and accurate. The system 12 may, for example, contain a hierarchy of 1000's of uploaded preconfigured facility load profiles 177 organized by vertical market and facility type from which the user 10A can easily and quickly select. Within FIG. 8, a user 10A begins selecting a facility profile by first selecting a vertical market that most closely reflects the business of the user 10A. In the illustrated example, the user 10A may select Offices 36, Manufacturing 38, Education 40, Healthcare 42, Government & Municipalities 44, Transportation & Communications 46, Colleges & Universities 48, Retail, Food & Services 50, Community & Recreation 52, Data Center & Warehouse 54, Lodging & Housing 56, or Custom Profile 58. Each of the vertical markets for the preconfigured profiles 177 (36-56) further includes at least one sublayer of facility profile types. For example, if the user 10A selects Data Center & Warehouse 54, FIG. 9 illustrates multiple sublayers of facility profile types, starting with the highest sublayer 59B, which includes radio button options for the user 10A to select: (i) Data center, (ii) Distribution Center, or (iii) Warehouse. If, for example, the user 10A selects Warehouse 59C, Non-Refrigerated and Refrigerated sublayer options 60 automatically appear to the user 10A. Within each facility profile type selection of sublayer 60 is sublayer 62 for air conditioned (A/C) or non-air conditioned (Non-A/C). Within each facility profile type selection of sublayer 62 is sublayer 64 that presents radio button options for the user 10A to select the hours per week of loading activity. As illustrated in FIG. 9, a summary of the user's selections 59A will be visible to the user 10A and automatically updated as the user 10A continues the facility profile selection process.

Another example is shown in FIGS. 10A-10B that define and select a type of manufacturing facility profile under the Manufacturing vertical market selection 38, showing a first sublayer of SIC Code options 66. If the user 10A selects the SIC Code option Primary Metal Industries 67, another sublayer 68, in FIG. 10B, is automatically presented for the user checkbox selection of the various combinations in hours of operation for the specific facility being priced. Other types of manufacturing profile types will have other appropriate combinations of facility profile sublayers. The number and type of facility profile sublayers under each vertical market profile type 36-56 (FIG. 8) most likely will not be the same. To increase the system's speed of pricing without sacrificing accuracy, the number and type of sublayers under a vertical market profile type is unique to that vertical market in an effort to accurately characterize the wide variety of facility profile types within that vertical market and to enable the user 10A to quickly navigate through the vertical markets and sublayers to easily select a profile that best matches the facility being priced. In another example, the selected profile may represent one or more facilities being priced. In yet another example, the system 12 may be programmed for the user 10A to select two or more preconfigured facility load profiles (e.g., [facility 1 university dormitory]+[facility 2 university classroom building]) and then process one aggregated price for the two or more profiles or provide a separate price for each selected profile. In one embodiment, the system 12 may, for example, use checkboxes, radio section buttons, one or more column listings, inline displays, and indented displays to manage the aforementioned hierarchical structure of vertical markets and sublayers that outlay the preconfigured facility load profiles 177 to be selected by the user 10A.

Additionally, in other embodiments as shown in FIG. 10C, the user 10A may enter tabular data 58A that represents a custom profile 58 for the facility being priced based on the user-selected start time/year 30,32 and term length 34. In another example, the custom profile 58 may represent one or more facilities being priced. In yet another example, the system 12 may be programmed for the user 10A to enter two or more custom profiles (e.g., [facility 1 university dormitory]+[facility 2=university classroom building]) and then process one aggregated price for the two or more profiles or provide a separate price for each user-entered, custom profile 58. The tabular data 58A is completely independent of the user 10A receiving meter data and may include values for total usage (kWh), on-peak usage (kWh), off-peak usage (kWh), and peak demand (KW) across a time period, which can be structured on a sub-hourly, hourly, daily, weekly, monthly, quarterly and/or annual basis. Additionally, the user 10A may, for example in FIG. 10D, enter region, grid, or utility specific usage and demand data, such as a capacity tag 58B and a transmission tag 58C. For these demand tags 58B and 58C, the system 12 may enable the user 10A to enter such data by applying a single value to all months 58D, applying multiple values across a range of months 58E, or entering a different value for each month 58F. One use case for custom profiles 58 is for performing "what if" scenarios, for example, by adjusting monthly kilowatt hour loads and/or increasing/decreasing kilowatt demand tags to determine how each adjustment affects the system-calculated, price estimate.

It is important to note that the kilowatt hour usage and kilowatt demand values of a custom profile 58 can be repeatable but do not have to be repeatable. For example, for term lengths greater than 12 months, custom profiles 58 may not simply repeat a 12 month projection over and over, but rather custom profiles may, in one embodiment, enable the user 10A to adjust each month's usage and/or demand projection. Therefore, as further illustration, in a 36 month term with a start time of January 2019, the month of January 2019, January 2020, and January 2021 can all have different usage and/or demand values. In yet another embodiment after custom profile 58 data has been entered, the system 12 may enable the user 10A to categorize the custom profile 58 into a vertical market and/or facility type, which can then be referenced by the system 12 to modify one or more preconfigured facility profiles 177 (see paragraph 66).

Figure 11C:
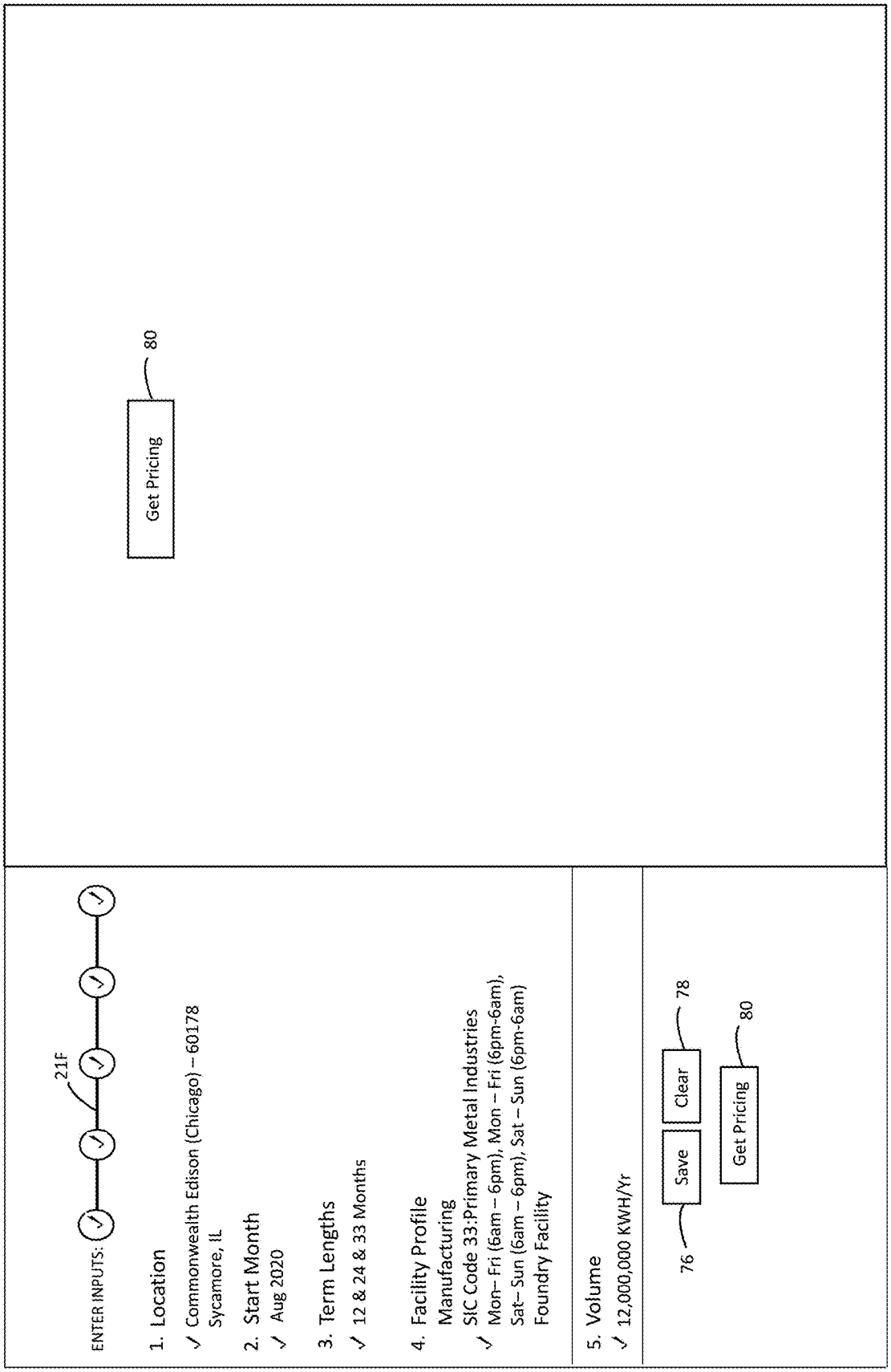
FIG. 11C is a screen view showing additional energy usage volume entry options of the energy pricing system of FIG. 1.

As shown in FIG. 11, the user 10A can choose to input the volume of energy 21E consumed by the facility being priced in terms of: (i) annual kilowatt hour usage at selection 70, (ii) total annual cost at selection 72, or (iii) annual peak kilowatts at selection 74. In one embodiment, the units of measure for these user inputs (70, 72, 74) may include, for example, English or metric standards and/or various types of currency (dollars, euros, etc.). In another example, the system 12 may, in FIG. 11A, provide the user 10A with prompt 82 that asks if the user 10A desires to include a broker fee in the price estimate. If yes, the user 10A may, in FIG. 11B, enter the amount of the broker fee at input 84. As previously referenced (FIG. 2) and with all the aforementioned inputs selected by the user 10A, as illustrated by the completed progress bar 21F in FIG. 11C, the user 10A may "Get Pricing" by submitting the inputs into the system 12 at selection 80. The user 10A may also save the selected inputs at selection 76 to return to the system's input interface at a later time. In yet other embodiments, the user 10A may also clear one or more selected inputs at selection 78. Once selected inputs are submitted into the system 12, the system 12 may then automatically process this information and automatically display an output to the user 10A. In one embodiment, the system 12 may process the inputs and immediately calculate and display the output to the user 10A. In other embodiments, the system 12 may delay processing the inputs and calculating the output for a later time. In yet other embodiments, the system 12 may process the inputs and calculate the output but then cache the results to present/display to the user 10A at a later time.

Figure 12:
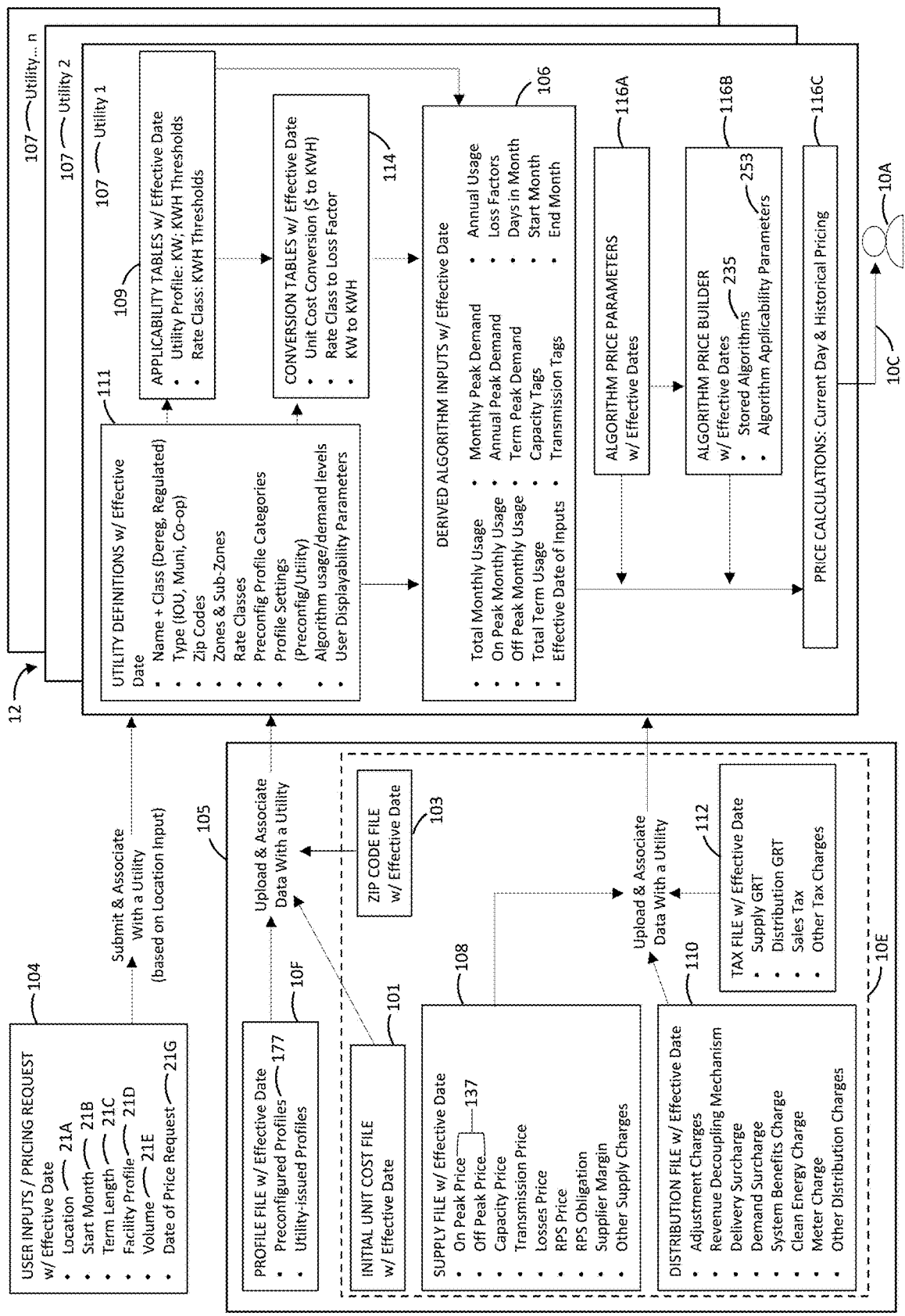
FIG. 12 is a chart showing the overall inputs and elements of the energy pricing system of FIG. 1.

In FIG. 12, various inputs into the system 12 are illustrated, which may include one or more facility market inputs 105 processed by the system 12 to automatically generate a pricing output 10C. In one embodiment, these facility market inputs 105 may be in the form of input files that can be manually or automatically uploaded into the system 12 and may include, for example, one or more profile input files 10F and one or more market input files 10E. According to this embodiment, the market input files 10E may, for example, include the following: initial unit cost files 101, zip code files 103, supply files 108, distribution files 110, and/or tax files 112. These 105 inputs not only vary from utility to utility, but also certain inputs may be added and removed due to ongoing regulatory changes. In addition, the values of the data contained within these 105 input files may dynamically change (some on a daily basis) due to supply and demand market forces. As a result, the facility market inputs 105 and the corresponding input file associated with each input contain not only time dependent, variable data, but also a corresponding effective date to ensure the values of such data are only used for the time period for which it is applicable. In one embodiment, the system 12 processes the effective dates of each 105 input (file) that influence both the selection of the 105 input (files) and the system-calculated output. In another embodiment of the present invention as illustrated in FIG. 12, the system 12 automatically processes the user input/pricing request 104, automatically calculates pricing based on this 104 input, and then automatically displays this pricing 10C to the user 10A. This automation is accomplished by the system 12 first converting a minimal number of high level 104 user inputs (21A, 21B, 21C, 21D, and 21E) previously described in FIGS. 2-11C into derived, utility-specific algorithm inputs 106 based on one or more applicable profile input files 10F and utility-specific, initial unit cost and zip code input files 101, 103. The system may then, for example, process these inputs (104, 10F, 10I, 103) through utility definitions 111, applicability tables 109 and conversion tables 114, thereby converting the five (5) high level 104 user inputs into a larger number of derived algorithm inputs 106, which more fully define the energy load and which are needed by system algorithms to calculate price. In another embodiment, the system 12 may, utilizing effective dates of each market input file 10E, automatically couple this additional, utility-specific, market data contained in supply, distribution and/or tax input files 108, 110, 112 with the derived algorithm inputs 106 and process all of the aforementioned information, via tables, parameters and algorithms 111, 109, 114, 116A, 116B, 235, 253 to simultaneously calculate 116C and then automatically display both current day and historical prices at the same time. In one example, the current day and historical prices may be for forward energy contracts. To simultaneously or concurrently perform/execute an operation or a calculation, the system 12 may, in another embodiment, include two or more processors and/or servers operating in parallel at the same instance.

Referring to FIG. 12, the system 12, in one example, may be organized into 1 to n utilities 107, with each utility comprising its own, unique: utility definitions 111, applicability tables 109, conversion tables 114, derived algorithm inputs 106, algorithm parameters 116A, algorithm builder 116B with stored, preconstructed algorithms 235 each with applicability parameters 253, and price calculations 116C. The data included within each system element (111, 109, 114, 106, 116A, 116B, 235, 116C) can and does change at various points in time for various reasons, such as regulatory changes. Therefore, each of these system elements, and the time dependent, variable data and/or algorithms included therein, is associated with an effective date so that the system element and the data/algorithms it contains is only used for the time period for which it is applicable. Furthermore, the system 12 may, in one embodiment, be programmed to automatically search and select one or more of the aforementioned time dependent system elements and the time dependent, variable data contained therein based on the effective dates of each system element, the start time 21B and term length 21C of user pricing request 104, and the date of the user pricing request 21G. After selecting one or more system elements and the data contained therein (111, 109, 114, 106, 116A, 116B, 235), the system 12 may then concurrently process one or more of the selected algorithms 235 stored within the algorithm builder 116B and the inputs called for by the selected algorithm(s). These algorithm inputs may include, for example, the data contained with the derived algorithm inputs 106, supply input files 108, distribution input files 110, and/or tax input files 112. In one embodiment, the variable value of each time dependent, algorithm data input 106, 108, 110, 112 is associated with an effective date to ensure that the variable algorithm input data is only used for the time period for which it is applicable. Furthermore, the system 12 may select these algorithm inputs, and the variable data values contained therein, based on the effective date of the inputs (106, 108, 110, 112), the start time 21B and term length 21C of user pricing request 104, and the date of the user pricing request 21G. By processing the selected algorithms and corresponding variable input values, the system 12 may, in one embodiment, simultaneously calculate prices 116C for current day and historical pricing utilizing the aforementioned effective dates, and then automatically present this current day and historical pricing to the user 10A at the same time based on a single pricing request. In another embodiment, the system 12 may separately calculate current day and historical prices, and then present the current day and historical prices to the user 10A at the different times.

Different examples of the system 12 may automatically or manually curate information supporting the facility market inputs 105 and their corresponding input files including: (i) market parameters and the cost fluctuations of these parameters, (ii) regional utility/grid cost structures and (iii) the regulatory changes that impact these structures. The system 12 may then automatically or manually update the time dependent, variable facility market inputs 105 with this curated information, as well as automatically and/or manually update one or more of the aforementioned time dependent, variable system elements 111, 109, 114, 106, 116A, 116B, 235, 116C.

Figure 12A:
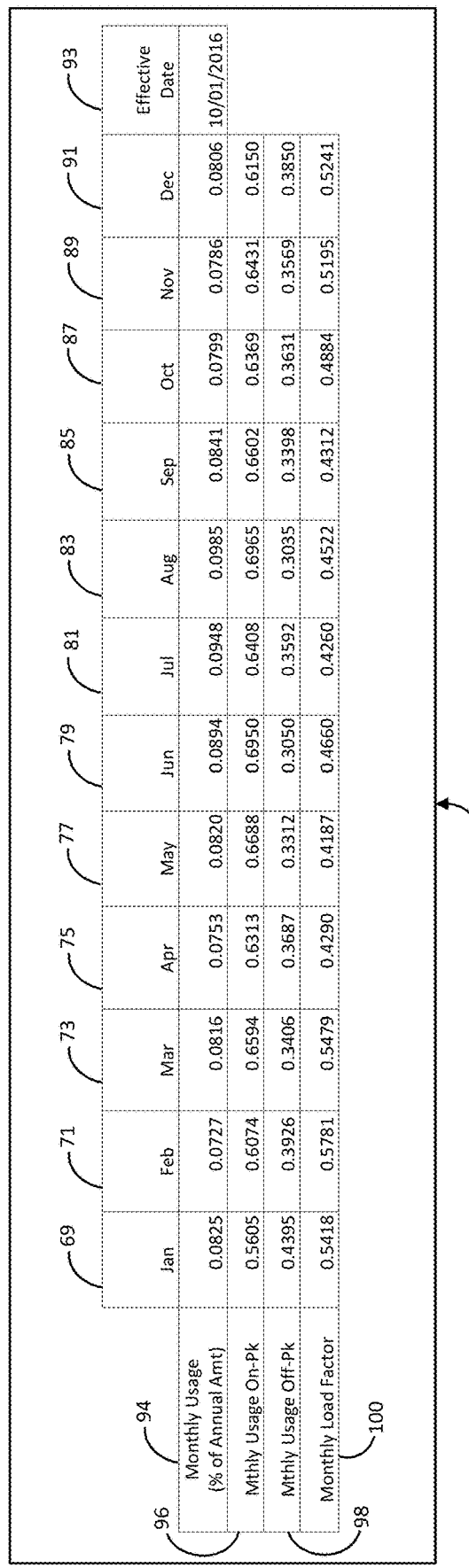
FIG. 12A is an example of information contained within a preconfigured facility profile of the energy pricing system of FIG. 1.

One or more user inputs (21A, 21B, 21C, 21D, and 21E) are shown in block 104, which are user-selected as described above and then submitted into the system 12 in the form of a pricing request with a time-stamped pricing date 21G and matched to a specific utility based on, for example, the location input 21A (see also FIG. 2) Likewise, one or more profile input files 10F and one or more market input files 10E are uploaded into the system, each containing an effective date for the time dependent, variable data contained in these input files, and, upon upload, each 10F and 10E input file is associated with one or more utilities. In one embodiment, the uploading of profile input files 10F and market input files 10E may be completely independent of one another and may be completely independent of user pricing request inputs 104 being selected and submitted into the system 12. Profile input files 10F may, in another embodiment, include utility-issued, facility load profiles and preconfigured facility load profiles 177, wherein each file has an effective date for the data in which it comprises. Although both utility-issued and preconfigured profiles do not depend on collecting/analyzing actual meter data from a specific facility, and thus improve the speed by which the system 12 can automatically calculate and output pricing, utility profiles may result in inaccurate pricing for a specific facility due to modeling a generic usage and demand. Because utility profiles are non-selectable and one-size fits all, the specific load of a facility often gets inaccurately represented, causing grid costs to be misapplied, which in turn reduces pricing accuracy. Preconfigured facility load profiles 177, on the other hand, more accurately reflect the load of a specific facility and are user-selectable based on vertical market and facility type (See FIGS. 8-10B), thereby resulting in not only speed of pricing, but also more accurate pricing. One feature of the present invention that supports this speed and accuracy is that, upon each upload, each input file of a preconfigured facility load profile 177, 10F is categorized and organized by vertical market and facility type for each utility. As previously referenced, the system 12 may contain a hierarchy of 1000's of uploaded, user-selectable preconfigured facility load profiles 177 organized by vertical market and facility type, wherein each of these profiles 177 is supported by a table of usage and demand allocation factors, as shown in FIG. 12A. In other embodiments, the system may contain one uploaded preconfigured facility profile template rather than 1000's of uploaded files. This template may also be supported by a table of usage and demand allocation factors, as shown in FIG. 12A, and the data for this uploaded template can then be calculated (i.e., filled in) by the system 12 based on various system inputs. Although the usage and demand allocation factors may, in one example, vary based on the user input location 21A, these factors can be universally applied to any start time 21B, term length 21C, and volume 21E user inputs 104. In addition, these allocation factors are completely independent of collecting or analyzing the meter data of a facility that is being priced. In one embodiment, the preconfigured facility load profile 177 may represent only one facility, and in other embodiments, the preconfigured facility load profile 177 may represent an aggregate load comprising multiple facilities. Referring to FIG. 12A, each preconfigured facility load profile 177 may, for example, be organized in an input file that is divided into 12 months, as shown by columns 69, 71, 73, 75, 77, 79, 81, 83, 85, 87, 89, 91, for January through December, respectively. For each month, an apportionment factor may be stored in row 94, which represents the portion of the annual energy usage for that month. For each month, additional apportionment factors may be stored in rows 96, 98, which represent the portion of that month's usage that typically occurs on-peak and off-peak, respectively. In one embodiment, another apportionment factor may be stored in row 100, which represents the monthly load factor and equals the average monthly kilowatt demand divided by the peak monthly demand. In one embodiment, the system 12 may be programmed to automatically and/or manually modify profile data 69, 71, 73, 75, 77, 79, 81, 83, 85, 87, 89, 91, 94, 96, 98, 100 based on user-entered data of one or more custom profiles 58 (previously defined in FIGS. 10C and 10D), wherein this custom profile 58 has been categorized in the same or similar vertical market/facility type as the preconfigured facility load profile 177 that is being modified. According to this embodiment, the custom profile data 58 and its categorization (FIGS. 10C and 10D) may stem from one or more unrelated users. In another embodiment, the preconfigured profile data may also be modified by other pre-existing data, such as data collected and trended across custom profiles and data related to the corresponding location input 21A that was entered with the custom profiles. According to this embodiment, the trended data may, for example, be organized by sub-hourly, hourly, daily, weekly, quarterly and/or annual time periods, and may include energy usage kWh, peak demand KW, time of use, locational high, low and average temperatures, and locational heating and cooling degree days. Although the illustrated example in FIG. 12A has this tabular data organized across monthly time periods, other embodiments may format the usage and demand data on a sub-hourly, hourly, daily, weekly, quarterly and/or annual basis. Lastly, an effective date 93 is provided to ensure the preconfigured facility load profile data included in this input file 177 is only used for the time period for which it is applicable.

Referring back to FIG. 12, time dependent, variable market input file information 10E, including any changes/updates thereto, may be automatically or manually curated from various outside sources, such as the utilities, regulatory agencies, grid operators, and others, and then automatically or manually uploaded into the system 12. These market input files 10E are represented by one or more input files, wherein each input file has an effective date for the data in which it comprises and each input file is associated with a utility upon upload. Referring to FIG. 12B, initial unit cost inputs 101 may, for example, be organized in an input file with ranges of volume breaks based on the annual dollars ($) of energy spend 121 and a corresponding initial unit cost 123 for each of these dollar volume break points 121. Additionally, an effective date 125 is provided to ensure the initial unit cost data included in this input file is only used for the time period for which it is applicable. In FIG. 12C, zip code inputs 103 may, for example, be organized in an input file that lists 5 digit zip codes 127, along with the corresponding municipality 129, county/area 131, and utility zone 133 associated with each zip code 127. Additionally, an effective date 135 is provided to ensure the zip code data included in this input file is only used for the time period for which it is applicable.

Referring back to FIG. 12, supply inputs are also illustrated in block 108. In the illustrated example, supply data may, for example, be organized in one or more input files 108 that include the on-peak commodity price, the off-peak commodity price, capacity prices, transmission prices, price of distribution and transmission losses RPS (renewable portfolio standards) prices, RPS obligations, supplier margin, and/or any other charges that may be applicable and that vary by utility. Referring to FIG. 12D, on and off-peak commodity price inputs 137 (FIG. 12) may, for example, be organized in an input file that lists forward contract months 139, along with the corresponding on-peak price 141, 145, and off-peak price 143, 147 for the applicable utility zones for each forward contract month 139. Additionally, an effective date 149 is provided to ensure the on and off-peak price data included in this input file is only used for the time period for which it is applicable. In other embodiments, the remaining supply data listed above (e.g., capacity, transmission, losses, RPS price, RPS obligation, supplier margin) may also be organized in input files similar to the on and off-peak commodity price input file (FIG. 12D), wherein these input files may also contain data values and a corresponding effective date for such data. As previously described, the effective date ensures the supply 108 input file data is only used for the time period for which it is applicable.

In other embodiments, market data input 10E may include distribution files 110 as shown in FIG. 12. In the illustrated example, one or more distribution file inputs 110 may comprise adjustment charges, a revenue decoupling mechanism, delivery surcharge, demand surcharge, system benefits charge, clean energy charge, meter service charge, and/or any other charges that may be applicable and that vary by utility. In addition, this distribution data may be organized in input files similar to the on and off-peak commodity price input (FIG. 12D), wherein these input files will contain data values and a corresponding effective date for such data. As previously referenced, an effective date is provided to ensure the data included in these distribution 110 input files is only used for the time period for which it is applicable.

In yet other embodiments as shown in FIG. 12, market data input 10E may include information about taxes, which is illustrated at block 112. In the illustrated example, one or more tax file inputs 110 may comprise supply gross receipt tax, distribution gross receipt tax, sales tax, and/or any other charges that may be applicable and that vary by utility. In addition, this tax data may be organized in input files similar to the on and off-peak commodity price input (FIG. 12D), wherein these input files may contain data values and a corresponding effective date for such data. Again, this effective date is provided to ensure the data included in the tax input files is only used for the time period for which it is applicable.

Figure 12F:
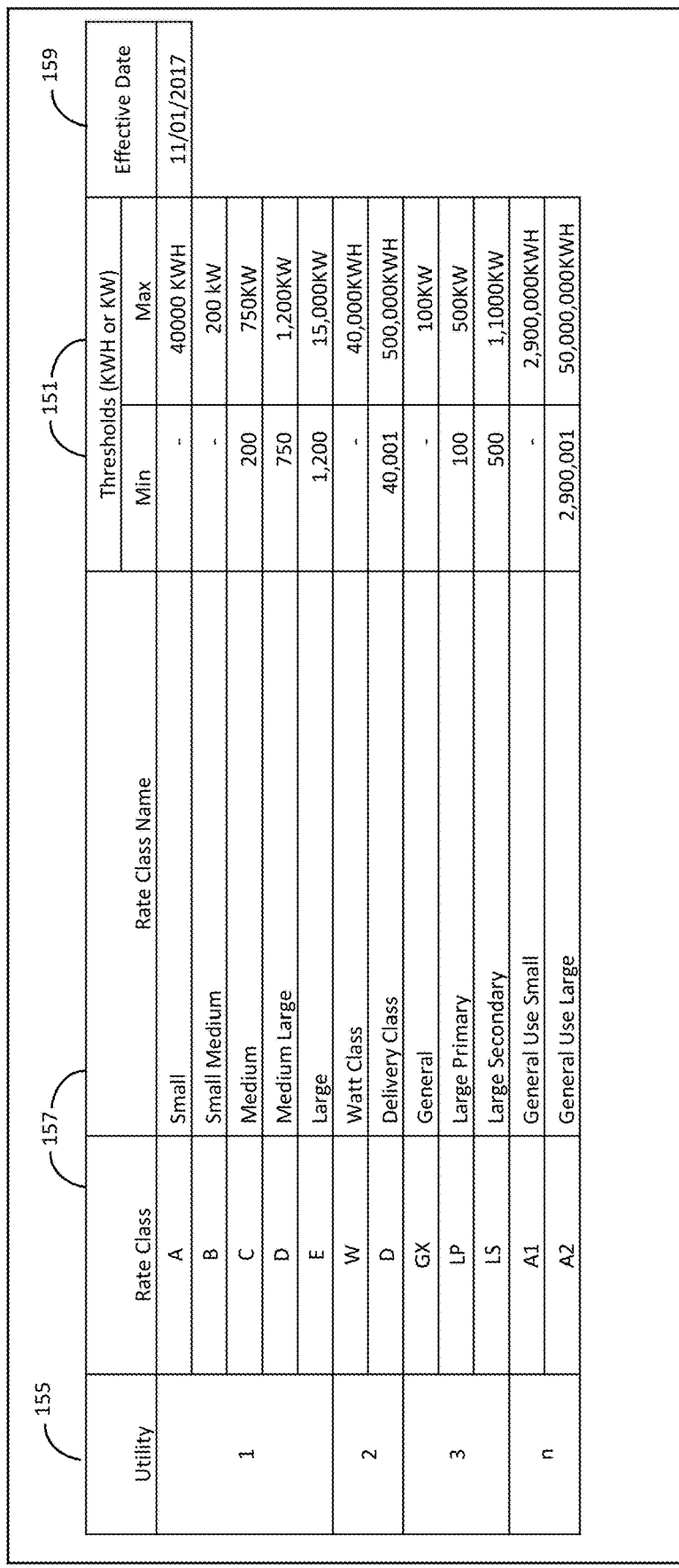
FIG. 12F is another example of an applicability table of the energy pricing system of FIG. 1.
Figure 12I:
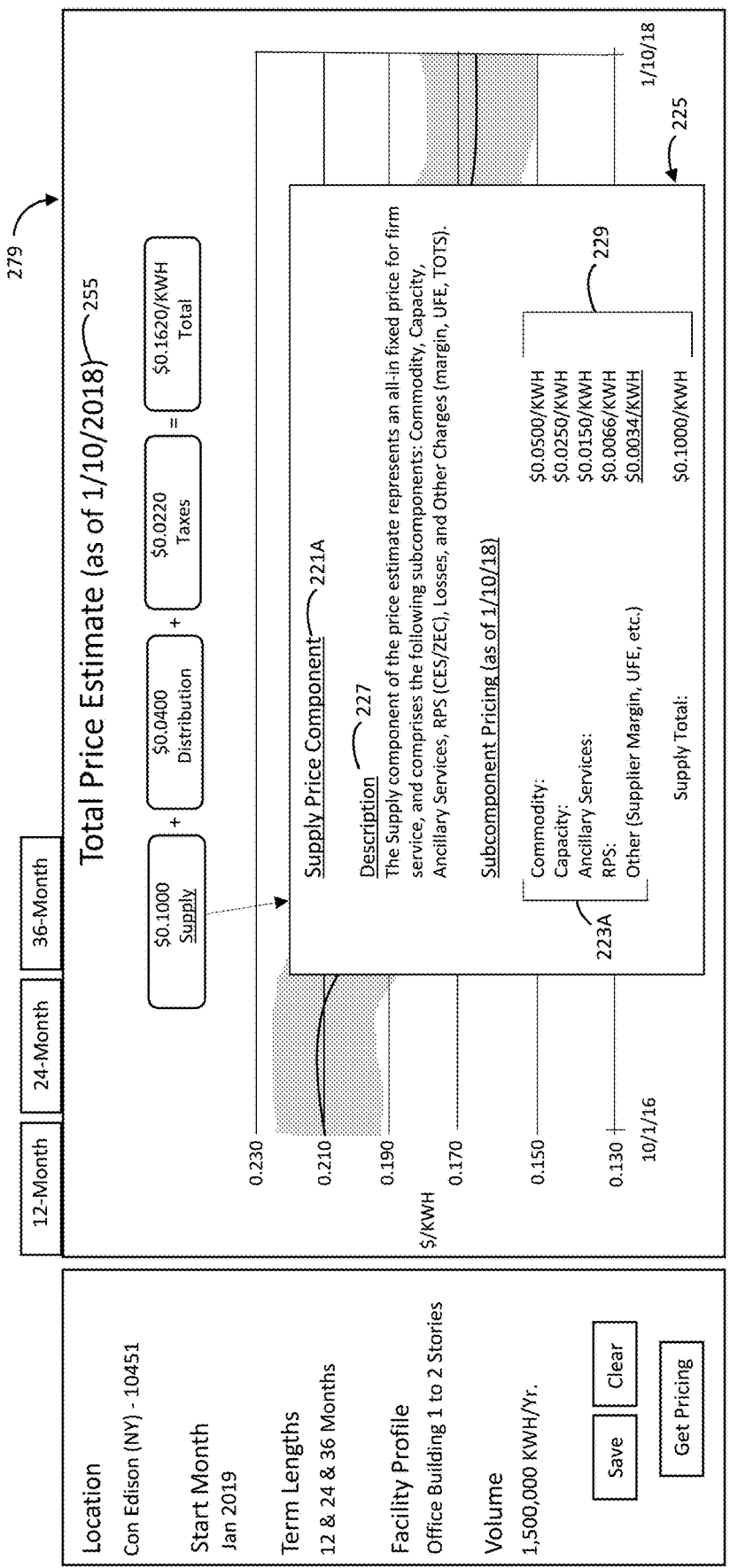
FIG. 12I is a screen view showing a price estimate example determined by the energy pricing system of FIG. 1.
Figure 12J:
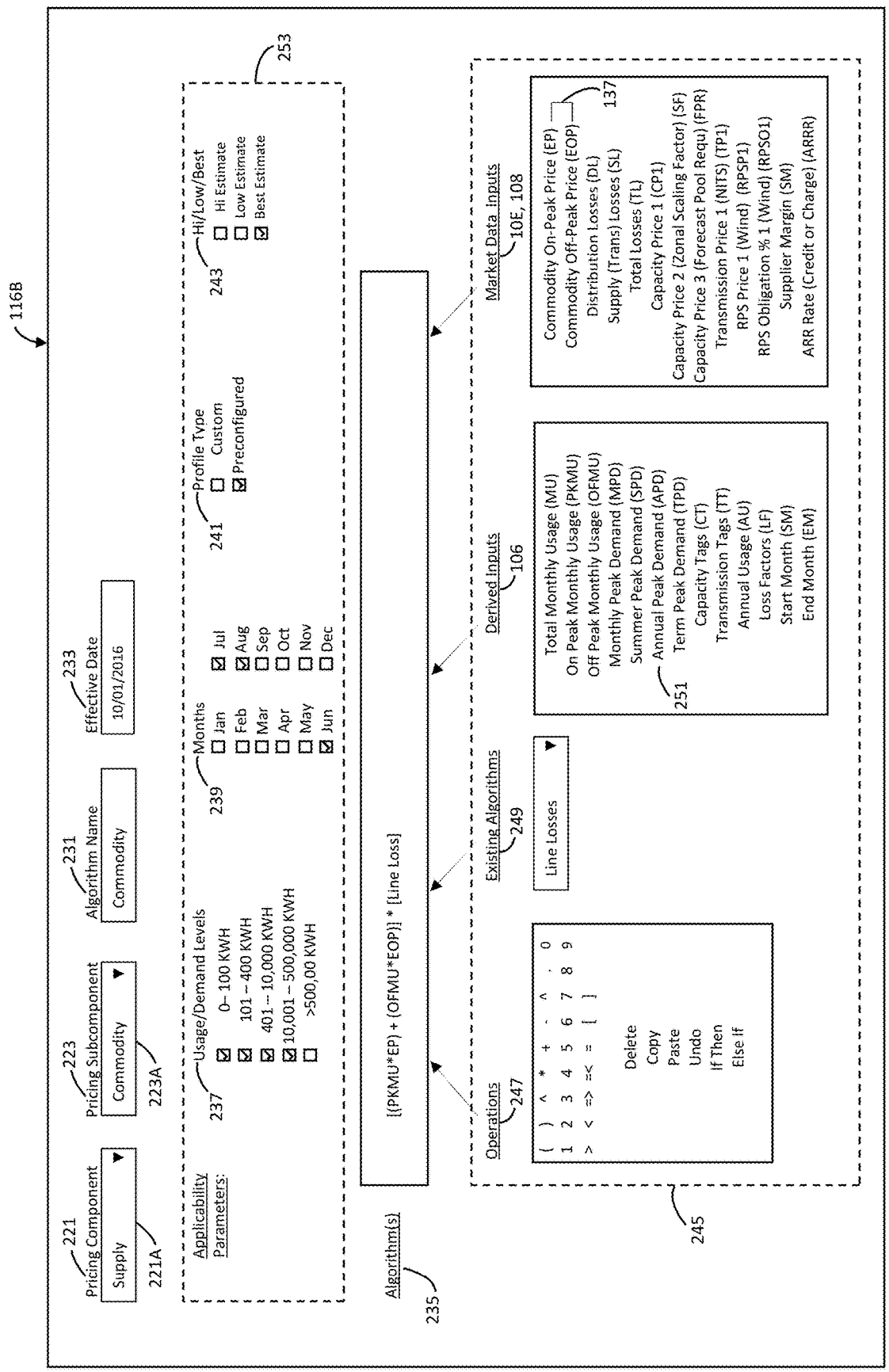
FIG. 12J is an example of an algorithm builder of the energy pricing system of FIG. 1.

Based on the user inputs/pricing request 104, coupled with the information contained in the profile inputs 10F, initial unit cost inputs 101, and zip code inputs 103, additional intermediate algorithm inputs can be automatically calculated and stored in the system 12 at block 106 for further processing. Although these derived algorithm inputs 106 may vary from application to application, the illustrated example includes: total monthly usage, on-peak monthly usage, off-peak monthly usage, annual usage, total term usage, monthly peak demand, annual peak demand, term peak demand, capacity demand tags, transmission demand tags, loss factors, the number of days in each month, start month, end month, effective dates of these inputs, and the date of the user pricing request 21G. To arrive at these derived algorithm inputs 106, user inputs/pricing request 104, profile inputs 10F, initial unit cost inputs 101, and zip code inputs 103 may, for example, be associated/matched with a specific utility via that utility's definitions 111. These inputs may then be processed through the utility definitions 111, which may, for example, include utility name, utility class (deregulated, regulated), utility type (IOU, Muni, Co-op), utility zip codes, utility zones and sub-zones, utility rate classes, preconfigured profile categories based on a hierarchy of vertical markets and facility types, custom profile settings, and utility profile settings. In addition, utility definitions 111 may also include defined annual or monthly kilowatt hour usage levels or kilowatt demand levels, wherein each of these defined thresholds may require unique pricing parameters and algorithms (see Usage/Demand Levels 237; FIG. 12J). In other embodiments, utility definitions may also include user displayability parameters such as rendering the utility as either "active" or "coming soon" on the interactive map 22 (FIG. 2), or displaying "broker fee" options 82, 84 on the volume input page (FIGS. 11A, 11B).

In yet another embodiment, user inputs/pricing request 104, profile inputs 10F, initial unit cost inputs 101, and zip code inputs 103 may also be automatically processed through applicability tables at block 109 and/or conversion tables at block 114. In this automated system of processing the user's pricing request 104, FIGS. 12E and 12F illustrate applicability tables 109. These tables 109 may, for example, be organized by utility 155 and include kilowatt hour usage and/or kilowatt demand thresholds 151 that, when recognized, initiate a process to apply a generic utility profile 153 (FIG. 12E) that is supported by one of the profile input files 10F, or to apply specific rate classes 157 (FIG. 12F). Furthermore in FIGS. 12E and 12F, each applicability table 109 may have an effective date 159 to ensure the table data is only used for the time period for which it is applicable. After specific factors are deemed applicable via the system 12 processing applicability tables 109, the system 12 may then be programmed to automatically employ conversion tables 114. As illustrated in FIG. 12G, the conversion tables 114 may, for example, convert the applicable rate classes 157 that were identified in block 109, FIG. 12F into loss factors for forward contract periods 161. In addition, each conversion table may have an effective date 163 to ensure the table data is only used for the time period for which it is applicable.

In addition to the aforementioned system elements and uploaded and/or calculated pricing inputs, the system 12 may, as shown in FIG. 12, also incorporate algorithm parameters 116A in this automated price calculation. As illustrated in FIG. 12H, the algorithm parameters 116A may define a high level price component 221, wherein the high level component 221 may, in one embodiment, include supply charges 221A, distribution charges 221B, and taxes 221C. In addition, the algorithm parameters 116A may further define the high level price component 221 into one or more price subcomponent levels 223. Similar to other areas of the system 12, the component level 221 and the one or more subcomponent levels 223 may include an effective date to ensure these algorithm constructs are only used for the time period for which they are applicable. In the illustrated example, the subcomponent level for supply charges 223A may include: commodity, capacity, transmission, transmission enhancement, auction revenue rights, ancillary services, and renewable portfolio standards. As also illustrated in FIG. 12H, the subcomponent level for distribution charges 223B may include: monthly adjustment clause (MAC) charges, revenue decoupling mechanism, system benefit charge (SBC), clean energy standard (CES), delivery revenue surcharge, customer charge, energy delivery, metering services, and reactive power. In another example, the subcomponent level for taxes 223C may include: supply gross receipt tax, distribution gross receipt tax, and sales tax. In yet another embodiment as shown in FIG. 12H, the algorithm parameters 116A may be programmed to automatically associate the derived algorithm inputs 106, and the market input files 10E of supply 108, distribution 110, and taxes 112 to the defined price component level 221 and subcomponent levels 223. In another example, the algorithm parameters 116A may include a description field for any of the algorithm components 221, subcomponent 223, and/or inputs 106, 10E. This description field may comprise a written description that explains the algorithm component, subcomponent or inputs. For example, the description data field for "renewable portfolio standards" (listed in 223A) may contain the following verbiage "costs associated with complying to all applicable state mandates for solar, wind and other green power sources." As shown in FIG. 12I dialogue box 225, the algorithm parameters 116A may be programmed, based on the user's 10A subscription plan (e.g., free, basic, premium), to automatically display within an output page 279 one or more price components 221, 221A, subcomponents 223, 223A, descriptions 227, and/or one or more calculated prices 229 for the price components 221, subcomponents 223 and/or 106, 105 inputs listed in FIG. 12 and FIG. 12H.

Referring back to FIG. 12 with the algorithm parameters 116A now defined, the system 12 may curate market and regulatory information, including updates thereto, and then manually or automatically construct algorithms, via the algorithm builder 116B, based on this curated information. As illustrated in FIG. 12J, the algorithm builder 116B may be programmed to automatically and/or manually configure high-level and sub-level algorithms 235 for one or more price component levels 221, 221A and subcomponent levels 223, 223A, all of which are unique to and may vary by utility. The algorithm builder 116B may also include an algorithm name 231 and an effective date 233 to ensure the constructed algorithm(s) 235 is only used for the time period for which it is applies. Given the complexity of calculating energy prices, a single pricing algorithm will rarely apply to all kWh usages and KW demand, or every calendar month, or all facility profiles, or every price value output/estimate. Therefore, the algorithm builder 116B may, in one embodiment, include algorithm applicability parameters 253 that define when the algorithms 235 apply based on: (i) utility specific, usage or demand levels 237, (ii) the months within a calendar year 239, (iii) profile type 241, and (iv) the output of high, low, or best price estimates 243. In the illustrated embodiment of FIG. 12J, the algorithm 235 applies to annual usages equal to or less than 500,000 kWhs 237 for the summer months of June, July and August 239, and calculates the best estimate price 243 for a preconfigured facility profile 241. Similar to a painter arranging and mixing paints using a paint palette, the algorithm builder 116B may, in one example, be programmed to include an algorithm palette 245 and modularly arrange and mix the contents of this palette 245 in constructing algorithms 235 that are specific to a utility. As shown in FIG. 12J, this algorithm palette 245 may include: (i) mathematical operations and commands 247, (ii) existing algorithms 249 that were previously constructed with the algorithm builder 116B, (iii) derived inputs 106 previously described above, and (iv) market input files 10E previously described above. In one embodiment, the derived inputs 106 may vary based on the utility and the profile type selection 241. For example, the algorithm palette 245 may comprise a different set of derived inputs 106 if the user 10A (in FIG. 8) selects a preconfigured facility load profile 177 versus a custom profile 58. Because a custom profile may be based on term peaks rather than annual peaks, an annual peak demand 251 may be listed in the 106 inputs of the algorithm palette 245 for a preconfigured (177) profile type 241, but not listed in the 106 inputs of the algorithm palette 245 for a custom (58) profile type 241. As also shown in FIG. 12J, the algorithm palette 245 may also comprise a different set of market input files 10E based on the utility and pricing component 221 selected. For example, FIG. 12J shows supply files inputs 108 (previously described above) in the algorithm palette 245 because the supply pricing component 221A was selected. If a distribution pricing component was selected at 221, then the algorithm palette 245 may include distribution file inputs 10E, 110 (previously described above) rather than supply file inputs 108. In another example, the algorithm builder 116B may be programmed to not only automatically and/or manually construct algorithms 235, but also store these algorithms along with algorithm applicability parameters 253, wherein these stored, preconstructed algorithms may be automatically retrieved and dynamically deployed by the system 12 if applicable to a user's pricing request 104.

Referring back to FIG. 12 at block 116C, the system 12 may, in one embodiment, be programmed to automatically select and dynamically apply the applicable time dependent algorithms 235 (FIG. 12J) by automatically searching and selecting one or more of the aforementioned time dependent, variable facility market inputs 105 and time dependent, variable system elements 111, 109, 114, 106, 116A, 116B, 235 based on the effective dates of these system inputs and elements, the start time 21B and term length 21C of user pricing request 104 and the date of the user pricing request 21G. After identifying and selecting the applicable algorithms, the system 12 may then dynamically apply the applicable algorithms 235 (FIG. 12J) to simultaneously calculate current day and historical pricing, and then automatically present both current day and historical pricing to the user 10A at the same time. In another embodiment, the system 12 may be programmed to separately execute pricing calculations at block 116C and separately output current day and historical pricing to the user 10A. FIG. 12K illustrates the automated calculations that may be executed at block 116C. Because the price of supply, distribution, and tax components 221A, 221B, 221C, as well as their applicable subcomponents 223, change over time, the system 12 may, in one example, be programmed to automatically search, identify and select the time dependent, variable system elements and inputs used in calculating price based on the effective dates of these system inputs and elements, the start time 21B and term length 21C of user pricing request 104 and the date of the user pricing request 21G. After identifying and selecting the applicable system elements and inputs, the system 12 may be programmed to concurrently execute one or more applicable algorithms 235 (FIG. 12J) to calculate component 221 and subcomponent 223 prices for current day pricing (e.g., Jan. 10, 2018) 255 and/or one or more prior/historical price points (e.g., Aug. 1, 2017) 257A, 257B.

As illustrated in FIG. 12K, the price calculations in columns 259, 261, 263, 265, and 267 may, in one example, utilize algorithms 235 (FIG. 12J) that calculate a best price estimate 243 (FIG. 12J) as of the day of the user's pricing request 255 and/or prior dates 257A, 257B. In other examples, the system 12 may utilize algorithms 235 (FIG. 12J) that calculate low or high price estimates 243 (FIG. 12J) as of the day of the user's pricing request 255 and/or prior dates 257A, 257B. As illustrated in FIG. 12K, the system 12 may calculate in columns 259, 261, 263, 265, and 267 the dollar value of each supply, distribution and tax subcomponent 223A, 223B, and 223C for each month of the term that is defined by and derived from the user-submitted start time 21B and term length 21C (FIG. 2; FIG. 12). In column 269, the system 12 may then be programmed to sum columns 259, 261, 263, 265, and 267 to determine the total dollar value of each supply, distribution and tax subcomponent 223A, 223B, and 223C for the entire, user-defined term. In one example, the system 12 may also be programmed to select the total term kilowatt hour usage 277 from the derived algorithm inputs 106 (FIG. 12), and in column 271 unitize the price of each subcomponent 223 in terms of dollars per kilowatt hour ($/kWh) by dividing the total dollar value 269 by the total term usage 277. In another example, the system 12 may be programmed to sum/roll up in column 273 the subcomponent prices 271 to determine a total price of each price component 273A, 273B, 273C. In yet another example, the system 12 may be further programmed to calculate a total, all-inclusive electricity price in column 275 by summing/rolling up the component prices 273A, 273B, and 273C. After the automated calculations have been completed at block 116C (FIG. 12), the system 12 may, as illustrated on the output page 279 in FIG. 12L, be programmed to automatically present to the user 10A, at the same time, a high 281, low 283 and best 275 price estimate as of the current day of the user's pricing request (e.g., Jan. 10, 2018) 255 and a high 285, low 287 and best 289 price estimate as of one or more dates prior to the day of the user's pricing request (e.g., Aug. 1, 2017) 257A. In another embodiment, this current day and historical pricing may be for one or more total prices 275 and/or supply, distribution, and tax component prices 273A, 273B, 273C. In yet another embodiment as shown in FIG. 12K and on the output page 279 in FIG. 12M, the calculated subcomponent pricing 271, which may include commodity and capacity prices 271A, 271B, may also be presented to the user 10A, via dialogue box 225, in conjunction with the supply, distribution, and tax component pricing 273A, 273B, 273C and total pricing 275. In another example, the system 12 may present to the user 10A calculated results for one or more algorithms 235 (FIG. 12J) used in calculating the subcomponent price 271. In yet other embodiments, all of the aforementioned calculated prices in FIGS. 12K-12M may be organized in terms of currency (e.g., dollars, euros) or unitized rates (e.g., $/kWh, Euros/MWh), and may also be allocated over sub-hourly, hourly, daily, weekly, monthly, quarterly, or annual time periods.

As described above, pricing various forms of energy, such as electricity, natural gas, and others, is a complex process, involving multiple, interrelated system 12 elements (see FIG. 12) and numerous pricing factors/inputs that stem from and are influenced by a variety of market sources (10E FIG. 12). To further complicate this automated pricing process, these system 12 elements (FIG. 12) and pricing factors/inputs may change over time, as well as the values of these pricing factors/inputs, based on the date of the user's pricing request 21G and the forward looking start date 21B and term length 21C for which the user 10A is requesting pricing 104 (FIG. 12). For example in FIG. 12J, the market values of on and off-peak commodity prices not only vary with each utility, but also change at least daily as a result of wholesale hub trading, which in turn causes the on and off-peak commodity price data inputs 137 (FIGS. 12 and 12D) to change (daily), which in turn causes the calculated commodity subcomponent price 223A to change (daily), which in turn causes the calculated supply component price 221A to change (daily), which in turn causes the calculated total price 275 (FIG. 12K) to change (daily). In addition, local, state, and federal regulatory changes, and the publication and effective dates of these changes, may cause the derived inputs 106 and market input files 10E to change, as well as cause the constructed, high and sub level algorithms 235 in FIG. 12J to change for one or more pricing component levels 221 and subcomponent levels 223.

Figure 12L:
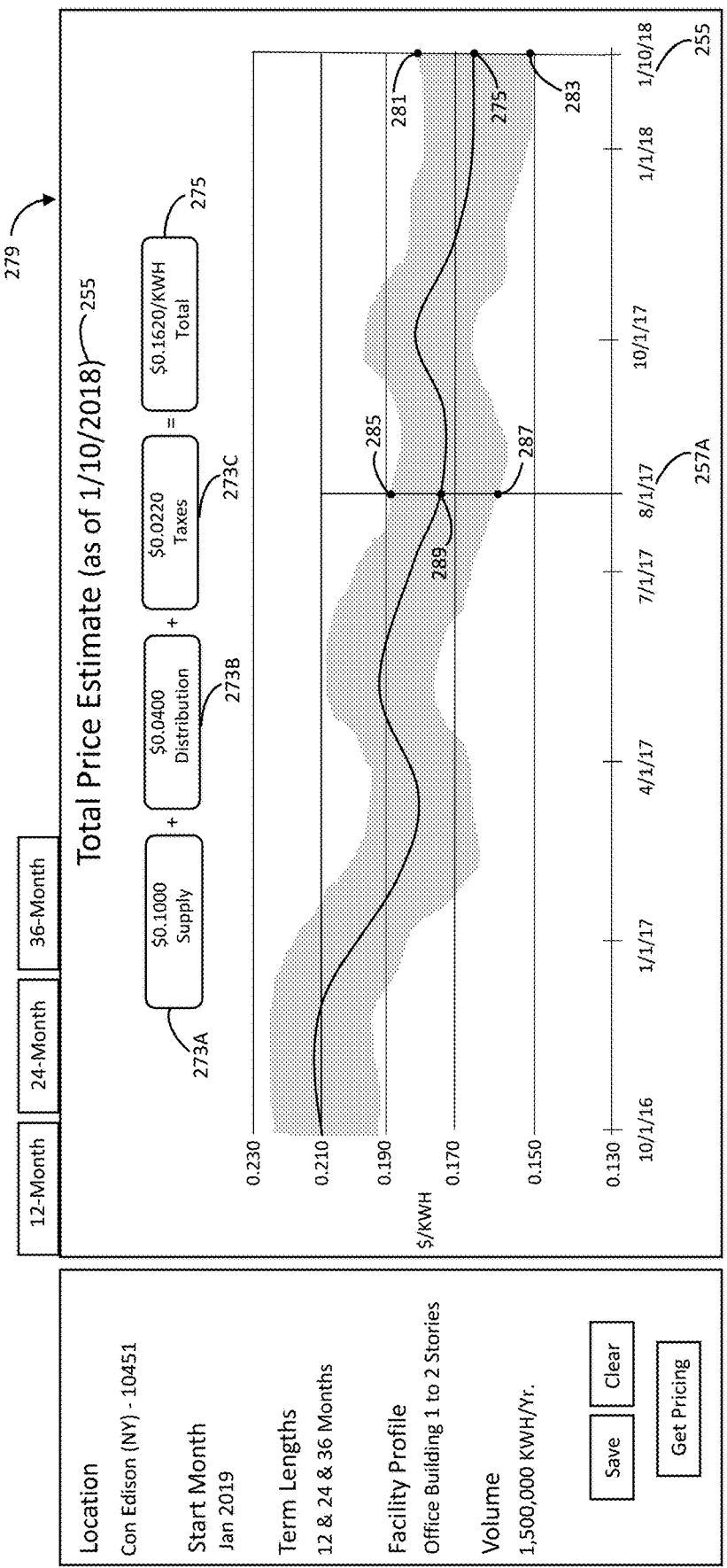
FIG. 12L is a screen view showing another price estimate example determined by the energy pricing system of FIG. 1.
Figure 12M:
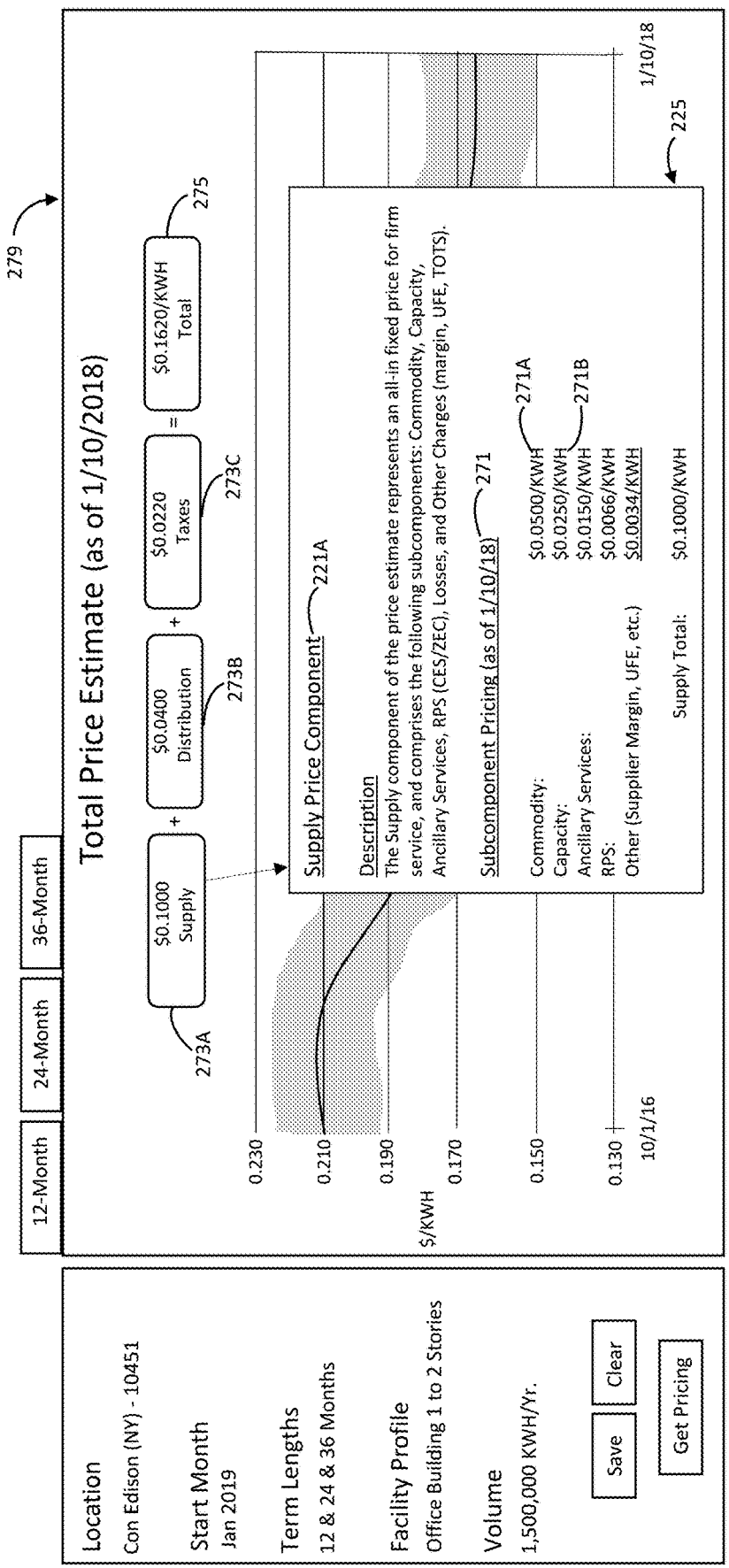
FIG. 12M is a screen view showing yet another price estimate example determined by the energy pricing system of FIG. 1.
Figure 12N:
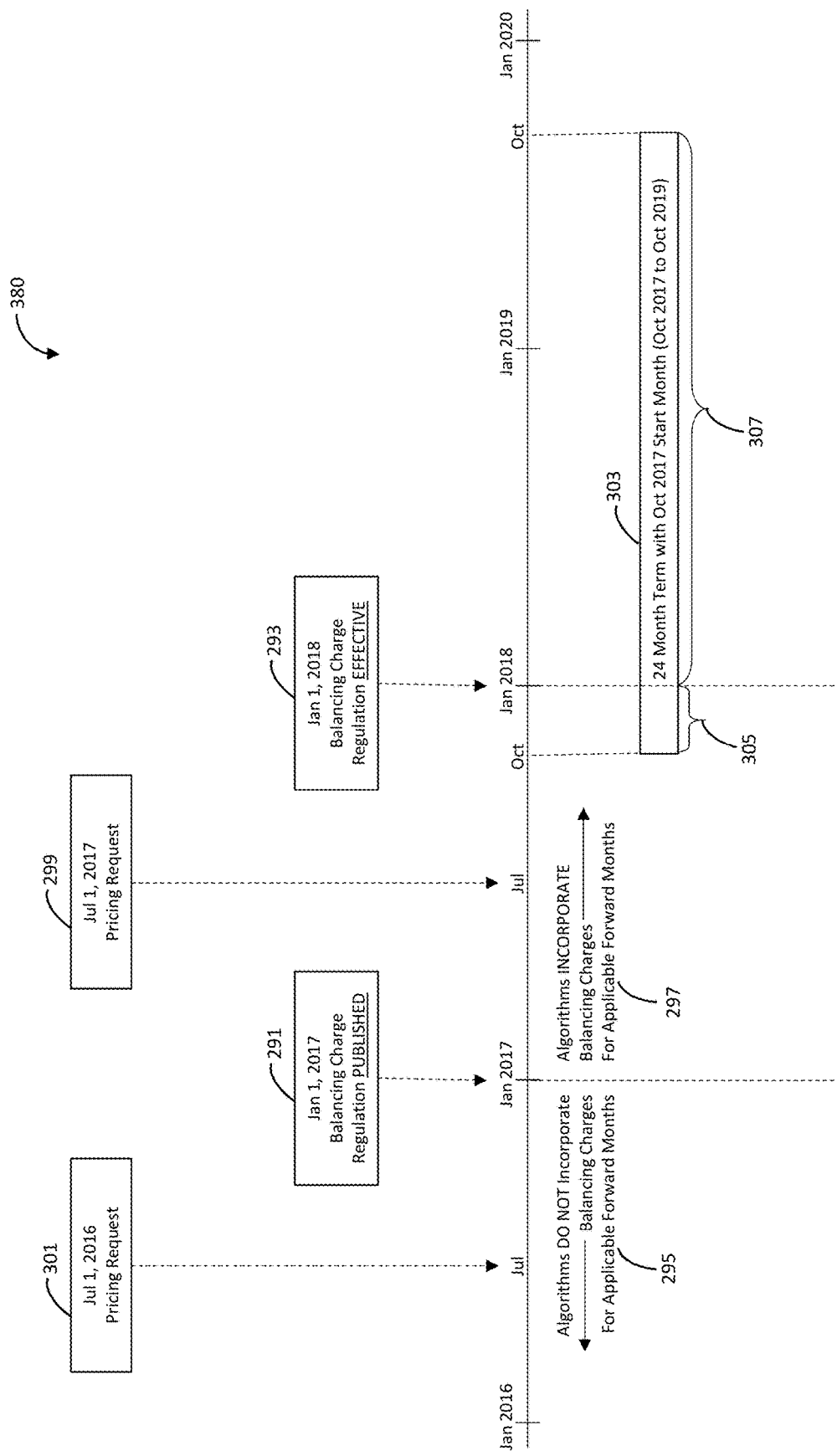
FIG. 12N is a timeline illustrating the effect of the energy pricing system of FIG. 1 processing a pricing request in conjunction with time dependent inputs, which include effective dates

A timeline 380 in FIG. 12N illustrates how the system 12 may, in one embodiment, address the impact of these regulatory changes and further describes how the system 12 processes effective dates to simultaneously calculate and automatically present both current day and historical pricing at the same time based on a single pricing request. Managing effective dates ensures the price output takes into account ongoing market changes that are known as of the date of the pricing request and take effect during the future contract term defined by the pricing request. In this illustration, a regulatory change is published (i.e., is known) on Jan. 1, 2017 at block 291, but does not go into effect until Jan. 1, 2018 at block 293. In the example, the promulgated regulation affects how supply component prices 221A (FIG. 12J) are determined in a utility by adding a new balancing charge. As a result, the system 12 (at block 116C, FIG. 12), may be programmed to assemble the appropriate algorithm(s) 235 (FIG. 12J) and correctly calculate the commodity subcomponent price 223A (FIG. 12J), wherein the time dependent, variable algorithms incorporate this new balancing charge, but only incorporate this charge for the timeframe that the supporting regulation is known, as of the date of the user pricing request 21G, and the supporting regulation is in effect, as of the forward start time 21B and term length 21C defined in the user pricing request 104 (FIGS. 2 and 12). Therefore, as shown in the FIG. 12N timeline, time dependent, variable algorithms with effective dates prior to Jan. 1, 2017 (block 295) do not incorporate the promulgated balancing charge for term lengths that include the forward months of January 2018 or later. However, time dependent, variable algorithms with effective dates on or after Jan. 1, 2017 (block 297) do incorporate the balancing charge for term lengths that include the forward months of January 2018 or later. As a result, if a user 10A submits a pricing request after the publication date 291 on, for example, Jul. 1, 2017 at block 299, and this pricing request is for a twenty-four (24) month term with an October 2017 start time (block 303), the time dependent, variable algorithms will not incorporate the recently regulated balancing charges for the forward months of October, November, and December 2017 (block 305), but will incorporate these balancing charges for the forward months of January 2018 or later (block 307). On the other hand, if a user 10A submits a pricing request before the publication date 291 on, for example, Jul. 1, 2016 at block 301 for the same twenty-four (24) month term with an October 2017 start time (block 303), none of the algorithms will incorporate the balancing charges for any of the forward months of the user-defined term (blocks 305, 307) because this added balancing charge was not known at the time of the pricing request 301.

FIGS. 13A-13G illustrate the process of receiving information from the user 10A, automatically deriving necessary additional information, dynamically selecting the appropriate constructed algorithms, automatically calculating prices, and then automatically presenting to the user 10A both current day and historical pricing at the same time. At any point in this illustrated process, the uploaded facility market inputs 105 and user-selected/submitted inputs 104 (FIG. 12), as well as the derived algorithm inputs 106 (FIG. 12), may be processed, calculated and/or stored by the system 12, and then later retrieved by the system 12 for additional processing. The initial steps are very similar to those illustrated in FIGS. 2-11C. Beginning with FIG. 13A step 118, the user 10A selects the state, wherein the facility being priced is located. Next, the utility is selected at step 120, and the facility ZIP Code is entered at step 122. With the location thus defined, the start time for the desired forward contract is entered at step 124, and one or more term lengths of the contract are entered at step 126. Next, the user 10A is given the choice of selecting a preconfigured facility load profile, or entering a custom load profile at step 128. In one embodiment, the system 12, at step 128, may also be programmed for the user 10A to select two or more preconfigured facility load profiles and/or enter two or more custom load profiles, wherein these profiles represent multiple facilities. If a custom load profile is initiated, usage and demand data is entered at step 138, as described above in FIGS. 10C and 10D. If a preconfigured facility load profile is selected, the vertical market or overall type of business is selected at step 130. A first facility type subcategory is selected at step 132, and in the illustrated example, the days/hours of operation are selected at step 134. In other examples, more than one facility type entry step may be included (as described above in FIGS. 8-10B). Next, the volume can be inputted at step 136 as annual kilowatt hour usage 70 (FIG. 11), annual cost 72 (FIG. 11), or annual kilowatt peak 74 (FIG. 11). If a custom load profile is initiated (in step 128), usage and demand data is entered at step 138, as described above in FIGS. 10C and 10D. In another embodiment, after this custom load data is entered, the annual volume of electricity may not be entered by the user 10A, but rather at step 140, the annual kilowatt hour volume and/or annual kilowatt peak demand may be automatically calculated by the system based on the user-entered, monthly usage and demand data. As a result, the annual volume input may, in one embodiment, be prepopulated with the system-calculated annual kilowatt hour volume and/or annual kilowatt peak, and at step 400, these calculated values may be presented as read only to the user 10A. With the volume either directly entered by the user at step 136 (preconfigured profile) or calculated by the system 12 in step 140 (custom profile), the user may, in another embodiment, be given the option, at step 170, to enter a broker fee to be included in the calculated price.

Figure 13A:
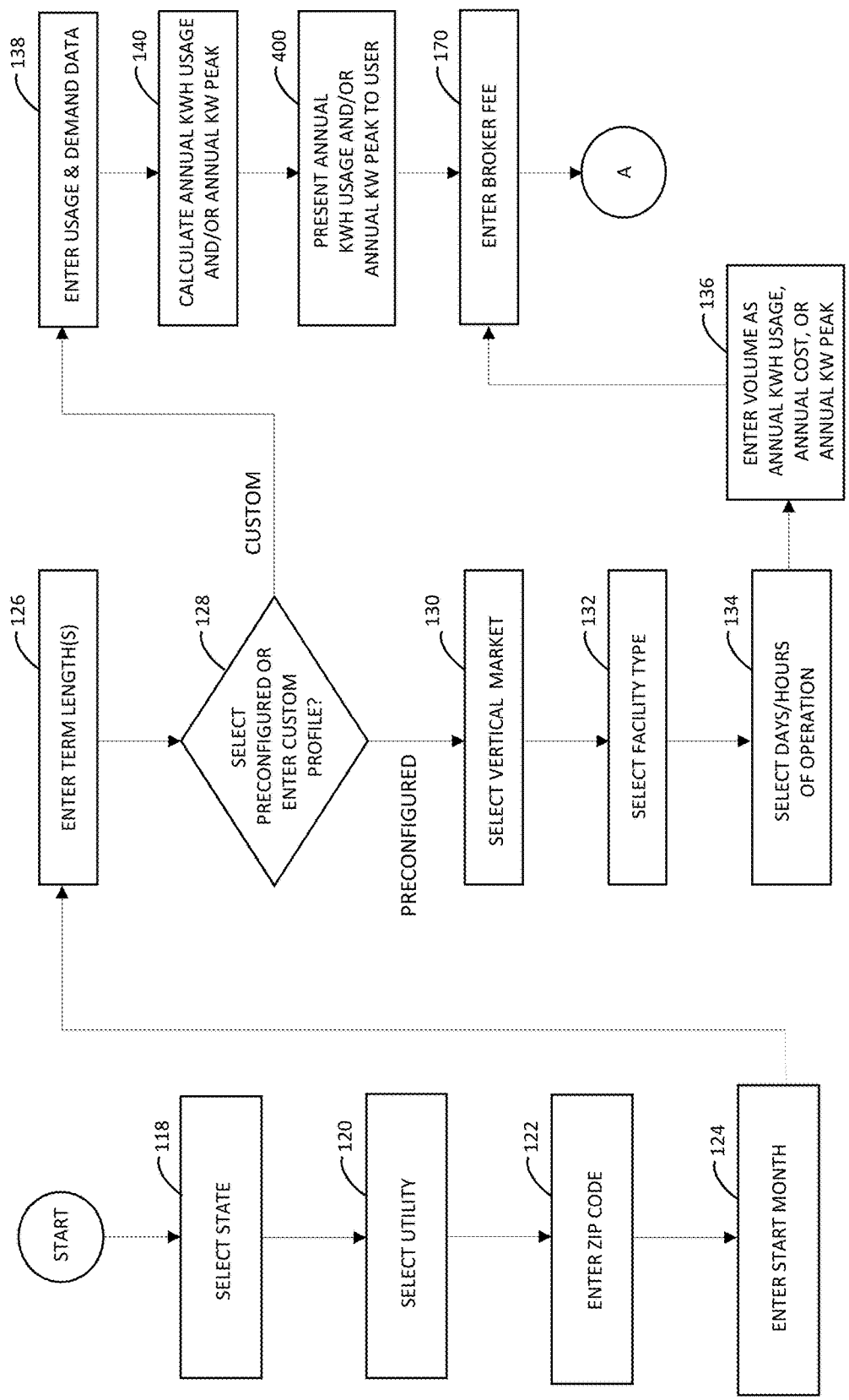
Figure 13B:
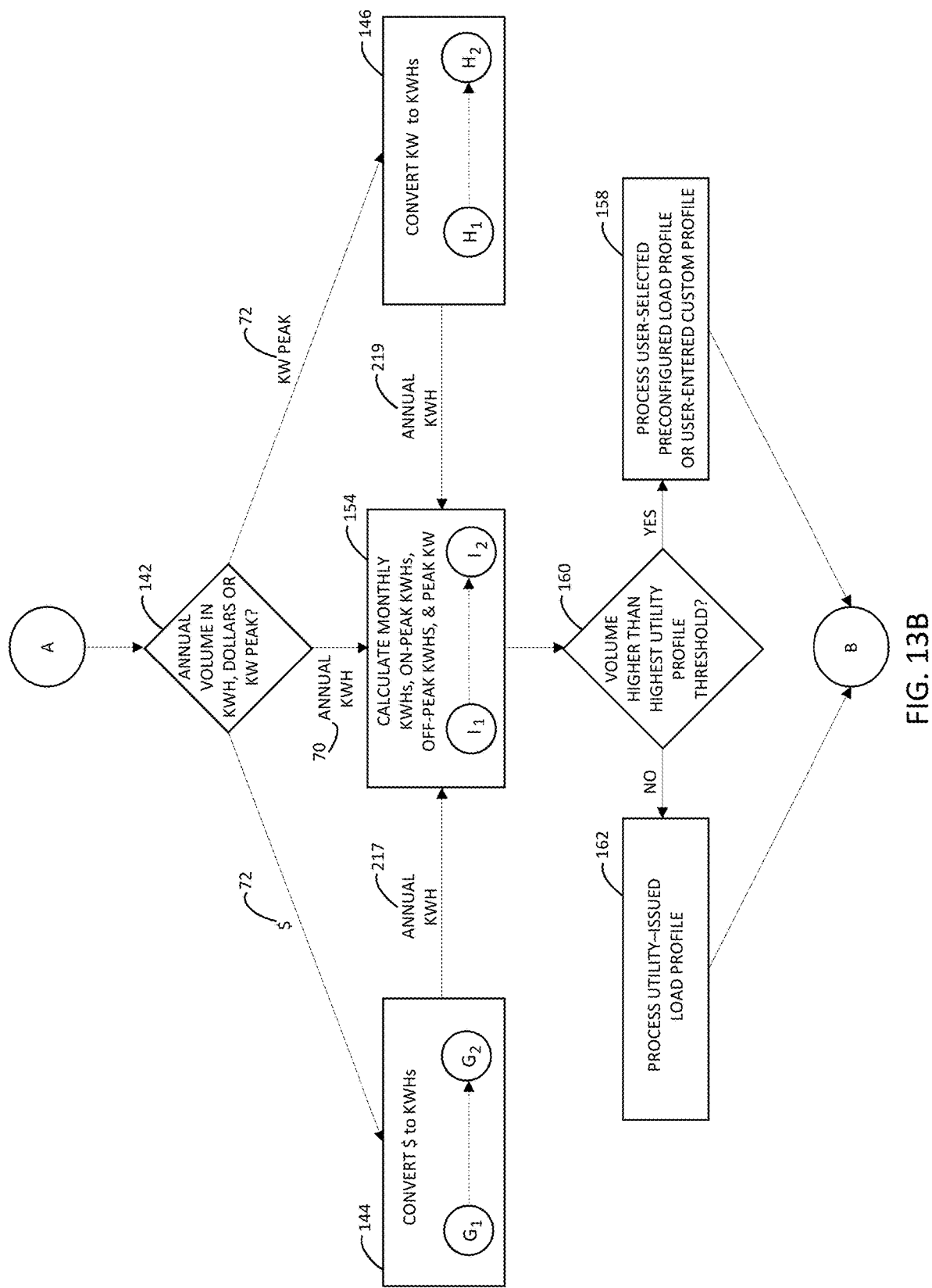

To automatically calculate price based on the appropriate load information, the illustrated example first ensures that the volume input includes the total number of annual kilowatt hours, which may be stored as part of the derived algorithm inputs 106 (FIG. 12). As shown in FIG. 13B at step 142, if the volume input (21E in FIG. 2, FIG. 12; and 70, 72, 74 in FIG. 11) is in a format other than annual kilowatt hours, then one or more conversions 144, 146 may occur based on the system 12 processing one or more applicability tables 109 and/or conversion tables 114, which were described above in FIG. 12. If volume is expressed in terms of annual total cost 72, then that dollar amount is converted to annual kilowatt hours at step 144. In one embodiment, the calculated annual kilowatt hour values may be stored as part of the derived algorithm inputs 106 (FIG. 12). FIG. 13D illustrates a sample conversion process detailing step 144. This conversion process begins at step 167 where the system 12 receives, for example, $534,819 as an annual cost input 72. At step 169, the system 12 may then reference the applicable utility's initial unit cost files 101 (FIGS. 12 and 12B) and identify a conversion factor 165 of [0.16] that is associated with the total cost input 72 of $534,819. At step 171 of FIG. 13D, the system may be programmed to divide the total cost input 72 ($534,819) by the applicable conversion factor 165 (0.16), and then at step 173, transmit and/or store for additional processing the calculated annual kilowatt hour value 217 of 3,342,618 kilowatt hours.

Referring back to FIG. 13B, if volume is expressed in terms of annual kilowatt peak 74, then that kilowatt amount is converted to annual kilowatt hours at step 146. In one example, the calculated annual kilowatt hour values may be stored as part of the derived algorithm inputs 106 (FIG. 12). FIG. 13E illustrates a sample conversion process detailing step 146. This conversion process begins at step 179 where the system 12 receives the 1000 KW annual kilowatt input 74. At step 181, the system may obtain the monthly usage allocation factors 94, and monthly load factors 100 from the user-selected, preconfigured facility load profile 177 (see also 21D FIG. 12), which was selected in step 128 (FIG. 13A). In one embodiment, the process may, in step 193, calculate the number of days in each month 175 of the term that is derived from the user-submitted start time (entered in step 124) and term length 21C (entered in step 126). For example, if the user 10A selected January 2020 for a start time 21B (FIGS. 2 and 12) and 24 months for the term length 21C (FIGS. 2 and 12), the process would calculate the days in each of the 24 consecutive months, starting with January 2020 and ending with December 2021. For each month of the user-defined term, the system 12 may, at step 183, also be programmed to calculate a month factor by multiplying the load factor 100 by the number of days in the month 175, and then the monthly usage allocation factor 94 is divided by this result. Referring to FIG. 13E, the results of this calculation are shown in the row designated as reference character 102 in step 183. The highest value of the month factor calculations is identified at step 185, which in the illustrated example is [0.00718] for the month of July 187. At step 189, annual kilowatt hours are then determined by multiplying the 1000 KW annual peak 74 (from step 179) by 24 (hours per day), and then dividing this result by the [0.00718] highest month factor 187. At step 191, the system 12 may then transmit and/or store for additional processing the calculated annual kilowatt hour value 219 of 3,342,618 kilowatt hours, as illustrated in FIG. 13E.

Referring back to FIG. 13B with the total kilowatt hours per year determined, the usage and demand allocation factors of the user-selected preconfigured facility load profile can now, at step 154, be utilized to calculate kilowatt hours, on-peak kilowatt hours, off-peak kilowatt hours, and kilowatt peak values for each month of the user-defined term. In one embodiment, these calculated kilowatt and kilowatt hour values may be stored as part of the derived algorithm inputs 106 (FIG. 12). FIG. 13F illustrates a sample calculation detailing step 154. These calculations begin at step 195 by receiving annual kilowatt hours 70 (FIG. 13B) or the calculated annual kilowatt hours (217 and 219; FIG. 13B), which in the illustrated example is 3,342,618 kilowatt hours. According to this example, the system may be programmed, at step 199, to apportion the annual kilowatt hour input 3,342,618 (from step 195) with the user-selected preconfigured facility load profile 177, and at step 201, calculate the number of days in each month 175 of the term that is derived from the user-submitted start time (entered in step 124) and term length 21C (entered in step 126). In step 203, the system may execute the following calculations for each month in the user-defined term: monthly kilowatt hours, monthly on-peak kilowatt hours, off-peak kilowatt hours, and monthly kilowatt peak. Monthly kilowatt hours 205 may, in the illustrated example, be calculated by multiplying the 3,342,618 annual kilowatt hours (from step 195) by the monthly portion of the annual energy usage in row 94 of the user-selected preconfigured facility load profile 177. Monthly on-peak kilowatt hours 207 may also be calculated by multiplying the monthly kilowatt hours 205 by the monthly on-peak portion 96 of the user-selected preconfigured facility load profile 177, and monthly off-peak kilowatt hours 209 may be calculated by multiplying the monthly kilowatt hours 205 by the monthly off-peak portion 98 of the user-selected preconfigured profile 177. In the last part of step 203, the monthly kilowatt peak 211 is calculated by dividing the monthly kilowatt hours 205 by 24 (hours per day) and by the number of days in that month 175, and then dividing this quotient by the monthly load factor 100 of the user-selected preconfigured facility load profile 177. At step 213, the system 12 may then transmit and/or store for additional processing the calculated kilowatt hours, on-peak kilowatt hours, off-peak kilowatt hours, and kilowatt peak for each month of the user-defined term.

Referring back to FIG. 13B with the appropriate user facility information now determined, the system, at step 160, must decide whether the regulations of the applicable utility regarding lower volume facilities require the price to be calculated by using the utility-issued profile 153, 10F (FIG.

12E). As previously referenced in FIG. 12E, each utility 107 (FIG. 12) may contain unique applicability tables 109 that include annual kilowatt hour usage and/or kilowatt demand thresholds 151. When the system 12 recognizes these thresholds, the system 12 initiates a process to apply a generic utility-issued profile 153, 10F to calculate price rather than applying the user-submitted profile 21D (FIGS. 2 and 12). To implement this pricing logic, the system 12 may, at step 160 (FIG. 13B), be programmed to determine if the annual kilowatt hours and/or kilowatt demand consumed by the facility being priced exceeds the highest applicable utility profile threshold 151 (FIG. 12E). If the annual volume exceeds this threshold, the system 12 may process the user-selected preconfigured facility load profile 177 or the user-entered, custom profile 58 (FIGS. 10C and 10D) as illustrated at step 158. If, however, the annual volume does not exceed the highest defined threshold 151 (FIG. 12E), the system 12, at step 162, may be programmed to process the utility-issued profile 153, 10F that is associated with the volume of the facility being priced (FIG. 12E).

Figure 13C:
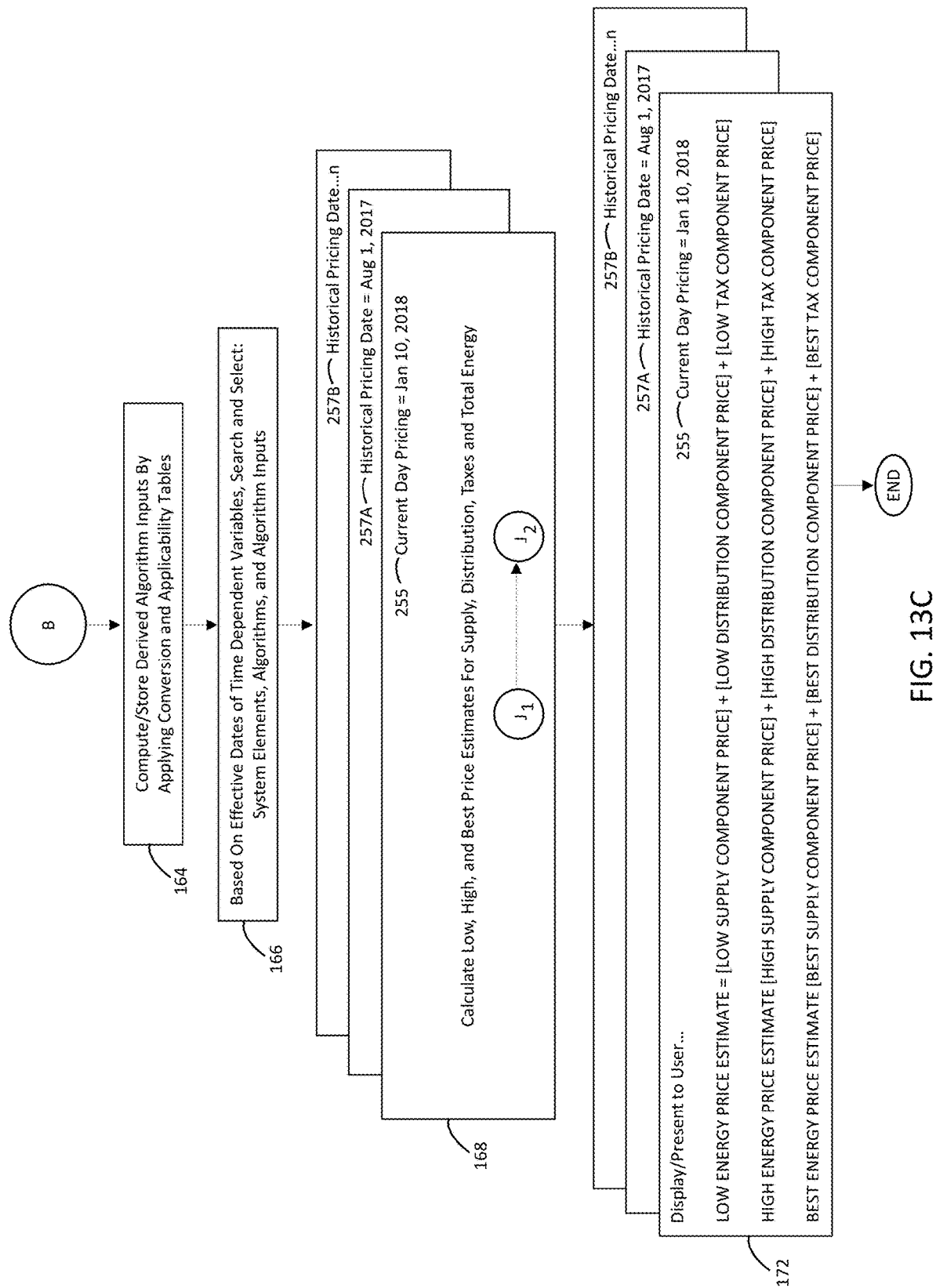
Figure 13D:
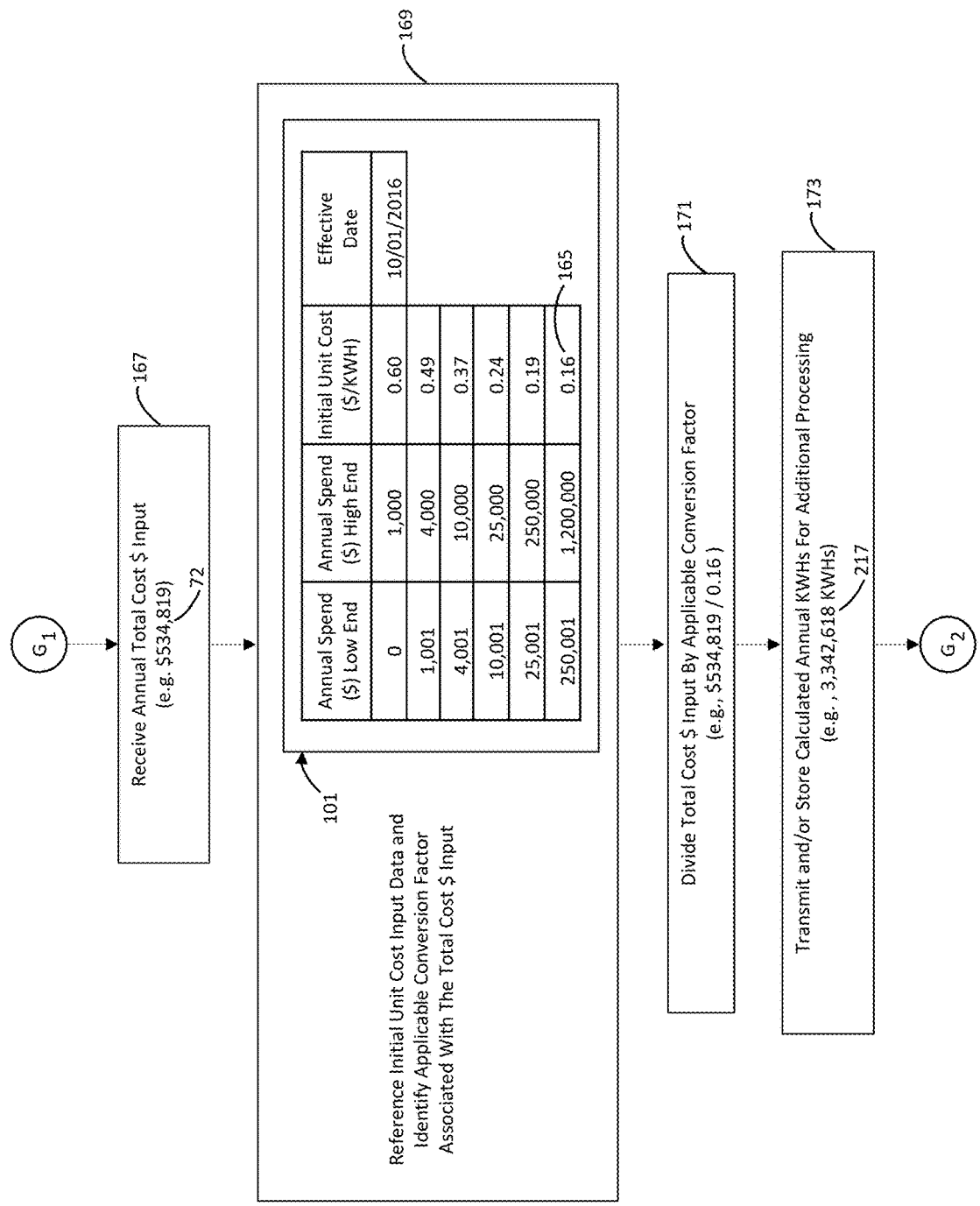
Figure 13E:
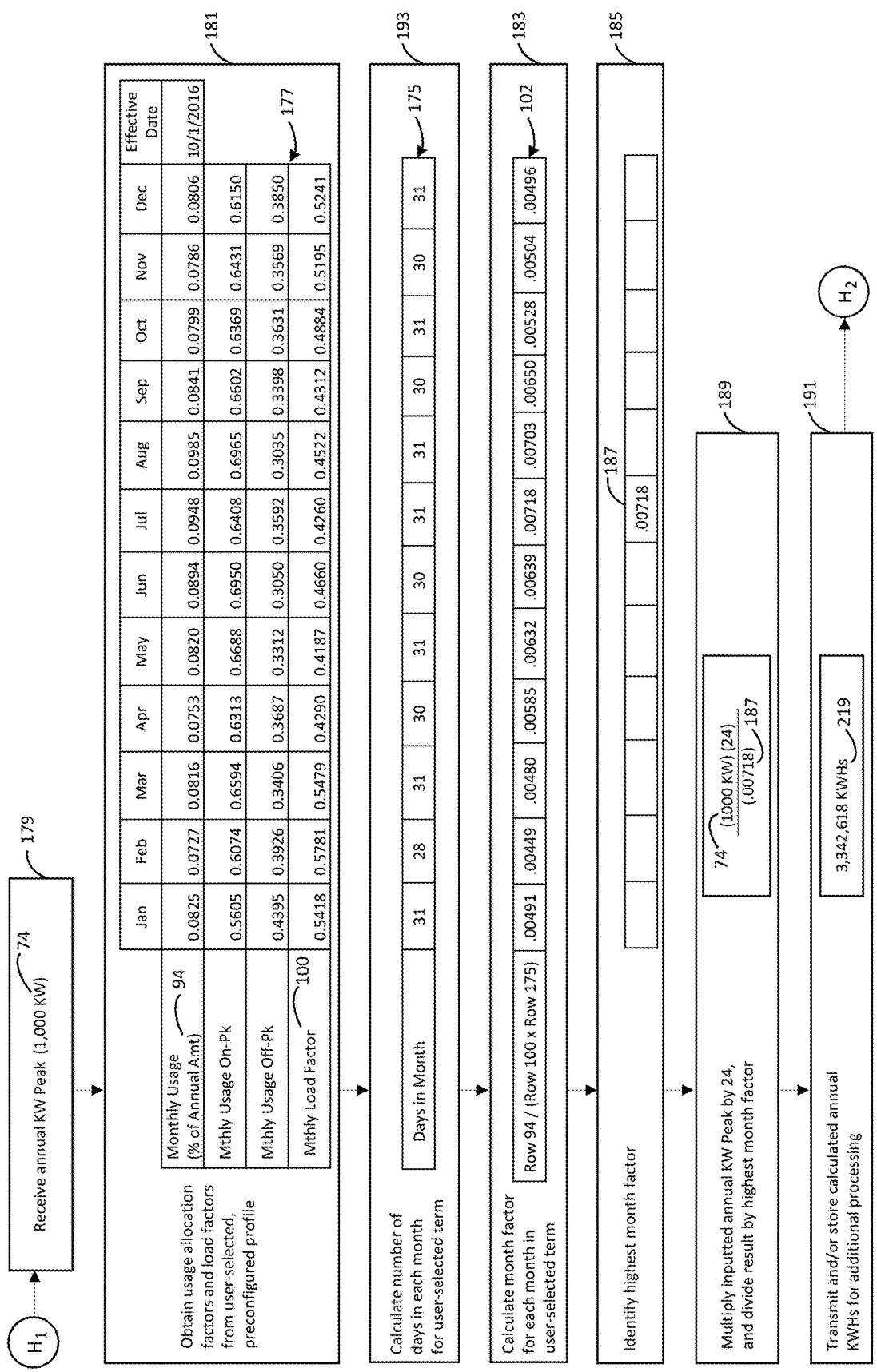
Figure 13F:
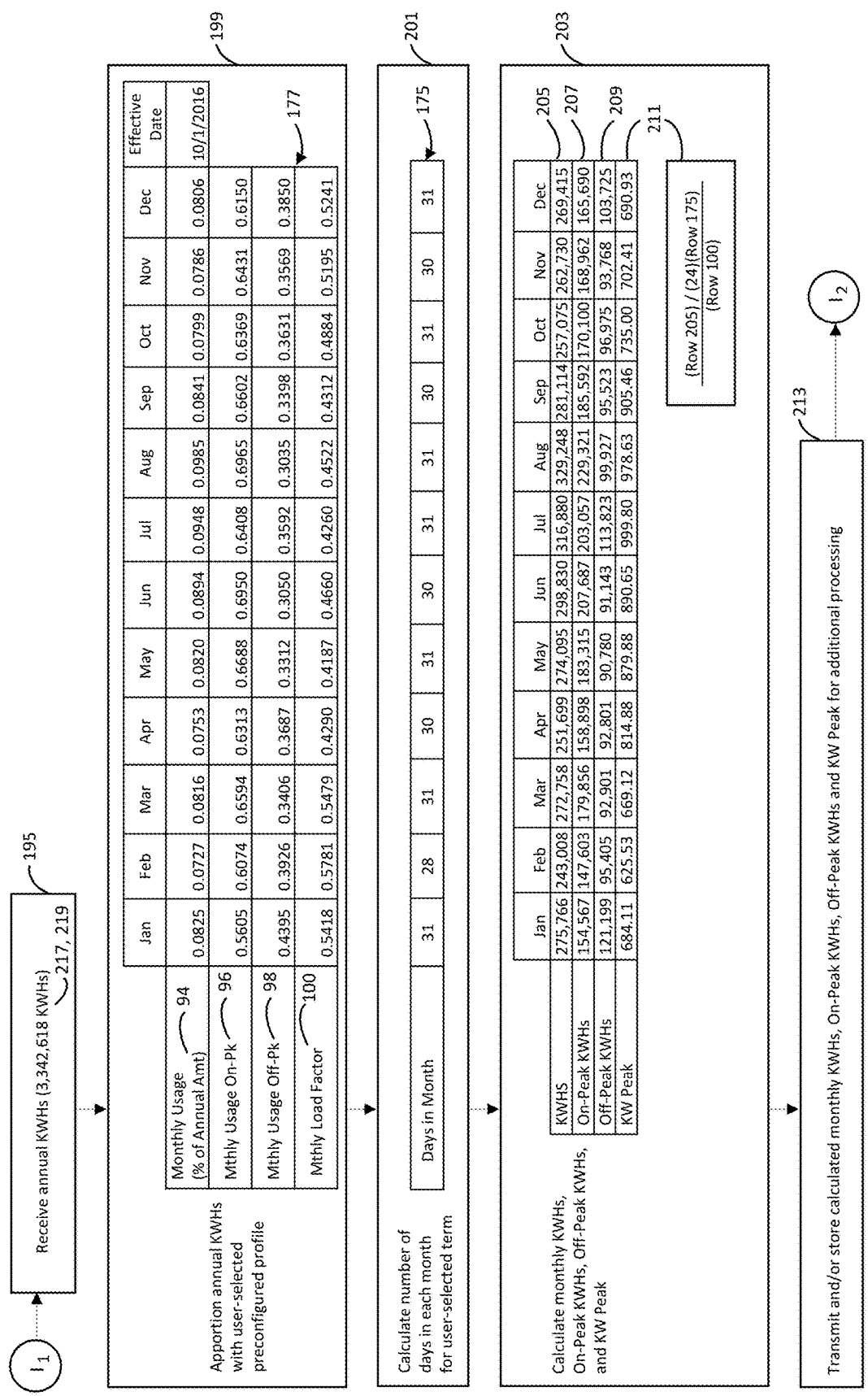

In FIG. 13C with the appropriate kilowatt, kilowatt hour, and load profile information determined coupled with the user pricing request input 104 (FIG. 12), the system 12 may, at step 164, automatically compute and store the remaining derived algorithm inputs 106 by applying additional conversion and applicability tables 114, 109 (FIG. 12). In one example, the system 12 may utilize the rate class applicability table 109 (FIGS. 12 and 12F) to identify appropriate rate classes based on kilowatt hour volume. Then via the rate class to loss factor conversion table 114 (FIGS. 12 and 12G), the system 12 may convert the identified rate classes to loss factors. After which, these loss factors may be stored as derived algorithm inputs 106 (FIG. 12) that will be later selected by the system and utilized within a constructed algorithm 235 (FIG. 12J). Based on the effective dates of each time dependent, variable system element (111, 116A, 116B, 235) and each applicable, time dependent, variable input (105, 106), the start time 21B and term length 21C of the user pricing request 104, and the date of the user pricing request 21G, the system 12 may, at step 166, be programmed to automatically search and select one or more system elements and the data contained therein, including one or more algorithms 235 stored within the algorithm builder 116B and the inputs called for by the selected algorithm(s). For the facility load profile selected/initiated at step 128 and utilizing one or more system elements and inputs based on their effective dates, the system 12 may then, at step 168, simultaneously calculate current day 255 and historical (257A, 257B), low, high and best price estimates for the supply, distribution and tax price components 221A, 221B, 221C (FIG. 12K) as well as the total price 275 (FIG. 12K). In another embodiment, the system 12 may be programmed to calculate an aggregate price across two or more facility load profiles (selected/entered at step 128) or calculate a separate price for each user-selected preconfigured facility load profile and/or user-entered custom profile (selected/entered at step 128).

FIG. 13G illustrates a sample calculation detailing step 168 that outputs price estimates for supply, distribution, and/or tax price components 221A, 221B, 221C. Utilizing the system elements identified in step 166, the system 12 may simultaneously execute steps 174A, 174B, and 174C, wherein these steps search, identify and select preconstructed algorithms 235 (FIG. 12J) and time dependent, variable algorithm inputs 105, 106 (FIG. 12) that are applicable to the user pricing request 104 (FIG. 12) and are called for by the selected algorithms 235.

Using the retrieved algorithms 235 (FIG. 12J) and algorithm inputs 105, 106 (FIG. 12), the system 12 may then, at steps 176A, 176B and 176C concurrently calculate, for one or more pricing dates 255, 257A, 257B, the dollar value of each supply, distribution, and/or tax subcomponent 223A, 223B, 223C (FIG. 12K) for each month of the user-defined term. In one embodiment, the system 12 may, in steps 178A, 178B and 178C, be programmed to sum all months of the user-defined term to determine the total dollar value of each supply, distribution, and/or tax subcomponent 223A, 223B, 223C (FIG. 12K). In another example, the system 12 may be programmed to select the total term kilowatt hour usage from the derived algorithm inputs 106 (FIG. 12) at steps 180A, 180B and 180C. Then in steps 182A, 182B and 182C, the system 12 may unitize the price of each subcomponent 223 (FIG. 12K) in terms of dollars per kilowatt hour ($/kWh) by dividing the total dollar value (from steps 178A, 178B, 178C) by the total term usage (from steps 180A, 180B, 180C). In yet another example, the system 12 may, at steps 184A 184B, and 184C, be programmed to sum/rollup the subcomponent unitized prices (from steps 182A, 182B and 182C) to determine a total unitized price of each supply, distribution, and/or tax component 221A, 221B, 221C. In addition, the system may, at step 385, be further programmed to concurrently calculate for one or more pricing dates 255, 257A, 257B the high, low and best total energy prices 281, 283, 275, 285, 287, 289 (FIG. 12L) by summing/rolling up the component prices from steps 184A, 184B and 184C.

Referring back to FIG. 13C with the prices calculated, the system may, in one embodiment, be programmed, at step 172, to automatically display/present to the user 10A a high, low and best price estimate as of the current day of the user's pricing request (e.g., Jan. 10, 2018) 255 and a high, low and best price estimate as of one or more dates prior to the day of the user's pricing request (e.g., Aug. 1, 2017) 257A, 257B. In another embodiment, this current day and historical pricing may be for: one or more total prices 275 (FIG. 12K); supply, distribution, and tax component prices 221A, 221B, 221C (FIGS. 12K and 13G); and/or supply, distribution, and tax subcomponent prices 223A, 223B, 223C (FIG. 12K). In yet another embodiment, the system 12 may also be programmed to display an aggregate price across two or more profiles (selected/entered at step 128) or display a separate price for each user-selected, preconfigured facility load profile and/or user-entered, custom profile (selected/entered at step 128).

Figure 14A:
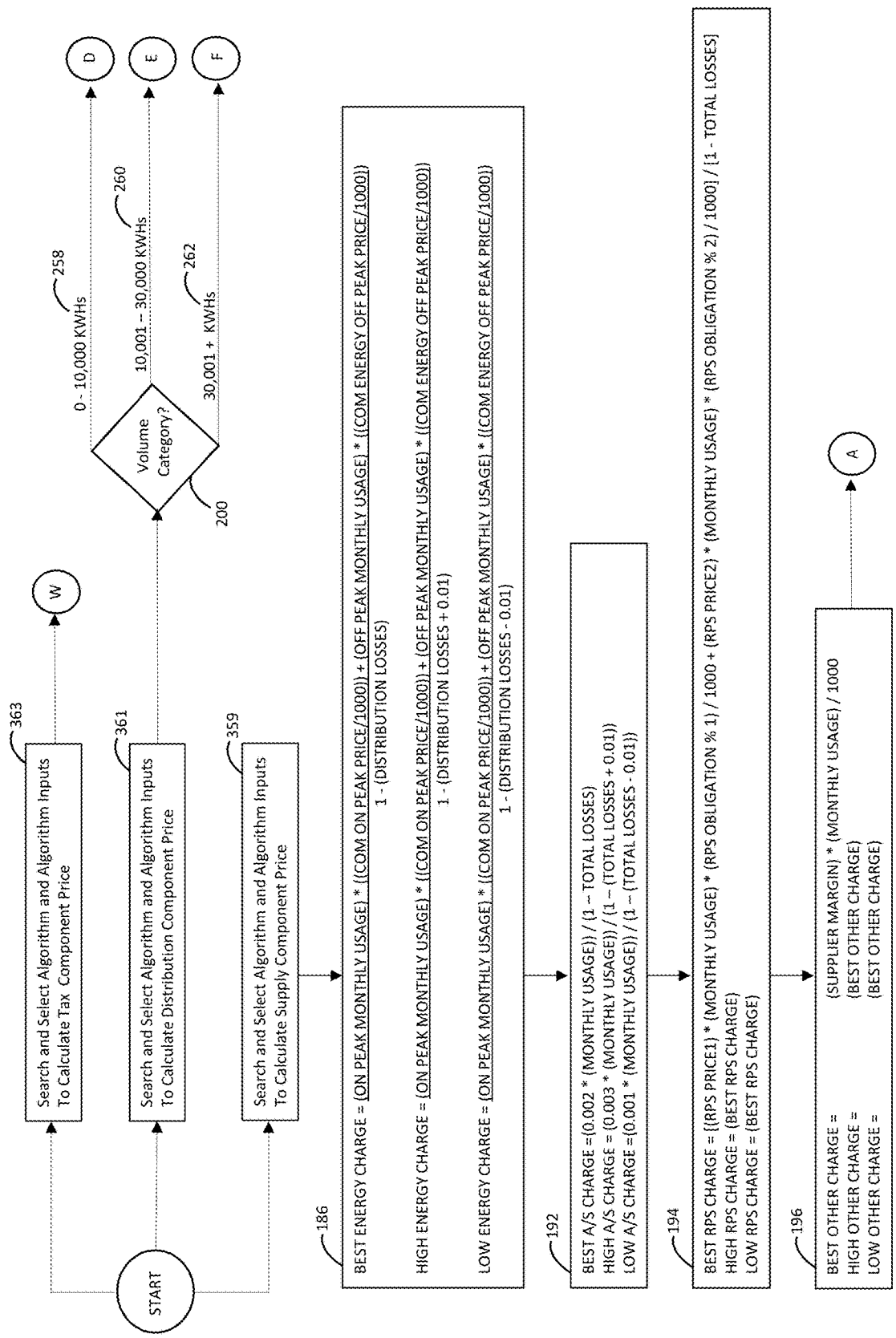
FIGS. 14A-14N are a flowchart showing another example of steps executed by the energy pricing system of FIG. 1 to select the appropriate inputs and algorithms, and process these inputs and algorithms to calculate price estimates.
Figure 14B:
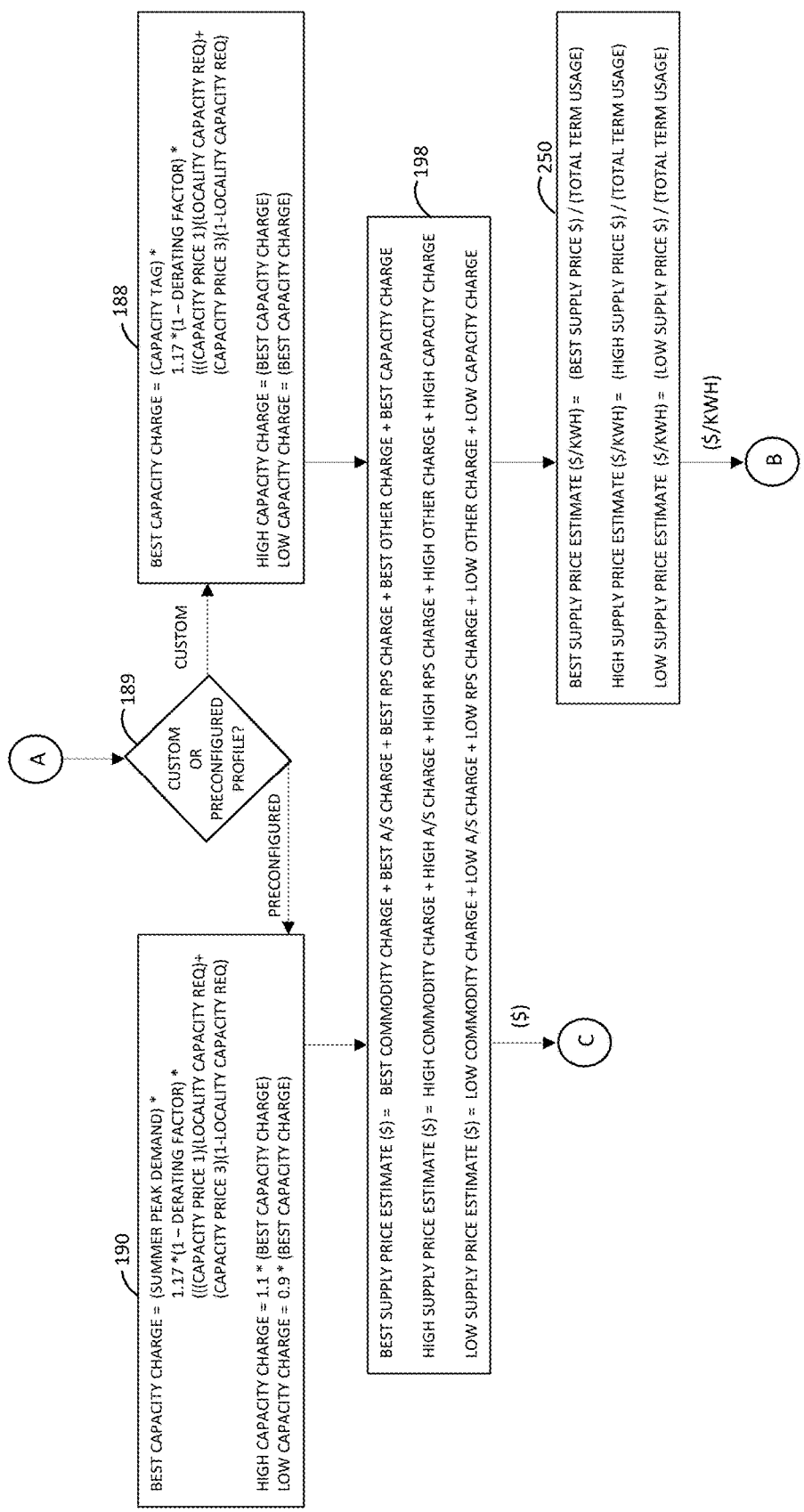
Figure 14C:
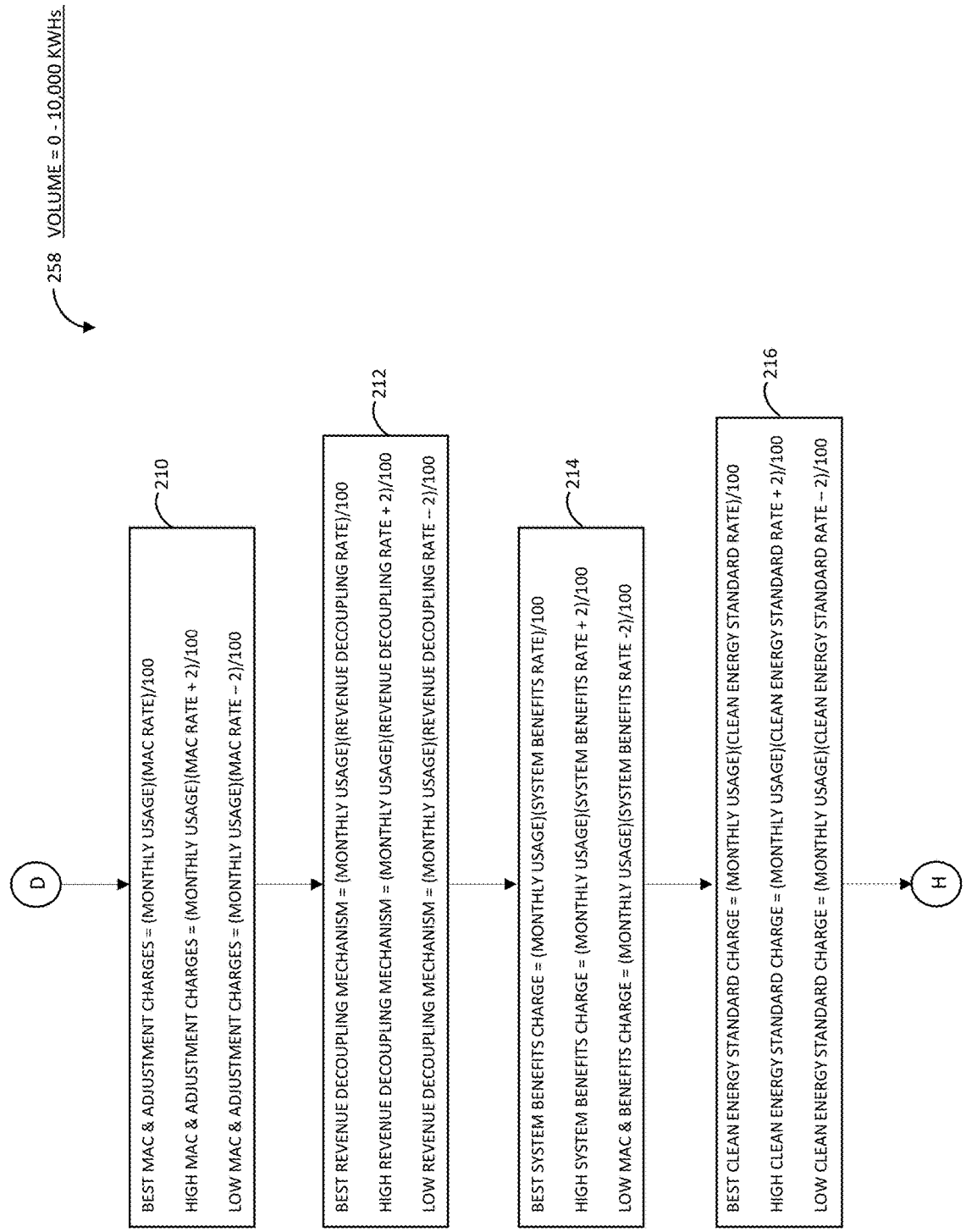
Figure 14D:
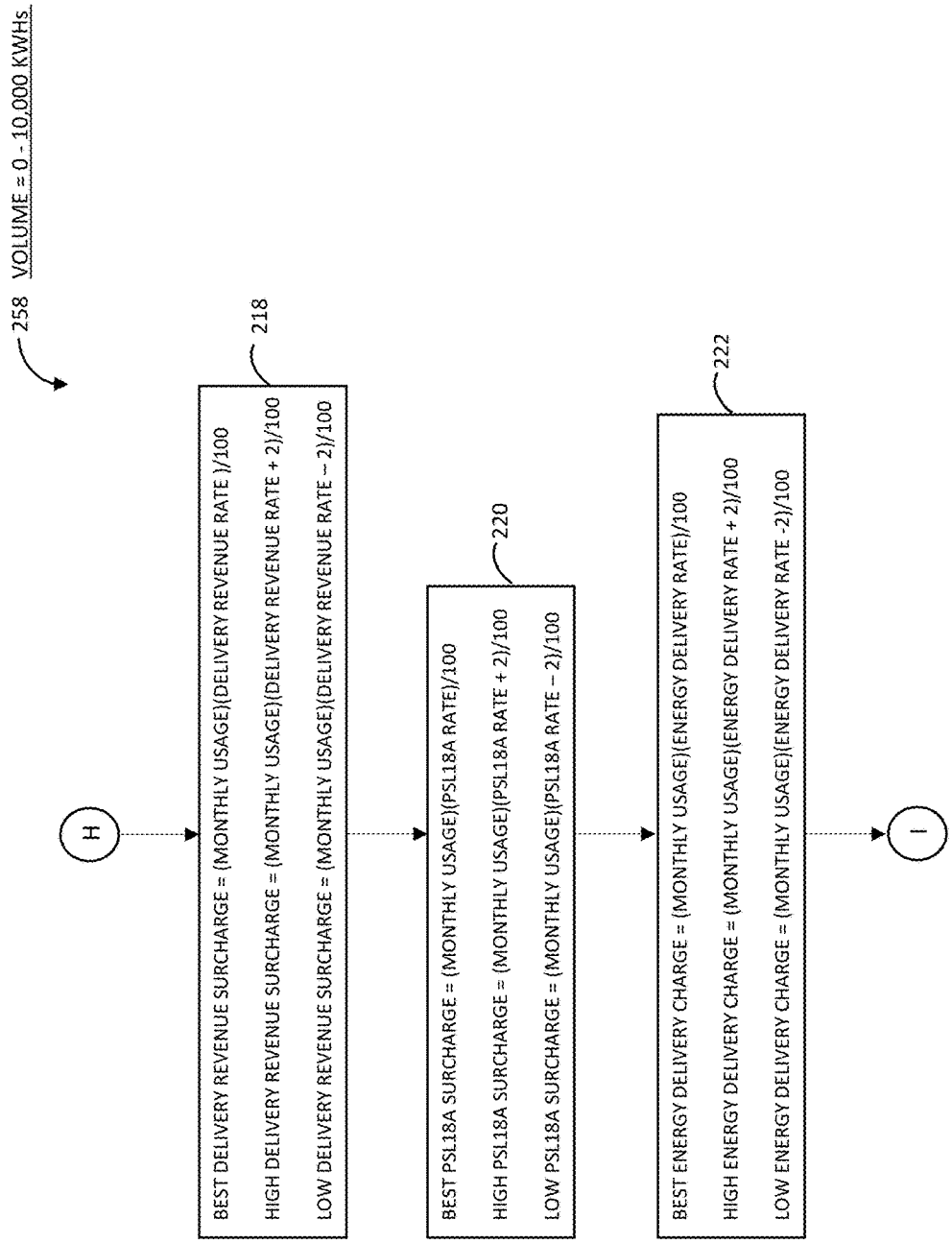
Figure 14E:
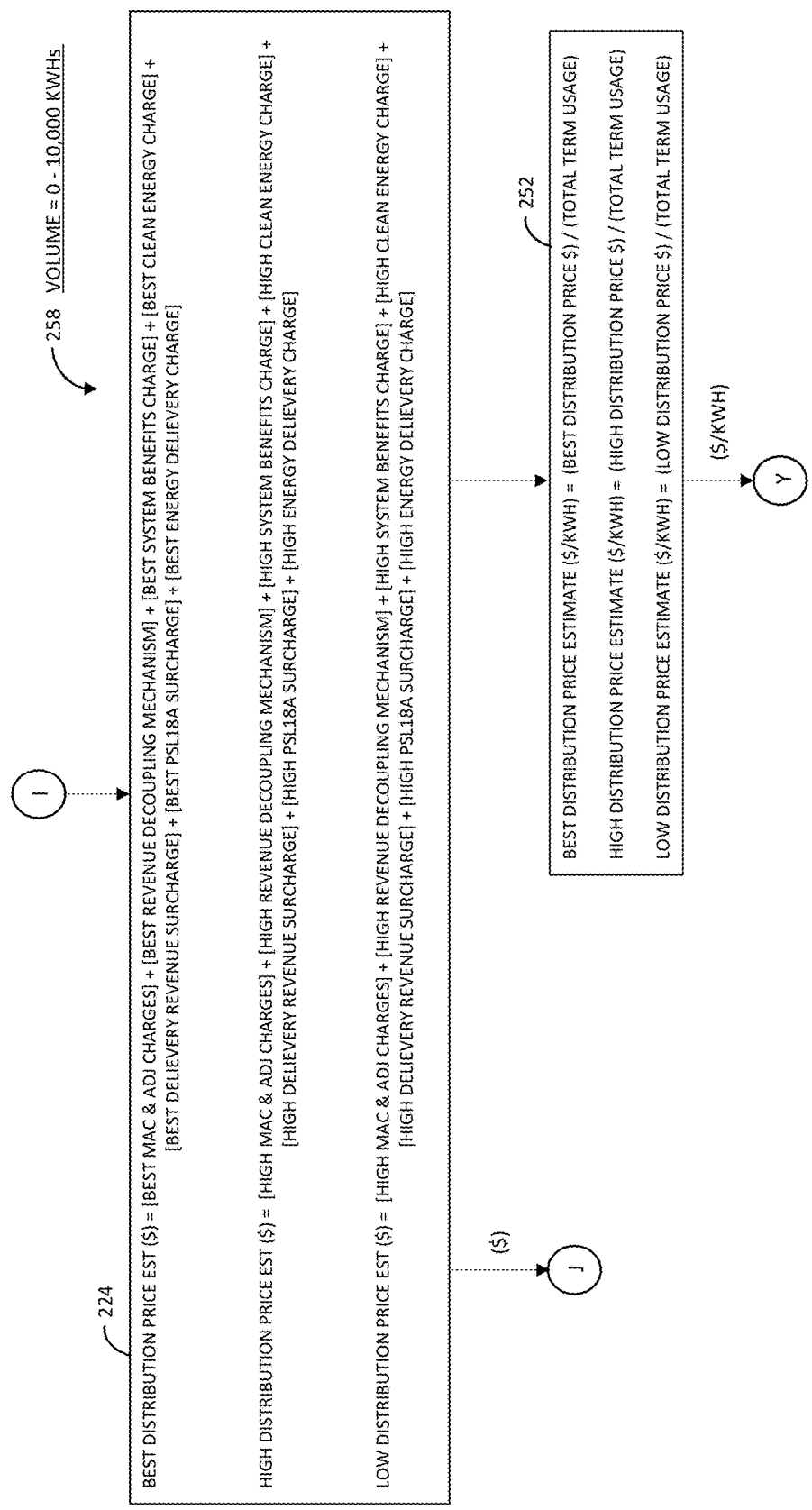
Figure 14F:
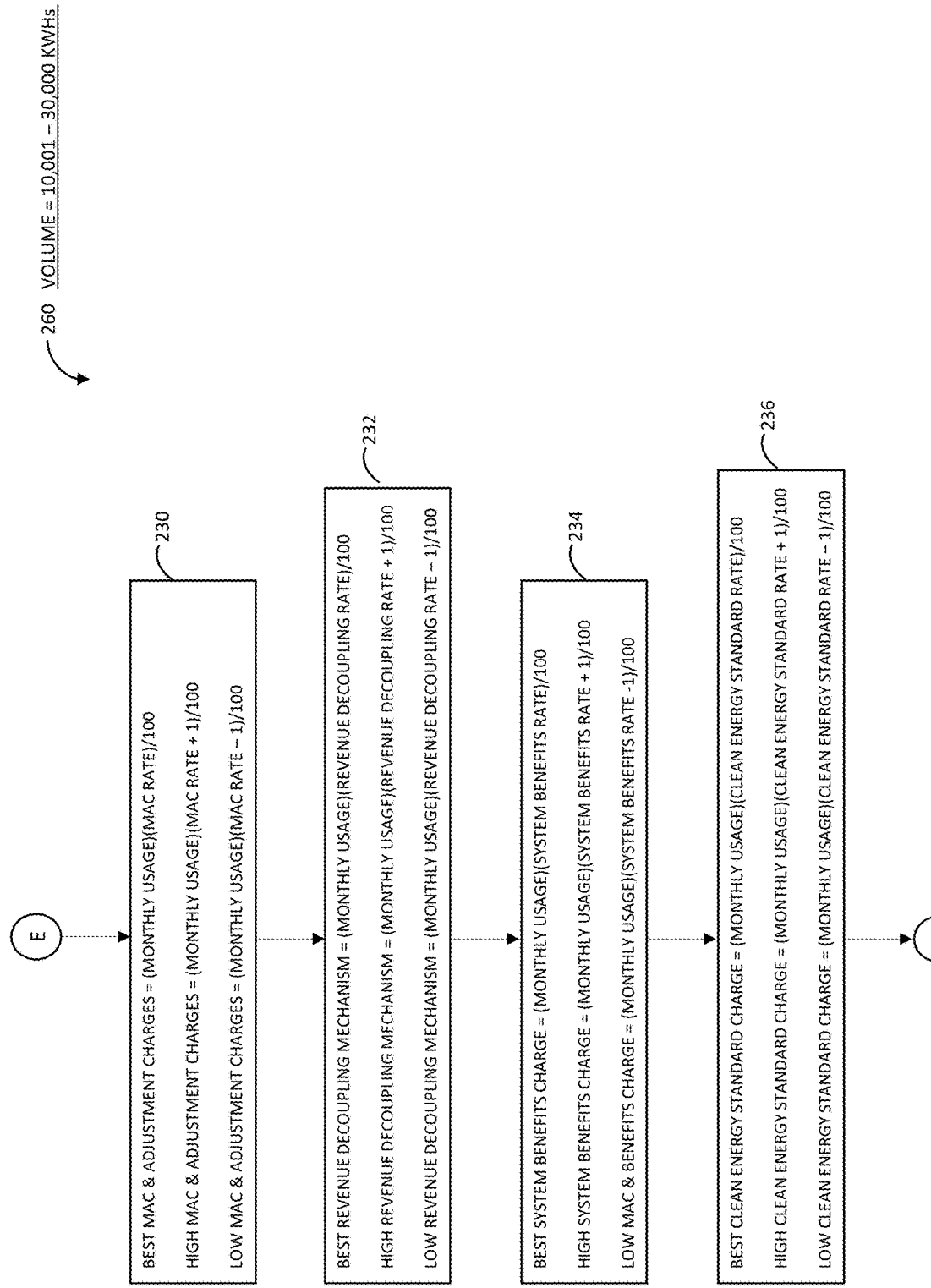
Figure 14G:
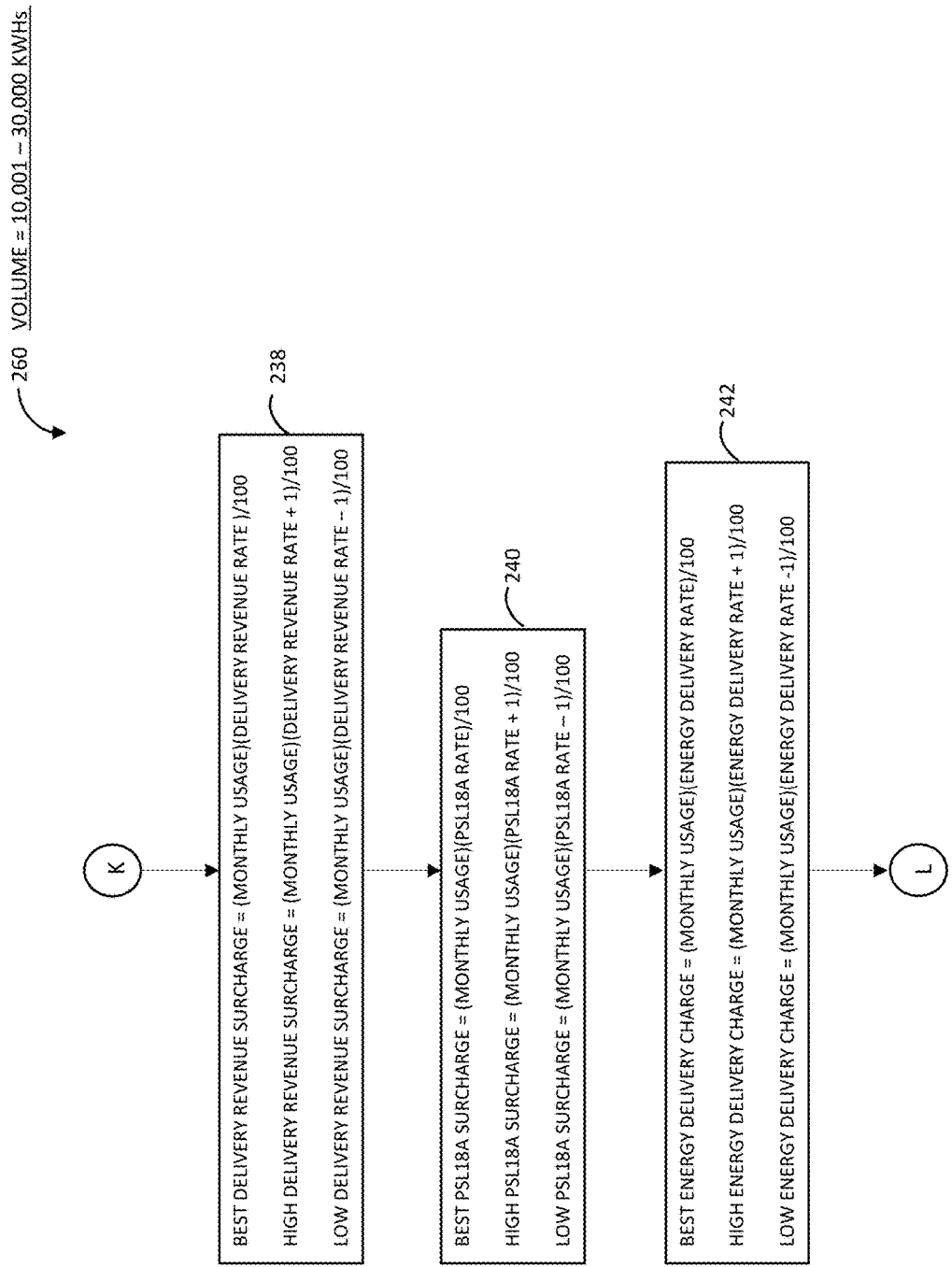
Figure 14H:
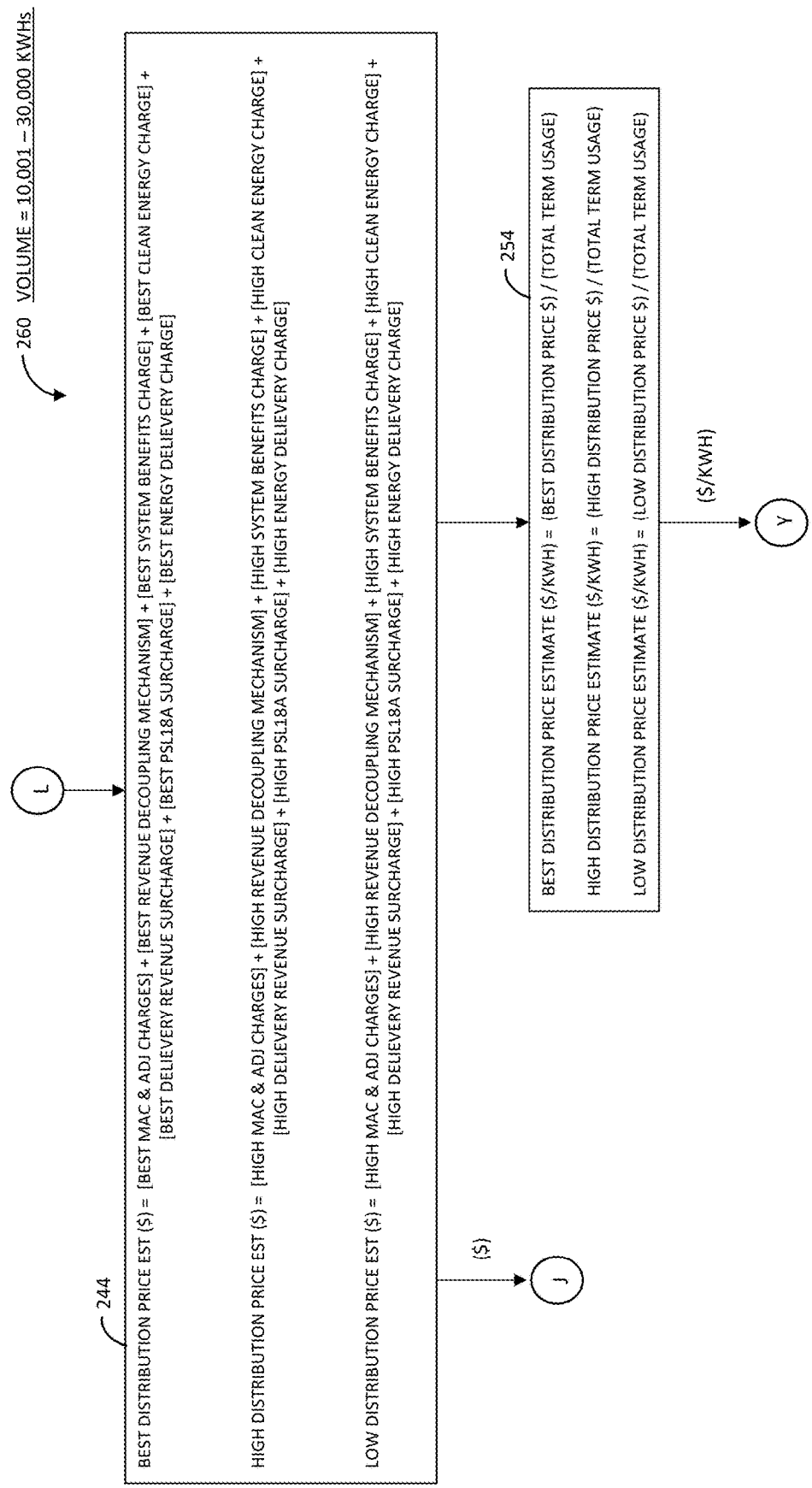
Figure 14I:
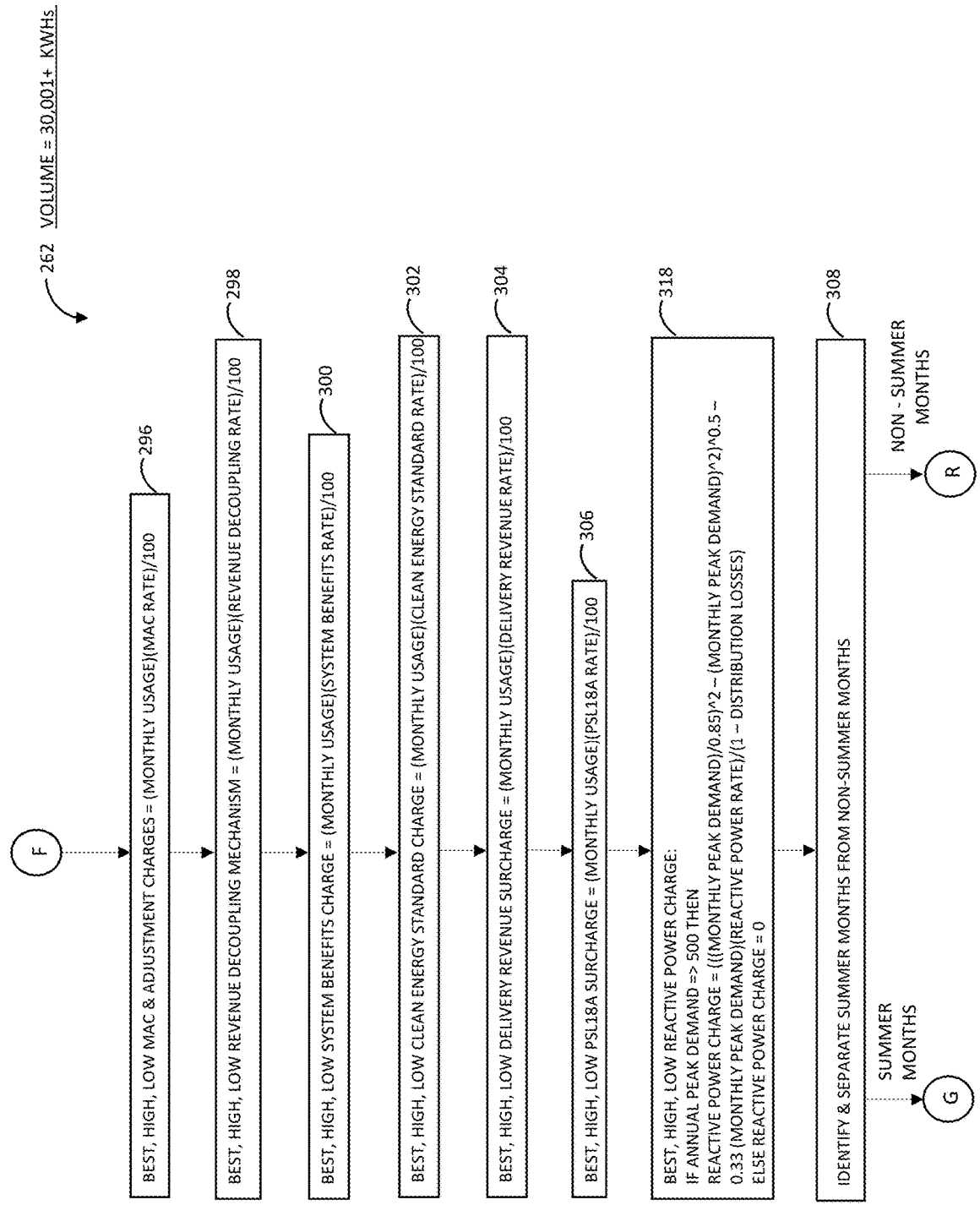
Figure 14J:
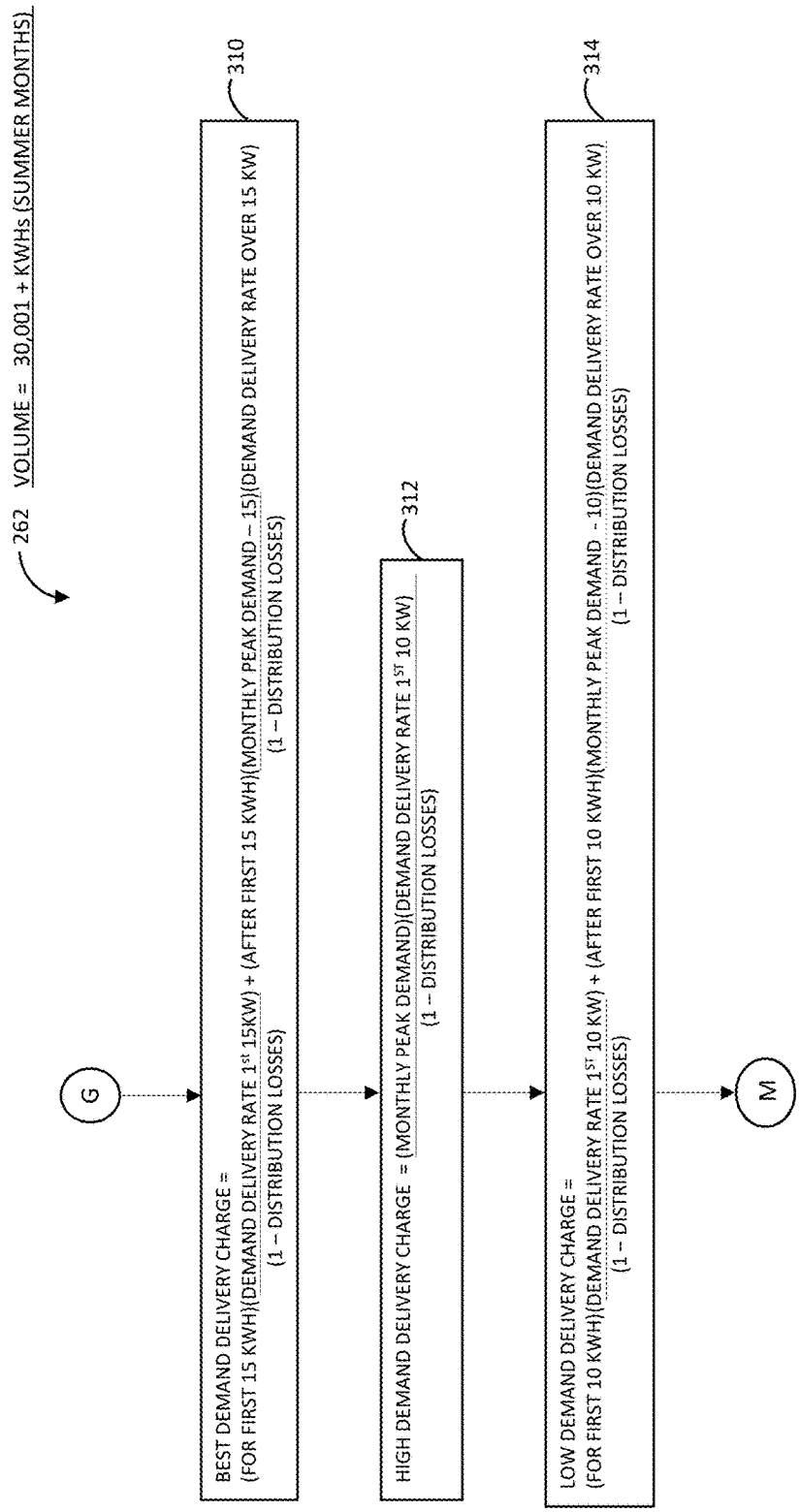
Figure 14K:
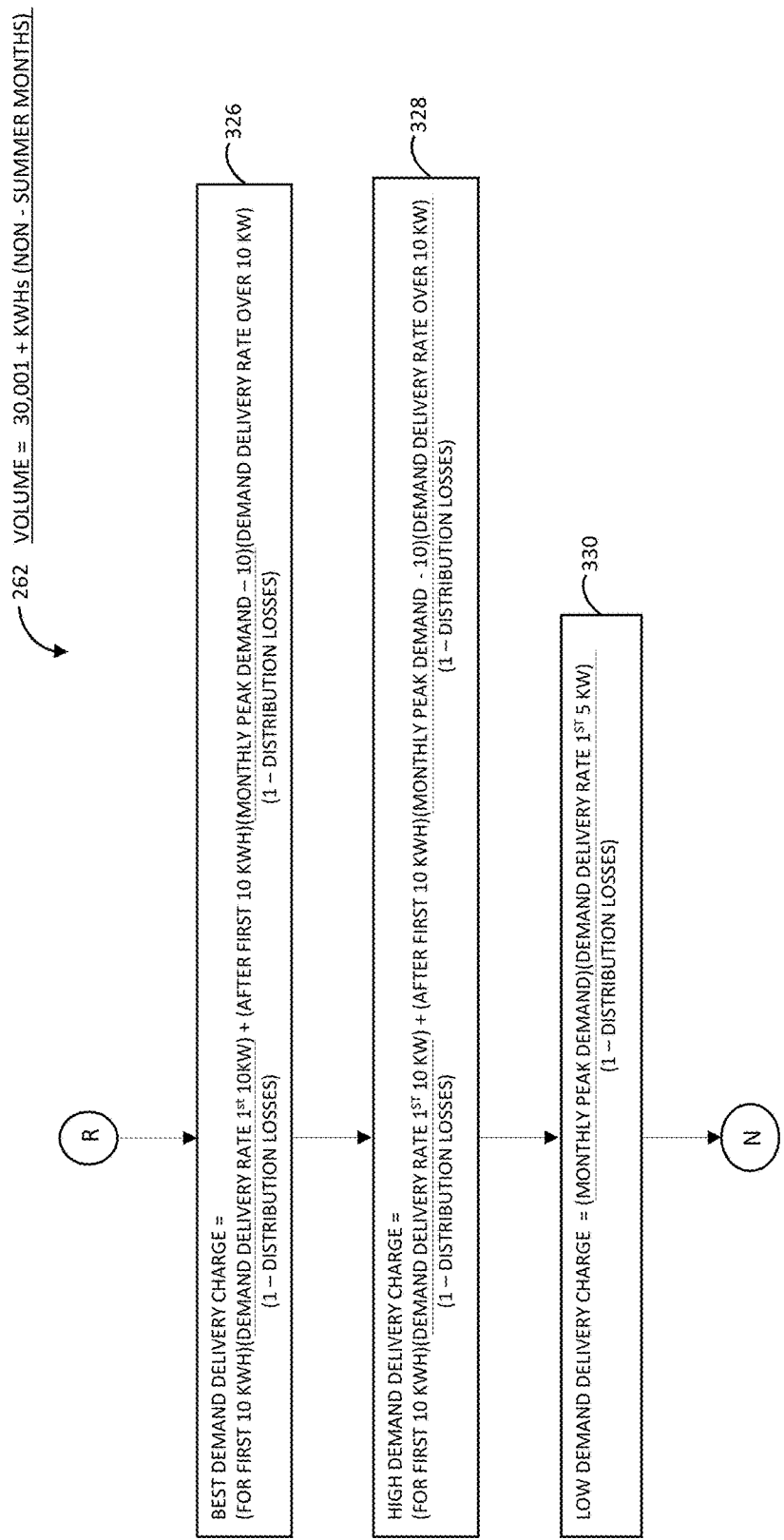
Figure 14L:
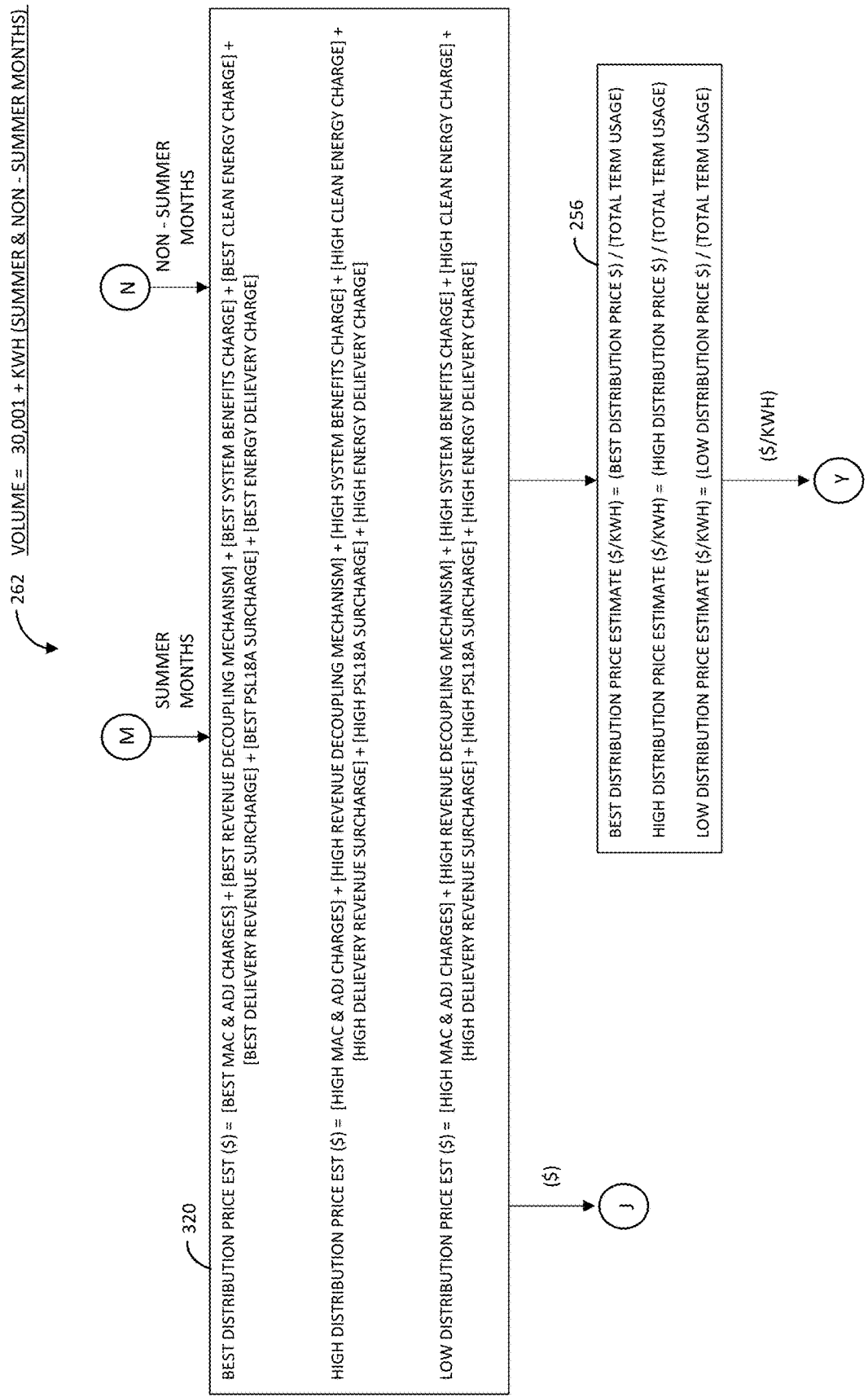
Figure 14M:
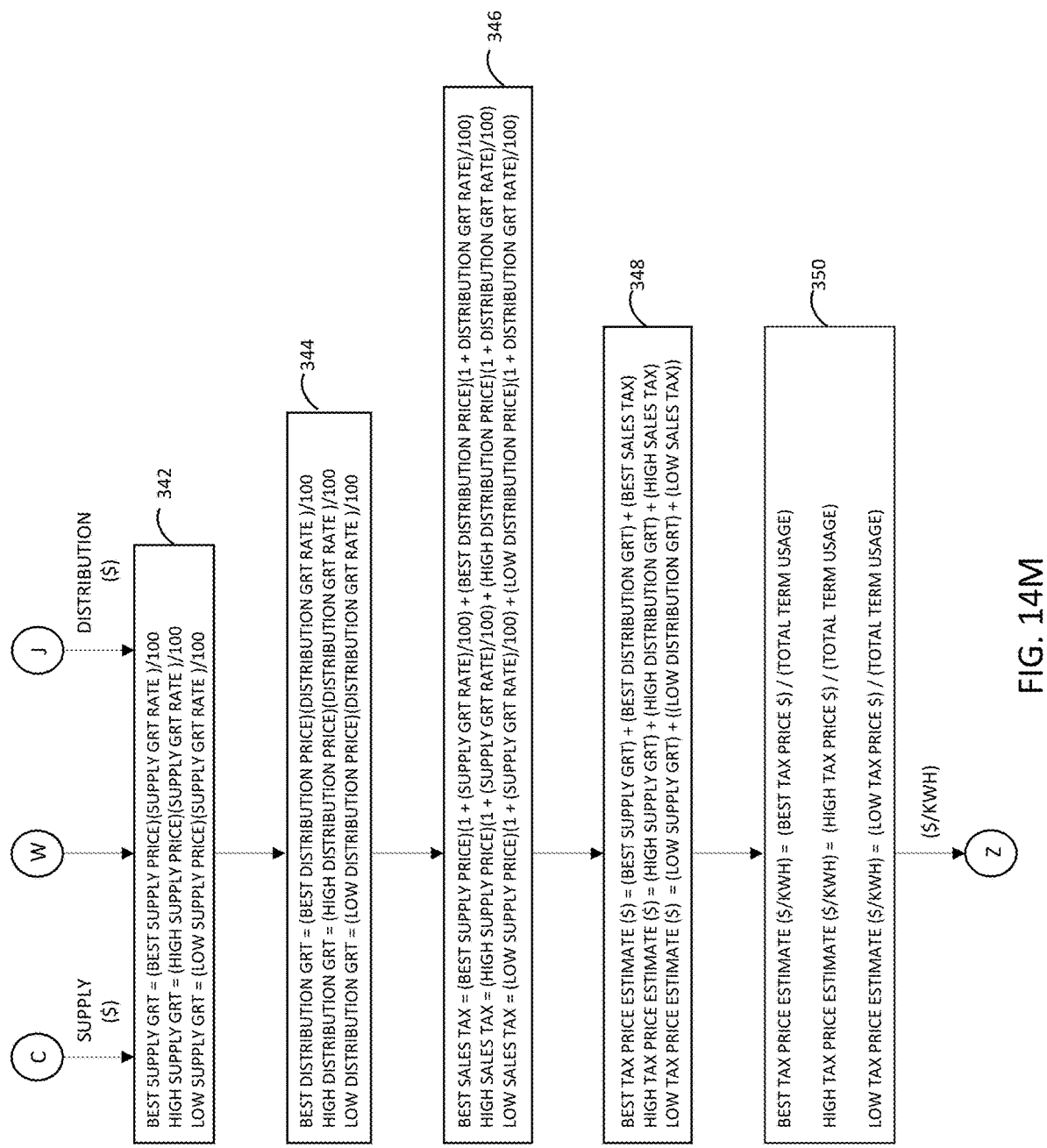
Figure 14N:
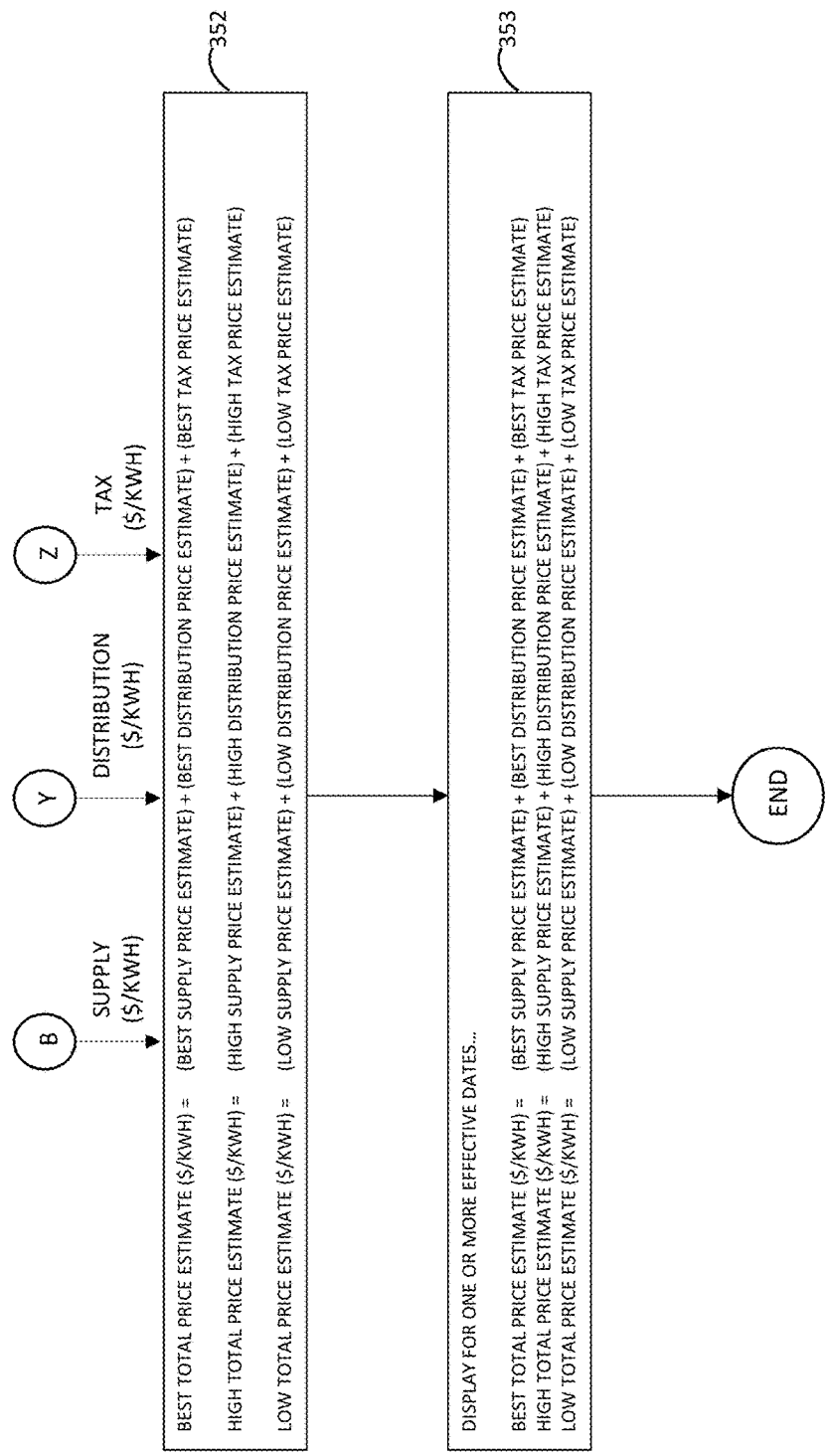

FIGS. 14A-14N illustrate a sample pricing process, wherein the system 12 may be programmed to automatically calculate prices for one or more pricing dates by receiving and deriving time dependent, variable inputs 105, 106 (FIG. 12) and processing these inputs through preconstructed algorithms 235 (FIG. 12J), which have been dynamically selected based on the user pricing request 104 (FIG. 12). In one example, the user 10A may evaluate different pricing scenarios by adjusting the location 21A, start time 21B, term length 21C, facility profile 21D, and/or volume 21E inputs, as well as the date of the pricing request 21G (FIG. 12). With each varying input scenario, the system 12 may dynamically select different time dependent, variable algorithms 235 (FIG. 12J) and algorithm inputs 105, 106 (FIG. 12), which in turn will automatically vary the pricing output. In one embodiment as shown in step 359 FIG. 14A, the system 12 may automatically search, identify, and select the illustrated time dependent, variable supply algorithms and corresponding supply inputs 106, 108 (FIG. 12). To automatically output supply component pricing 221A (FIG. 12K), the system 12 may simultaneously calculate, for one or more pricing dates, the high, low and best dollar estimates of each supply subcomponent 223A (FIG. 12K) for each month of the user-defined term. The system 12 may then sum each of these monthly estimates to determine the total dollar value of each supply subcomponent 223A (FIG. 12K) for the entire, user-defined term. As shown in FIG. 14A, the system 12 may be programmed to utilize the illustrated supply subcomponent algorithms and inputs to calculate high, low and best monthly and total term dollar ($) estimates for the energy charge at step 186, the ancillary service ("A/S") charge at step 192, the RPS charge at step 194 and an "other charge" at step 196. In FIG. 14B step 189, the system 12 may be programmed to determine if a custom and/or preconfigured profile is being used. If the user entered a custom profile, the system 12 may, at step 188, select and process the illustrated algorithms and inputs to calculate high, low and best monthly and total term dollar ($) estimates for the capacity charge. If the user selected a preconfigured facility profile, the system 12 may, at step 190, select and process illustrated algorithms and inputs to calculate high, low and best monthly and total term dollar ($) estimates for the capacity charge. With the various supply subcomponents calculated, for one or more pricing dates, the system 12 may then total these supply subcomponents at step 198 to determine high, low and best total term dollar ($) estimates for the supply component price for these one or more pricing dates. In step 250, the system 12 may be further programmed to unitize the price of the supply component in terms of dollars per kilowatt hour ($/kWh) by dividing the total term dollar value (calculated in step 198) by the total term usage 106 (FIG. 12). In other embodiments, the system may also unitize the price of each supply subcomponent (e.g., commodity, capacity, etc.) in terms of dollars per kilowatt hour ($/kWh) by dividing the subcomponent total term dollar value by the total term usage 106 (FIG. 12).

In another embodiment as shown in FIGS. 14A, 14C-14L, the system 12 may, at step 361 (FIG. 14A), automatically search, identify, and select the illustrated time dependent, variable distribution algorithms and corresponding distribution inputs 106, 110 (FIG. 12). To automatically output distribution component pricing 221B (FIG. 12K), the system 12 may simultaneously calculate, for one or more pricing dates, the high, low and best dollar estimates of each distribution subcomponent 223B (FIG. 12K) for each month of the user-defined term. The system 12 may then sum each of these monthly estimates to determine the total dollar value of each distribution subcomponent 223B (FIG. 12K) for the entire, user-defined term. In the FIG. 14A illustrated embodiment, the system 12 may, at step 200, select distribution algorithms and inputs based on ranges/categories of annual kilowatt hours consumed by the facility being priced. In other embodiments, the step 200 selection categories may include kilowatt, rate class, and/or any other energy usage or demand parameter. If, for example, the annual volume falls within a sample category of [0 to 10,000 kilowatt hours] 258, the system may be programmed to automatically select and process the illustrated distribution algorithms and inputs of FIGS. 14C-14E, wherein these algorithms may calculate high, low and best monthly and total term dollar ($) estimates for the MAC & MAC Adjustment charges at step 210 (FIG. 14C), the revenue decoupling mechanism at step 212, the system benefits charge at step 214, the clean energy standard charge at step 216, the delivery revenue surcharge at step 218 (FIG. 14D), the PSL18A surcharge at step 220, and the energy delivery charge at step 222. With the various distribution subcomponents calculated, the system 12 may then total these subcomponents, for one or more pricing dates, at step 224 (FIG. 14E), to determine high, low and best total term dollar ($) estimates for the distribution component price for these one or more pricing dates. In step 252, the system 12 may be further programmed to unitize the price of the distribution component in terms of dollars per kilowatt hour ($/kWh) by dividing the total term dollar value (calculated in step 224) by the total term usage 106 (FIG. 12). In other embodiments, the system may also unitize the price of each distribution subcomponent (e.g., MAC charge, system benefits charge, etc.) in terms of dollars per kilowatt hour ($/kWh) by dividing the subcomponent total term dollar value by the total term usage 106 (FIG. 12).

If in another example the annual volume falls within a sample category of [10,001 to 30,000 kilowatt hours] 260 (FIG. 14A), the system may be programmed to automatically select and process different distribution algorithms and inputs illustrated in FIGS. 14F-14H, wherein these algorithms may calculate high, low and best monthly and total term dollar ($) estimates for the MAC & MAC Adjustment charges at step 230 (FIG. 14F), the revenue decoupling mechanism at step 232, the system benefits charge at step 234, the clean energy standard charge at step 236, the delivery revenue surcharge at step 238 (FIG. 14G), the PSL18A surcharge at step 240, and the energy delivery charge at step 242. With the various distribution subcomponents calculated, the system 12 may then total these subcomponents, for one or more pricing dates, at step 244 (FIG. 14H), to determine high, low and best total term dollar ($) estimates for the distribution component price for these one or more pricing dates. In step 254, the system 12 may be further programmed to unitize the price of the distribution component in terms of dollars per kilowatt hour ($/kWh) by dividing the total term dollar value (calculated in step 244) by the total term usage 106 (FIG. 12).

If in yet another example the annual volume falls within a sample category of [30,001+ kilowatt hours] 262 (FIG. 14A), the system may be programmed to automatically select and process different distribution algorithms and inputs illustrated in FIGS. 14I-14L, wherein these algorithms may calculate high, low and best monthly and total term dollar ($) estimates for the MAC & MAC Adjustment charges at step 296 (FIG. 14I), the revenue decoupling mechanism at step 298, the system benefits charge at step 300, the clean energy standard charge at step 302, the delivery revenue surcharge at step 304, and the PSL18A surcharge at step 306. At step 318, the system 12 may also select and process the illustrated distribution algorithms and inputs that calculate high, low and best monthly and total term dollar ($) estimates for the reactive power charge based on, for example, the derived input of annual peak demand 106 (FIG. 12).

In one embodiment as shown in FIG. 14I, the system 12 may be programmed, at step 308, to identify and separate summer and non-summer months of the user-defined term. In one example, summer months may include June, July and August. If one or more summer months are included in the user-specified start time/term length 104, the system 12 may be further programmed, as shown in FIG. 14J steps 310, 312, and 314, to process the illustrated distribution algorithms and inputs that calculate high, low and best monthly and total term dollar ($) estimates for the demand delivery charge for the summer months of the user-defined term. If the user-submitted start time and term length 104 (FIG. 12) includes one or more non-summer months, the system 12 may also process, as shown in FIG. 14K steps 326, 328, 330, different distribution algorithms and inputs that calculate high, low and best monthly and total term dollar ($) estimates for the demand delivery charges for the non-summer months of the user-defined term. With the various distribution subcomponents calculated, the system 12 may then total these subcomponents, for one or more pricing dates, at step 320 (FIG. 14L), to determine high, low and best total term dollar ($) estimates for the distribution component price for these one or more pricing dates. In step 256, the system 12 may be further programmed to unitize the price of the distribution component in terms of dollars per kilowatt hour ($/kWh) by dividing the total term dollar value (calculated in step 320) by the total term usage 106 (FIG. 12).

Referring back to FIG. 14A at step 363, the system 12 may also automatically search, identify, and select the illustrated time dependent, variable tax algorithms and corresponding tax inputs 106, 112 (FIG. 12). To automatically output tax component pricing 221C (FIG. 12K), the system 12 may simultaneously calculate, for one or more pricing dates, the high, low and best dollar estimates of each tax subcomponent 223A (FIG. 12K) for each month of the user-defined term. The system 12 may then sum each of these monthly estimates to determine the total dollar value of each tax subcomponent 223C (FIG. 12K) for the entire, user-defined term. With the supply and distribution total term dollar estimates calculated (in steps 198, 224, 244, and 320), the system 12 may, as shown in FIG. 14M, automatically feed these calculated values into the illustrated tax subcomponent algorithms to calculate high, low and best monthly and total term dollar ($) estimates for supply gross receipt tax at step 342, distribution gross receipt tax at step 344, and sales tax at step 346.

With the various tax subcomponents calculated, the system 12 may then total these subcomponents, for one or more pricing dates, at step 348 (FIG. 14M), to determine high, low and best total term dollar ($) estimates for the tax component price for these one or more pricing dates. In step 350, the system 12 may be further programmed to unitize the price of the tax component in terms of dollars per kilowatt hour ($/kWh) by dividing the total term dollar value (calculated in step 348) by the total term usage 106 (FIG. 12). In other embodiments, the system may also unitize the price of each tax subcomponent (e.g., gross receipt tax, sales tax, etc.) in terms of dollars per kilowatt hour ($/kWh) by dividing the subcomponent total term dollar value by the total term usage 106 (FIG. 12).

In yet another embodiment with the dollar per kilowatt hour ($/kWh) prices calculated for the supply, distribution and tax components (in steps 250, 252, 254, 256 and 350), the system 12 may automatically feed these calculated values into the illustrated total price algorithms, as shown in FIG. 14N. At step 352, the system 12 may sum the supply, distribution, and tax component prices for one or more pricing dates to calculate the high, low and best total unit price estimates for these one or more pricing dates. At step 353, the system 12 may then automatically display, for the one or more pricing dates, the calculated high, low and best price estimates for: (i) the total unit price (calculated in step 352), (ii) any of the aforementioned component prices (calculated in steps 250, 252, 254, 256 and 350), and/or (iii) any of the aforementioned subcomponent prices.

Figure 15:
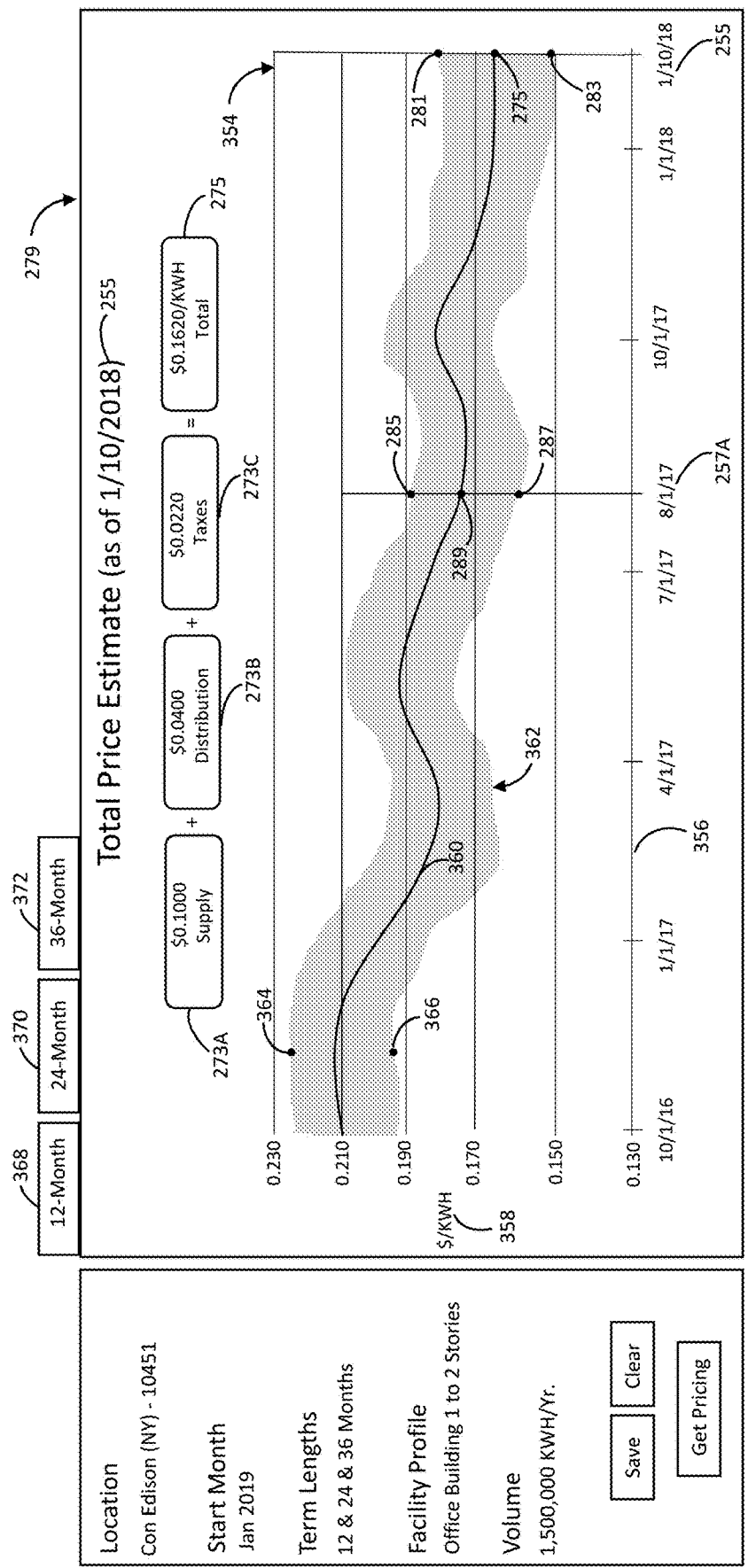
FIG. 15 is a screen view showing another price estimate example determined by the energy pricing system of FIG. 1.

FIG. 15 adds to FIG. 12L, which illustrates an example of the system 12 automatically displaying to the user 10A a calculated high 281, low 283 and best 275 price estimate as of the current day of the user's pricing request (e.g., Jan. 10, 2018) 255 and a high 285, low 287 and best 289 price estimate as of one or more dates prior to the day of the user's pricing request (e.g., Aug. 1, 2017) 257A. As shown on the output page 279 in FIG. 15, a graph 354 may be presented showing time on the X axis 356 and price on the Y axis 358. In one embodiment, the X axis may be organized in terms of sub-hourly, hourly, daily, weekly, monthly, quarterly, or annual time periods, and the Y axis may be organized in terms of currency (e.g., dollars, euros) or unitized rates (e.g., $/kWh, Euros/MWh). In another embodiment, the system may display a line 360 that represents the best price estimates across the time periods shown (i.e., one or more pricing dates representing the current day of the pricing request and dates prior to the day of the pricing request). The graph 354 may also include a shaded region 362 that surrounds the line 360, and is bordered by the high price estimates 364 and the low price estimates 366. In yet another embodiment, the user 10A may select the appropriate icon to display, for example, the supply component price 273A, the distribution component price 273B, the tax component price 273C, and/or the total price 275 in a graphical or tabular format. As shown in FIG. 15, the system 12 may also enable the user 10A to select, for example, an appropriate tab or icon to display pricing for one or more term lengths, such as a 12-month term 368, 24-month term 370, and/or 36-month term 372.

From the above explanation, various changes and additions to the system are apparent. Although the illustrated example has focused on electricity pricing, such a system could be adapted to natural gas or to other forms of energy. Once a user account is established and a pricing request has been created, the system 12 may perform automatic (refreshed) price calculations on a reoccurring basis without the user submitting another request to refresh/update pricing. In addition, automated notifications may be sent the user 10A based on these automated refreshed calculations, which may, for example, be initiated by simply new facility market inputs 105 (FIG. 12) being uploaded into system. In one embodiment, these automated notifications may be based on preset, price values/triggers, time intervals, and/or percentage price changes (up or down). In various embodiments, the facility market input 105 and current day and historical pricing output for one or more pricing requests across one or more utilities or one or more facilities may be displayed to the user 10A in the form of graphs, tables, summary dashboards, or other formats, all of which can be saved, downloaded, and/or automatically pushed/sent to the user 10A.

The present invention therefore provides a means for automatically calculating and presenting, at the same time, current day and historical prices for forward energy contracts with accuracy comparable to the accuracy that is presently obtainable only with metered data, and with speed that is presently only possible without requiring metered data. By permitting the user 10A to select a preconfigured facility load profile based on multiple layers of category and subcategory facility types, an accurate energy profile can be quickly created. Using an algorithm builder to assemble time-stamped input data files for a forward contract time period, and considering the dates of market and regulatory changes that impact energy prices during this forward time period, the result is accurate current day and historical pricing. In addition, automated management of effective dates of time dependent, variable system inputs and elements, and start times, term lengths, and dates of pricing requests enables the system to simultaneously calculate and automatically present to the user 10A both current day and historical pricing, thereby eliminating the need for time-consuming, iterative price tracking that currently takes place today. Furthermore, because metered data is not required, this quick and accurate pricing system is not limited to energy account owners, but is accessible and provides value to all market participants, who require a quick and accurate energy price benchmark.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than the foregoing specification, should be referenced to indicate the scope of the invention.

What is claimed is:

1. A computer-implemented network for processing and displaying electricity pricing information or natural gas pricing information in response to a single price request submitted on a day, wherein the processing and displaying of the electricity pricing information or natural gas pricing information occurs no later than the day the single price request is submitted, the computer-implemented network comprising:
a profile database comprising a plurality of categories, with each category storing at least one preconfigured facility profile, each preconfigured facility profile being divided into a plurality of predetermined time periods, each time period comprising at least one apportionment factor;
a display, the display including a first user interface, the first user interface displaying the plurality of categories and permitting selection of one of the plurality of categories, the first user interface further displaying the at least one preconfigured facility profile within the selected category and permitting selection of one of the at least one preconfigured facility profile;
the display further including a second user interface, the second user interface including at least one input field for receiving an electricity volume or a natural gas volume;
the memory comprising executable instructions to apportion the electricity volume or the natural gas volume among the plurality of predetermined time periods according to the apportionment factor within each predetermined time period;
the display further including a third user interface, the third user interface displaying a plurality of locations or a plurality of utilities, and permitting selection of either at least one of the plurality of locations or at least one of the plurality of utilities;
the display further including a fourth user interface, the fourth user interface displaying a plurality of start times and permitting selection of at least one of the plurality of start times;
the display further including a fifth user interface, the fifth user interface displaying a plurality of term lengths and permitting selection of at least one of the plurality of term lengths;
the single price request comprising the selection of the one of the at least one preconfigured facility profile, the selection of the at least one of the plurality of locations or the selection of the at least one of the plurality of utilities, the selection of the at least one of the plurality of start times, the selection of the at least one of the plurality of term lengths, and the selection of either the electricity volume or the natural gas volume;
one or more utility databases, each utility database comprising one or more time dependent inputs, one or more time dependent parameters, and one or more time dependent algorithms, each time dependent input, time dependent parameter, and time dependent algorithm including an effective date;
the memory further comprising executable instructions to select at least one of the one or more time dependent inputs, at least one of the one or more time dependent parameters, and at least one of the one or more time dependent algorithms based on the effective date of each time dependent input, each time dependent parameter, and each time dependent algorithm;
the memory further comprising executable instructions to calculate one or more derived algorithm inputs based on each selection and to process the selected at least one of the one or more time dependent inputs, at least one of the one or more time dependent parameters, and at least one of the one or more time dependent algorithms in connection with the apportioned electricity volume or the apportioned natural gas volume within each predetermined time period to calculate pricing, the pricing including a high price estimate, a low price estimate and a best price estimate for current day pricing and for historical pricing; and
the display having a graphical user interface responsive to the single price request, showing the high price estimate, the low price estimate, and the best price estimate for the current day pricing and for the historical pricing with respect to variation in time.

2. The computer implemented network according to claim 1, wherein each category is divided into one or more subcategories, each preconfigured facility profile being stored within one subcategory.

3. The computer implemented network according to claim 1, wherein the executable instructions include instructions to permit a user to enter a custom facility profile and categorize the custom facility profile to identify one or more preconfigured facility profiles based on at least one of the custom facility profile and the custom facility profile categorization, and wherein the executable instructions further include instructions to modify the one or more preconfigured facility profiles based on at least one of the custom facility profile and other pre-existing data.

4. The computer implemented network according to claim 3, wherein the other pre-existing data includes at least one of previously entered custom facility profiles and data collected and trended across the previously entered custom facility profiles.

5. The computer implemented network according to claim 1, wherein the executable instructions permit selection of two or more preconfigured facility profiles, and apportion the electricity volume or the natural gas volume among the plurality of predetermined time periods according to the apportionment factor within each time period for each of the selected two or more preconfigured facility profiles.

6. The computer implemented network according to claim 5, wherein the executable instructions process at least one of an aggregated price for the selected two or more preconfigured facility profiles and an individual price for each selected preconfigured facility profile.

7. The computer implemented network according to claim 1, further comprising instructions to receive the electricity volume or the natural gas volume as a quantity of electricity usage or natural gas usage, a monetary value, or a peak demand value, and to convert the monetary value to the quantity of electricity usage or natural gas usage or convert the peak demand value to the quantity of electricity usage or natural gas usage.

8. The computer implemented network according to claim 1, wherein at least one of the one or more time dependent inputs, the one or more time dependent parameters, and the one or more time dependent algorithms is updated with curated information.

9. The computer implemented network system according to claim 1, wherein the display includes a user-selectable graphical user interface showing each of a supply component price, a distribution component price, a tax component price, and a total price with respect to the variation in time.

10. The computer implemented network according to claim 1, wherein the display includes a user-selectable graphical user interface showing each of a supply subcomponent price, a distribution subcomponent price, and a tax subcomponent price with respect to the variation in time.

11. The computer implemented network according to claim 1, wherein the display includes a user-selectable graphical user interface showing price estimates for each of the plurality of term lengths.

12. The computer implemented network according to claim 1, wherein the memory further comprises executable instructions to automatically perform price calculations on a recurring basis.

13. The computer implemented network according to claim 12, wherein the memory further comprises executable instructions to automatically perform the price calculations upon updating the one or more utility databases.

14. The computer implemented network according to claim 12, wherein the memory further comprises executable instructions to send a notification upon automatically performing a price calculation.

15. The computer implemented network according to claim 12, wherein the memory further comprises executable instructions to send a notification upon at least one of a price trigger being reached and a percentage price change occurring.

16. A computer-implemented network for processing and displaying electricity pricing information or natural gas pricing information, in response to a single price request submitted on a day, wherein the processing and displaying of the electricity pricing information or natural gas pricing information occurs no later than the day the single price request is submitted, the computer-implemented network comprising:

a display, the display having a first user interface permitting a user to enter at least one custom facility profile, the at least one custom facility profile including at least one month, the first user interface including at least one input field corresponding to each month, each input field for each month receiving a peak volume entered by the user, an off-peak volume entered by the user, or a peak demand entered by the user;

the display further including a second user interface, the second user interface displaying a plurality of locations or a plurality of utilities, and permitting selection of at least one of the plurality of locations or at least one of the plurality of utilities;

the display further including a third user interface, the third user interface displaying a plurality of start times and permitting selection of at least one of the plurality of start times;

the display further including a fourth user interface, the fourth user interface displaying a plurality of term lengths and permitting selection of at least one of the plurality of term lengths;

the single price request comprising the at least one custom facility profile, the selection of the at least one of the plurality of locations or the selection of the at least one of the plurality of utilities, the selection of the at least one of the plurality of start times, and the selection of the at least one of the plurality of term lengths;

one or more utility databases, each utility database comprising one or more time dependent inputs, one or more time dependent parameters, and one or more time dependent algorithms, each time dependent input, time dependent parameter, and time dependent algorithm including an effective date;

the memory further comprising executable instructions to select at least one of the one or more time dependent inputs, at least one of the one or more time dependent parameters, and at least one of the one or more time dependent algorithms based on the effective date of each time dependent input, each time dependent parameter, and each time dependent algorithm;

the memory further comprising executable instructions to calculate one or more derived algorithm inputs based on each selection and to process the selected at least one of the one or more time dependent inputs, at least one of the one or more time dependent parameters, and at least one of the one or more time dependent algorithms to calculate pricing, the pricing including a high price estimate, a low price estimate and a best price estimate for current day pricing and for historical pricing; and the display having a graphical user interface responsive to the single price request, showing the high price estimate, the low price estimate, and the best price estimate for the current day pricing and for the historical pricing with respect to variation in time.

17. The computer implemented network according to claim 16, wherein at least one of the one or more time dependent inputs, the one or more time dependent parameters, and the one or more time dependent algorithms is updated with curated information.

18. The computer implemented network system according to claim 16, wherein the graphical user interface is user-selectable to show at least one of a supply component price, a distribution component price, a tax component price, and a total price with respect to the variation in time.

19. The computer implemented network according to claim 16, wherein the graphical user interface is user-selectable to show at least one of a supply subcomponent price, a distribution subcomponent price, and a tax subcomponent price with respect to the variation in time.

20. The computer implemented network according to claim 16, wherein the graphical user interface is user-selectable to show price estimates for each of the plurality of term lengths.

21. The computer implemented network according to claim 16, wherein the memory further comprises executable instructions to automatically perform price calculations on a recurring basis.

22. The computer implemented network according to claim 21, wherein the memory further comprises executable instructions to automatically perform the price calculations upon updating the one or more utility databases.

23. The computer implemented network according to claim 21, wherein the memory further comprises executable instructions to send a notification upon automatically performing a price calculation.

24. The computer implemented network according to claim 21, wherein the memory further comprises executable instructions to send a notification upon at least one of a price trigger being reached and a percentage price change occurring.

* * * * *